(12) United States Patent
Takizawa et al.

(10) Patent No.: US 8,027,579 B2
(45) Date of Patent: Sep. 27, 2011

(54) CAMERA DRIVER

(75) Inventors: Teruyuki Takizawa, Osaka (JP); Kozo Ezawa, Osaka (JP); Masahiro Inata, Hyogo (JP); Yoshiaki Sugitani, Nara (JP); Masayuki Misaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/679,608

(22) PCT Filed: Jul. 23, 2009

(86) PCT No.: PCT/JP2009/003475
§ 371 (c)(1),
(2), (4) Date: Mar. 23, 2010

(87) PCT Pub. No.: WO2010/010712
PCT Pub. Date: Jan. 28, 2010

(65) Prior Publication Data
US 2010/0202766 A1    Aug. 12, 2010

(30) Foreign Application Priority Data

Jul. 24, 2008 (JP) ................. 2008-190559
Oct. 6, 2008 (JP) ................. 2008-259238
Apr. 6, 2009 (JP) ................. 2009-091728
Apr. 6, 2009 (JP) ................. 2009-091729

(51) Int. Cl.
*G03B 17/00* (2006.01)

(52) U.S. Cl. ........................................ 396/55

(58) Field of Classification Search ............ 396/13, 396/55, 421; 348/208.99, 208.4–208.11; 359/554–557
See application file for complete search history.

(56) References Cited

U.S. PATENT DOCUMENTS

| 5,502,598 | A | 3/1996 | Kimura et al. |
| 5,956,529 | A | 9/1999 | Lee et al. |
| 6,263,160 | B1 * | 7/2001 | Lewis ............................ 396/13 |
| 6,552,998 | B1 | 4/2003 | Matsunaga |
| 6,611,662 | B1 * | 8/2003 | Grober .......................... 396/55 |
| 7,303,341 | B2 * | 12/2007 | Itzkowitz ...................... 396/421 |
| 7,539,404 | B2 * | 5/2009 | Iwasaki et al. ................ 396/55 |
| 2006/0033818 | A1 | 2/2006 | Wada et al. |
| 2008/0240704 | A1 | 10/2008 | Takahashi |
| 2009/0086037 | A1 * | 4/2009 | Chang et al. ............... 348/208.7 |
| 2009/0316011 | A1 * | 12/2009 | Huang ...................... 348/208.7 |

FOREIGN PATENT DOCUMENTS

| JP | 02-247625 | 10/1990 |
| JP | 07-043769 | 2/1995 |
| JP | 07-058990 | 3/1995 |
| JP | 08-044962 | 2/1996 |

(Continued)

OTHER PUBLICATIONS

International Search Report for corresponding application No. PCT/JP2009/003475 mailed Sep. 29, 2009.

*Primary Examiner* — W. B. Perkey
(74) *Attorney, Agent, or Firm* — Renner, Otto, Boisselle & Sklar, LLP

(57) ABSTRACT

A camera driving apparatus capable of inclining a camera section including a lens barrel and an imaging element in a panning direction (yawing) and a tilting direction (pitching) and also capable of rotating the camera section around an optical axis thereof (rolling).

32 Claims, 36 Drawing Sheets

FOREIGN PATENT DOCUMENTS

| | | |
|---|---|---|
| JP | 11-220651 | 8/1999 |
| JP | 2000-165738 | 6/2000 |
| JP | 2003-241298 | 8/2003 |
| JP | 2005-311758 | 11/2005 |
| JP | 2006-053358 | 2/2006 |
| JP | 2007-041455 | 2/2007 |
| JP | 2008-058391 | 3/2008 |
| JP | 2008-134329 | 6/2008 |
| JP | 2008-245455 | 10/2008 |
| JP | 2009-025481 | 2/2009 |

* cited by examiner

*FIG.39*
(a)
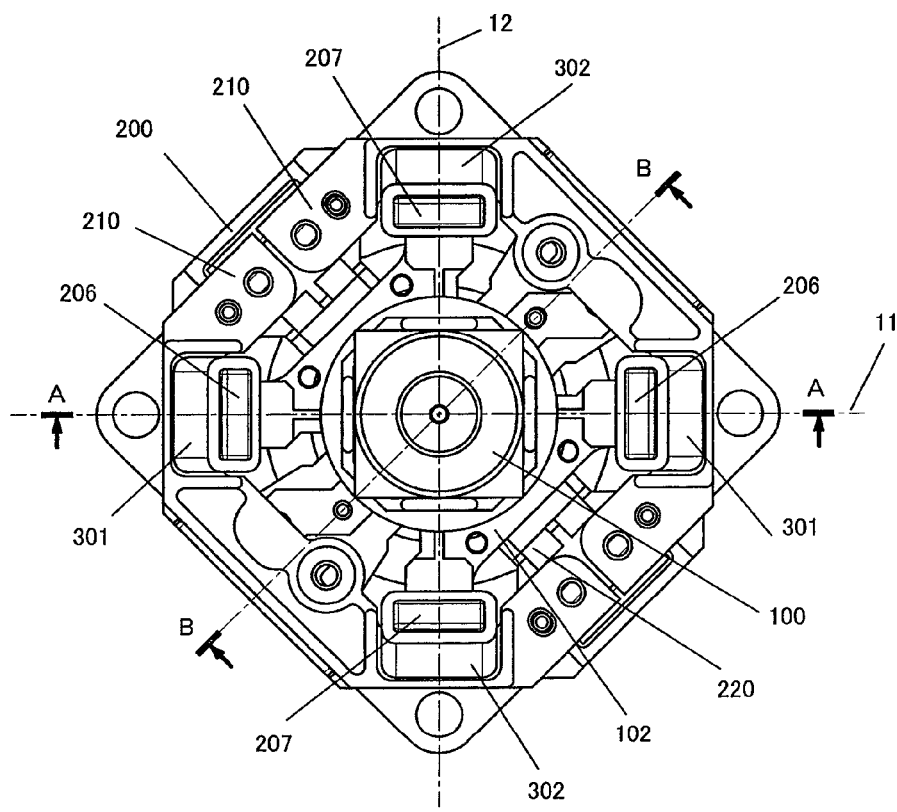
(b)
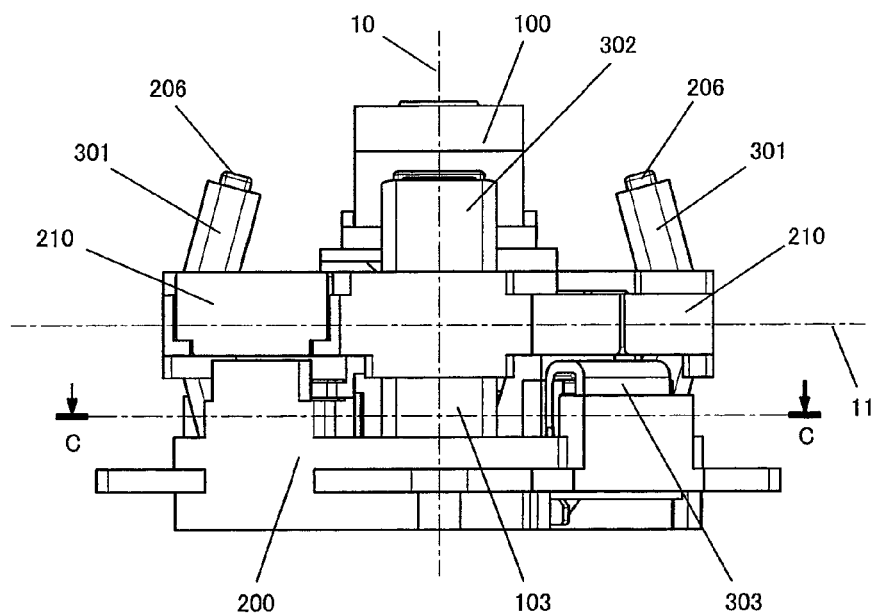

CAMERA DRIVER

TECHNICAL FIELD

The present invention relates to a camera driving apparatus capable of inclining a camera section including a lens barrel and an imaging element in a panning direction (yawing) and a tilting direction (pitching) and also capable of rotating the camera section around an optical axis thereof (rolling).

BACKGROUND ART

Many of video cameras and digital cameras recently on the market include a camera-shake compensation device for compensating for image blurring of a photo caused by camera-shake. The camera-shake compensation device inclines a lens, a lens barrel, a reflective mirror, an imaging element or the like with respect to an optical axis of the camera, or moves such an element on a plane perpendicular to the optical axis two-dimensionally.

For example, Patent Document No. 1 discloses a shake compensation mechanism having a structure which elastically supports the lens barrel at one point and inclines the lens barrel with respect to the optical axis. Patent Document No. 2 discloses a camera-shake compensation device which supports the mirror with a pivot structure and inclines the mirror with respect to the optical axis. Patent Document No. 3 discloses an imaging lens unit which supports a spherical lens barrel at three points and inclines the lens barrel while moving the lens barrel along the optical axis.

CITATION LIST

Patent Literature

Patent Document No. 1: Japanese Laid-Open Patent Publication No. 2006-53358
Patent Document No. 2: Japanese Laid-Open Patent Publication No. 11-220651
Patent Document No. 3: Japanese Laid-Open Patent Publication No. 2008-58391

SUMMARY OF INVENTION

Technical Problem

It is generally considered that the camera-shake angle caused when a human takes an image while being still is about ±0.3 degrees and that the generated frequency component is about 20 to 30 Hz. It is also considered that the camera-shake compensation needs to be controlled in a frequency band of about 10 Hz.

As is understood, when a photographer takes an image using a video camera or a digital camera while being still, the camera-shake angle is relatively small and the frequency for the control is relatively low. Owing to this, a conventional camera driving apparatus for compensating for image blurring of a photo caused by the camera-shake while the photographer is in a still state realizes good camera-shake compensation, despite that the angle at which each of sections of the camera driving apparatus (lens, lens barrel, reflective mirror, imaging element, etc.) with respect to the optical axis of the lens is to be inclined or the amount by which such an element is to be moved straight on a plane perpendicular to the optical axis two-dimensionally is very small.

However, when the photographer takes a moving picture or a still picture while walking, the angle of a shake of an image (hereinafter, occasionally referred to as "walk-shake"; walk-shake encompasses camera-shake) is, for example, ±10 degrees or greater. It is considered that the walk-shake compensation needs to be controlled in a frequency band of about 50 Hz. When the angle of the shake of the image is larger and the compensation needs to be controlled at a higher frequency, the conventional camera driving apparatus has a problem in the structure of a support system for supporting the elements and a driving system for driving the elements.

For example, the device in Patent Document No. 1 is suitable for inclining the lens barrel at a very small angle. However, for inclining the lens barrel at a large angle exceeding ±10 degrees, an elastic body which supports the device is considered to be deformed to the level of plasticity. When the angle at which the lens barrel is inclined becomes large, the load caused by the spring constant of the elastic body becomes excessively large, and the amplitude increase coefficient (Q factor) of inherent vibration by the elastic body is also increased. It is considered that as a result, the phase characteristic and the gain characteristic of the compensation control are declined, and so it becomes difficult to control the compensation in the above-described frequency band.

The device in Patent Document No. 2 drives the reflective mirror in order to compensate for the shake of the image. However, where a video camera or a digital camera includes a wide-angle lens system, a reflective mirror provided in the optical system cannot avoid becoming large. Therefore, the reflective mirror cannot be considered to be a solution suitable for a video camera or a digital camera which is desired to be compact. In addition, the mirror is supported with a pivot structure using a magnetic attracting force, and so the mirror may fall due to an external disturbance such as vibration, impact or the like.

The lens unit in Patent Document No. 3 includes a spherical lens holder, and so can incline the lens holder at a large angle. However, the rotating radius of a part by which the lens holder contacts a holder provided outer to the lens holder is large. Therefore, the frictional load on the movable section is large, and so the moving distance by motion is long. For this reason, it is considered that when the inclining angle becomes large, the contact frictional load changes much, which makes it difficult to provide accurate control. Unless the gap between the lens holder and the holder provided outer thereto is controlled accurately, it is difficult to accurately control the inclining angle of the lens holder. Depending on the processing precision of these components, a mechanical looseness may occur, which may hinder the frequency response characteristic of the movable section.

None of the devices in Patent Documents Nos. 1 through 3 has a structure for rotating the element such as a lens or the like around the optical axis of the camera section.

In order to solve at least one of these problems of the conventional art, the present inventors conceived a novel structure for supporting the camera section such that the camera section is rotatable in three axial directions. The present invention has an object of realizing a camera driving apparatus capable of compensating for a shake of an image of an amount too large to be compensated by the conventional video camera or digital camera, for example, a camera driving apparatus capable of inclining an image at a large angle of ±10 degrees or greater in a panning direction and a tilting direction or capable of rotating (rolling) an image around the optical axis of the lens.

Solution to Problem

A camera driving apparatus according to the present invention includes a camera section including an imaging element, a lens for forming a subject image on an imaging plane of the imaging element, and a lens barrel for holding the lens; a fixed unit at least partially formed of a magnetic member and having a protrusion section having a shape of at least a part of a spherical face; a movable unit including a first movable section having an attracting magnet for generating a magnetic attracting force in the magnetic member and a conical contact face with which the protrusion section is loosely engageable by the magnetic attracting force and is contactable, the first movable section being freely pivotable around a sphere center of the spherical face of the protrusion section; and a second movable section having the camera section mounted thereon and fixed to the first movable section, the second movable section having a fall preventive regulation face in a state where a prescribed gap, along which the second movable section is freely pivotable with respect to the fixed unit when the first movable section pivots, is sandwiched between the fall preventive regulation face and the fixed unit; a detector for detecting an inclining angle of the camera section with respect to the fixed unit and a rotating angle of the camera section around an optical axis of the lens; a first driving section for inclining the camera section with respect to the fixed unit; and a second driving section for rotating the camera section around the optical axis with respect to the fixed unit.

In a preferable embodiment, the detector includes a first detection section for detecting the inclining angle of the camera section with respect to the fixed unit; and a second detection section for detecting the rotating angle of the camera section around the optical axis with respect to the fixed unit.

In a preferable embodiment, the sphere center of the spherical face of the protrusion section is located on the optical axis of the lens.

In a preferable embodiment, the central axis of the conical contact face matches the optical axis of the lens.

In a preferable embodiment, the fall preventive regulation face and the contact face are each located on an line extended from the optical axis of the lens, generally symmetrically as being centered around the sphere center of the protrusion section In a preferable embodiment, the fall preventive regulation face has a shape of a concaved partial spherical face having a center matching the sphere center of the spherical face.

In a preferable embodiment, the second movable section is attached and fixed to the first movable section in a plurality of areas having no cross-section of the fixed unit, the plurality of areas being on a plane perpendicular to the optical axis of the lens and on a circumference of a circle centered around the optical axis.

In a preferable embodiment, the first driving section includes two pairs of inclination driving magnets located symmetrically with respect to the optical axis of the lens, and fixed to the movable unit in a state where one pair and the other pair are located on two lines perpendicular to each other; two pairs of first magnetic yokes provided on the fixed unit so as to face the inclination driving magnets respectively; and inclination driving coils provided on the first magnetic yokes. A position of a center, in a direction of the optical axis, of the inclination driving magnets and the inclination driving coils generally matches a position of the sphere center of the spherical face.

In a preferable embodiment, the second driving section includes a pair of rotation driving magnets located symmetrically with respect to the optical axis of the lens and fixed to the movable unit; a pair of second magnetic yokes provided on the fixed unit so as to face the rotation driving magnets respectively; and rotation driving coils provided on the second magnetic yokes. A position of a center, in the direction of the optical axis, of the rotation driving magnets and the rotation driving coils generally matches the position of the sphere center of the spherical face.

In a preferable embodiment, the first driving section includes two pairs of driving magnets located symmetrically with respect to the optical axis of the lens and fixed to the movable unit in a state where one pair and the other pair are located on two lines perpendicular to each other; two pairs of magnetic yokes provided on the fixed unit so as to face the driving magnets respectively; and inclination driving coils provided on the magnetic yokes. The second driving section includes the driving magnets, the magnetic yokes, and rotation driving coils provided on the magnetic yokes. A position of a center, in the direction of the optical axis, of the driving magnets, the inclination driving coils and the rotation driving coils generally matches the position of the sphere center of the spherical face.

In a preferable embodiment, side faces of the first magnetic yokes facing the inclination driving magnets each have a shape of a convexed partial spherical face.

In a preferable embodiment, side faces of the second magnetic yokes facing the rotation driving magnets each have a shape of a convexed partial spherical face.

In a preferable embodiment, side faces of the inclination driving magnets facing the first magnetic yokes each have a shape of a convexed partial spherical face.

In a preferable embodiment, side faces of the rotation driving magnets facing the second magnetic yokes each have a shape of a convexed partial spherical face.

In a preferable embodiment, the protrusion section includes a magnetic member and a resin material covering the magnetic member.

In a preferable embodiment, the camera driving apparatus further includes a viscous member or a viscous fluid provided between the contact face of the first movable section and the protrusion section of the fixed unit.

In a preferable embodiment, the attracting magnet is provided in the first movable section on the optical axis of the lens and is magnetized in the direction of the optical axis.

In a preferable embodiment, the gap is determined such that the contact face of the first movable section, even when being separated from the protrusion section of the fixed unit, is returned to a contact state by the magnetic attracting force of the attracting magnet.

In a preferable embodiment, the first detection section includes a first magnetic sensor fixed to the fixed unit. The first magnetic sensor detects a change of a magnetic force caused by inclination of the attracting magnet provided in the first movable section and calculates a two-dimensional inclining angle of the camera section.

In a preferable embodiment, the detector includes a magnetic sensor fixed to the fixed unit, and detects a change of a magnetic force caused by inclination and rotation of the attracting magnet mounted on the first movable section and calculates a rotating direction and a two-dimensional inclining angle of the camera section.

In a preferable embodiment, on the optical axis of the lens when the movable unit is at a neutral position, the camera section, the second movable section, the fall preventive regulation face provided on the second movable section, the gap, the protrusion section provided on the fixed unit, the conical contact face provided on the first movable section, the first movable section, the attracting magnet provided in the first movable section, and the first magnetic sensor fixed to the fixed unit are located in this order.

In a preferable embodiment, on the optical axis of the lens when the movable unit is at a neutral position, the camera section, the second movable section, the fall preventive regulation face provided on the second movable section, the gap, the protrusion section provided on the fixed unit, the conical contact face provided on the first movable section, the first movable section, the attracting magnet provided in the first movable section, and the magnetic sensor fixed to the fixed unit are located in this order.

In a preferable embodiment, the second detection section is located symmetrically with respect to the sphere center of the spherical face on a plane which is perpendicular to the optical axis of the lens and passes the sphere center of the spherical face.

In a preferable embodiment, the second detection section is located symmetrically with respect to the sphere center of the spherical face on a plane which is perpendicular to the optical axis of the lens and passes the sphere center of the spherical face. The second detection section is located to have an angle of 45 degrees with respect to the first or second driving section when seen in the direction of the optical axis of the lens when the movable unit is at a neutral position.

In a preferable embodiment, the second detection section includes a second magnetic sensor fixed to the fixed unit and rotation detection magnets provided on the movable unit. The second magnet sensor detects a change of the magnetic force caused by rotation of the rotation detection magnets and calculates a rotating angle of the camera section.

In a preferable embodiment, the second detection section includes a second magnetic sensor fixed to the fixed unit and a pair of rotation detection magnets provided on the movable unit; the second magnet sensor detects a change of the magnetic force caused by rotation of the rotation detection magnets and calculates a rotating angle of the camera section; and the pair of rotation detection magnets have two magnetic poles magnetized oppositely in a direction passing the sphere center on a plane perpendicular to the optical axis of the lens, and the two magnetic poles are located on in a circumferential direction of a circle centered around the optical axis.

In a preferable embodiment, the rotation detection magnets also act as the rotation driving magnets or the inclination driving magnets.

In a preferable embodiment, the detector includes a magnetic sensor fixed to the fixed unit; the attracting magnet has a plurality of magnetic poles magnetized in a direction of the optical axis of the lens; and the magnetic sensor detects a change of a magnetic force caused by inclination and rotation of the attracting magnet and calculates a rotating angle of the camera section and a two-dimensional inclining angle of the camera section.

According to a preferable embodiment, the first and second movable sections are formed of a resin material or a non-magnetic conductive material.

In a preferable embodiment, the first driving section includes a panning driving section for inclining the camera section in a panning direction with respect to the fixed unit, and a tilting driving section for inclining the camera section in a tilting direction, perpendicular to the panning direction, with respect to the fixed unit; the detector detects an inclining angle of the camera section in the panning and tilting directions with respect to the fixed unit, and a rotating angle of the camera section in a rolling direction in which the camera section rotates around the optical axis of the lens; the second driving section is a rolling driving section for rotating the camera section in the rolling direction with respect to the fixed unit; and the fixed unit includes a cantilever beam-shaped protrusion supporting section having the protrusion section at an end, and the protrusion supporting section has an angle of 45 degrees with respect to the panning direction or the tilting direction when seen in a direction of the optical axis.

In a preferable embodiment, the panning driving section includes a pair of panning driving magnets located symmetrically with respect to the optical axis of the lens and fixed to the first or second movable section; a pair of panning magnetic yokes provided on the fixed unit so as to face the panning driving magnets respectively; and a pair of panning driving coils respectively provided on the panning magnetic yokes. The tilting driving section includes a pair of tilting driving magnets located symmetrically with respect to the optical axis of the lens and fixed to the movable section, such that the pair of tilting driving magnets and the pair of panning driving magnets are located on two lines perpendicular to each other; a pair of tilting magnetic yokes provided on the fixed unit so as to face the tilting driving magnets respectively; and tilting driving coils respectively provided on the tilting magnetic yokes. A position of a center, in the direction of the optical axis, of the panning and tilting driving magnets and the panning and tilting driving coils generally matches a position of the sphere center of the spherical face.

In a preferable embodiment, the rolling driving section includes a pair of rolling driving magnets located symmetrically with respect to the optical axis of the lens and fixed to the movable unit so as to have an angle of 45 degrees with respect to the panning or tilting driving magnet; a pair of rolling magnetic yokes provided on the fixed unit so as to face the rolling driving magnets respectively; and rolling driving coils provided on the rolling magnetic yokes respectively. A position, in the direction of the optical axis, of the rolling driving magnets and the rolling driving coils generally matches a position of the sphere center of the spherical face.

In a preferable embodiment, the rolling driving section is located symmetrically with respect to the optical axis in a direction perpendicular to a projection area of the protrusion supporting section as seen in the direction of the optical axis.

In a preferable embodiment, the pair of panning magnetic yokes, the pair of tilting magnetic yokes and the pair of rolling magnetic yokes each have a general V-shape, and each pair of yokes are located symmetrically with respect to the optical axis of the lens such that trough portions of the V-shapes face each other.

In a preferable embodiment, the pair of panning magnetic yokes, the pair of tilting magnetic yokes and the pair of rolling magnetic yokes are fixed to the fixed unit at the trough portions of the V-shapes.

In a preferable embodiment, the pair of panning magnetic yokes, the pair of tilting magnetic yokes and the pair of rolling magnetic yokes each have a side face having a shape of a convexed partial spherical face having a center which matches the sphere center of the spherical face.

In a preferable embodiment, the second movable section is integrally formed with the first movable section.

A camera driving apparatus according to the present invention includes a camera section including an imaging element, a lens for forming a subject image on an imaging plane of the imaging element, and a lens barrel for holding the lens; a fixed unit at least partially formed of a magnetic member and having a protrusion section having a shape of at least a part of a spherical face; a movable unit including a first movable section having an attracting magnet for generating a magnetic attracting force in the magnetic member and a conical contact face with which the protrusion section is loosely engageable by the magnetic attracting force and is contactable, the first movable section being freely pivotable around a sphere center of the protrusion section and having the camera section mounted thereon; a fall preventive regulation face provided at a bottom of the camera section in a state where a prescribed gap, along which the camera section is freely pivotable with respect to the fixed unit when the movable unit pivots, is sandwiched between the fall preventive regulation face and the fixed unit; a detector for detecting an inclining angle of the camera section with respect to the fixed unit and a rotating angle of the camera section around an optical axis of the lens; a first driving section for inclining the camera section with respect to the fixed unit; and a second driving section for rotating the camera section around the optical axis with respect to the fixed unit. The first driving section includes two pairs of inclination driving magnets located symmetrically with respect to the optical axis of the lens and fixed to the movable unit in a state where one pair and the other pair are located on two lines perpendicular to each other; two pairs of first magnetic yokes provided on the fixed unit so as to face the inclination driving magnets respectively; and inclination driving coils provided on the first magnetic yokes. The second driving section includes a pair of rotation driving magnets located symmetrically with respect to the optical axis of the lens and fixed to the movable unit; second magnetic yokes provided on the fixed unit so as to face the rotation driving magnets respectively; and rotation driving coils provided on the second magnetic yokes. Side faces of the inclination driving magnets facing the first magnetic yokes each have a part of a first convexed spherical face which has a center matching the sphere center of the spherical face and has, as a radius, distance R1 from the center to a median of the side face of the inclination driving magnet, the distance R1 being defined on a plane which is perpendicular to the optical axis and passes the sphere center of the spherical face. Side faces of the rotation driving magnets facing the second magnetic yokes each have a part of a second convexed spherical face which has a center matching the sphere center of the spherical face and has, as a radius, distance R2 from the center to a median of the side face of the rotation driving magnet, the distance R2 being defined on the plane. Side faces of the first magnetic yokes facing the side faces of the inclination driving magnets each have a part of a concaved spherical face which has, as a center, a first point on a line extended from a line connecting the center to the median of the side face of the inclination driving magnet, the extended line being defined on the plane, and has radius R3 which is longer distance L1 from the first point to a median of the side face of the first magnetic yoke, the distance L1 being defined on the plane; and Side faces of the second magnetic yokes facing the side faces of the rotation driving magnets each have a part of a concaved spherical face which has, as a center, a second point on a line extended from a line connecting the center to the median of the side face of the rotation driving magnet, the extended line being defined on the plane, and has radius R4 which is longer distance L2 from the second point to a median of the side face of the second magnetic yoke, the distance L2 being defined on the plane.

In a preferable embodiment, the radius R3 and the distance L1 fulfill the relationship of $1.2L1 \leq R3 \leq 2L1$.

In a preferable embodiment, the radius R4 and the distance L2 fulfill the relationship of $1.2L2 \leq R4 \leq 2L2$.

In a preferable embodiment, R1 is equal to R2.

In a preferable embodiment, R3 is equal to R4.

In a preferable embodiment, the fall preventive regulation face is a part of a concaved spherical face having a center matching the sphere center of the spherical face, and a viscous member for absorbing impact is provided on a surface of the fall preventive regulation face.

In a preferable embodiment, the second magnetic yoke also acts as the first magnetic yoke.

A camera driving apparatus according to the present invention includes a camera section including an imaging element, a lens for forming a subject image on an imaging plane of the imaging element, and a lens barrel for holding the lens; a protrusion section at least partially formed of a magnetic member and having a shape of at least a part of a spherical face; a protrusion supporting section for supporting the protrusion section; a first movable section having an attracting magnet for generating a magnetic attracting force in the magnetic member and a conical contact face with which the protrusion section is loosely engageable by the magnetic attracting force and is contactable, the first movable unit being freely pivotable around a sphere center of the spherical face of the protrusion section; a second movable section having the camera section mounted thereon and fixed to the first movable section, the second movable section having a fall preventive regulation face in a state where a prescribed gap, along which the second movable section is freely pivotable with respect to the protrusion supporting section when the first movable section pivots, is sandwiched between the fall preventive regulation face and the protrusion supporting section; a third movable section for supporting the protrusion supporting section; a fixed unit for supporting the third movable section such that the third movable section is freely pivotable around an optical axis; a panning driving section for inclining the camera section in a panning direction with respect to the third movable section; a tilting driving section for inclining the camera section in a tilting direction, perpendicular to the panning direction, with respect to the third movable section; a rolling driving section for rotating the third movable section in a rolling direction, in which the third movable section rotates around the optical axis of the lens with respect to the fixed unit; a first detection section for detecting an inclining angle of the camera section in the panning and tilting directions with respect to the third movable section; and a second detection section for detecting a rotating angle of the third movable section in the rolling direction with respect to the fixed unit.

In a preferable embodiment, the fall preventive regulation face has a shape of a concaved partial spherical face having a center matching the sphere center of the spherical face.

In a preferable embodiment, the gap is determined such that even when the contact face of the first movable section is separated from the protrusion section of the protrusion supporting section, the contact face is returned to the contact state by the magnetic attracting force of the attracting magnet.

In a preferable embodiment, the movable section includes a fixed-fixed beam-shaped protrusion supporting section having the protrusion section at an end, and the protrusion supporting section has an angle of 45 degrees with respect to the panning direction or the tilting direction when seen in a direction of the optical axis.

In a preferable embodiment, the camera driving apparatus further includes a counterweight attached to the first movable section. When the first movable section is at a neutral position, the counterweight is located opposite to the camera section with respect to a plane which is perpendicular to the optical axis of the lens and includes the sphere center of the spherical face.

In a preferable embodiment, the panning driving section includes a pair of panning driving magnets located symmetrically with respect to the optical axis of the lens and fixed to the first or second movable section; a pair of panning magnetic yokes provided on the third movable section so as to face the panning driving magnets respectively; panning bobbins attached to the panning magnetic yokes; and panning driving coils wound around the panning bobbins. The tilting driving section includes a pair of tilting driving magnets located symmetrically with respect to the optical axis of the lens and fixed to the first or second movable section, such that the pair of tilting driving magnets and the pair of panning driving magnets are located on two lines perpendicular to each other; a pair of tilting magnetic yokes provided on the third movable section so as to face the tilting driving magnets respectively; tilting bobbins attached to the tilting magnetic yokes; and tilting driving coils wound around the tilting bobbins. A position of a center, in the direction of the optical axis, of the panning and tilting driving magnets and the panning and tilting driving coils generally matches a position of the sphere center of the spherical face.

In a preferable embodiment, side faces of the panning and tilting magnetic yokes facing the respective driving magnets each have a shape of a concaved partial spherical face or partial cylinder side face having a center on a plane which includes the sphere center of the spherical face and is perpendicular to the optical axis of the lens.

In a preferable embodiment, faces of the panning and tilting driving magnets facing the respective magnetic yokes each have a shape of a convexed partial spherical face or partial cylinder side face having a center on a plane which includes the sphere center of the spherical face and is perpendicular to the optical axis of the lens.

In a preferable embodiment, the pair of panning driving coils and the pair of tilting driving coils are each divided into two at the position of the sphere center of the spherical face in the direction of the optical axis of the lens, and are wound around the panning bobbins and the tilting bobbins; and the panning bobbins and the tilting bobbins form a general V-shape so as not to interfere with the panning magnetic yokes or the tilting magnetic yokes, are located symmetrically with respect to the optical axis of the lens such that trough portions of the V-shapes of the panning bobbins face each other and such that trough portions of the V-shapes of the tilting bobbins face each other, and are attached to the panning and tilting magnetic yokes respectively.

In a preferable embodiment, the rolling driving section includes a pair of rolling driving magnets located symmetrically with respect to the optical axis of the lens and fixed to the third movable section so as to have an angle of 45 degrees with respect to the panning or tilting driving magnets; a pair of rolling magnetic yokes provided on the fixed unit so as to face the rolling driving magnets respectively; and rolling driving coils wound around the rolling magnetic yokes. A center of projection of the rolling driving magnets and the rolling driving coils when seen in a direction perpendicular to the optical axis of the lens is not on a plane which is perpendicular to the optical axis and includes the sphere center of the spherical face.

In a preferable embodiment, side faces of the rolling magnetic yokes facing the rolling driving magnets each have a shape of a convexed partial spherical face or curved face.

In a preferable embodiment, the first detection section includes the attracting magnet and a first magnetic sensor fixed to the third movable section so as to face the attracting magnet. The first magnetic sensor detects a change of a magnetic force caused by inclination of the attracting magnet mounted on the first movable section in the panning direction and the tilting direction, and calculates a two-dimensional inclining angle.

In a preferable embodiment, the attracting magnet is provided in the first movable section on the optical axis and magnetized to the direction of the optical axis.

In a preferable embodiment, a face of the attracting magnet facing the first magnetic sensor has a shape of a convexed partial spherical face centered around the spherical center.

In a preferable embodiment, the second detection section includes a pair of rotation detection magnets located symmetrically with respect to the optical axis of the lens and provided on the third movable section; and second magnetic sensors fixed to the fixed unit so as to face the rotation detection magnets. The second magnetic sensors detect a change of a magnetic force of the rotation detection magnets caused by rotation of the third movable section around the optical axis, and calculate the rotating angle.

In a preferable embodiment, the rotation detection magnets have two magnetic poles magnetized oppositely in a direction passing the sphere center on a plane which is perpendicular to the optical axis of the lens, and two magnetic poles are provided on a circumferential direction of a circle centered around the optical axis.

A camera unit according to the present invention includes the above-described camera driving apparatus; an angular velocity sensor for detecting an angular velocity around each of three axes of the fixed unit, the three axes being perpendicular to one another; a calculation processing section for generating a target rotating angle signal based on an output from the angular velocity sensor; and a driving circuit for generating a signal for driving the first driving section and the second driving section based on the target rotating angle signal.

Advantageous Effects of Invention

According to a camera driving apparatus of the present invention, a pivot structure is formed of a conical contact face provided on the movable unit and a protrusion section at least partially formed of a magnetic member and having a shape of at least a part of a spherical face. Therefore, the movable unit can be freely rotated around the sphere center of the spherical face with respect to the fixed unit. In addition, the protrusion section is kept in contact with the contact face owing to the magnetic attracting force provided by the attracting magnet. Therefore, the load on the pivot support can be constant regardless of the rotating state of the movable unit. Owing to the fall preventive regulation face, even if the movable unit receives an impact from outside, the movable unit does not fall and can return to the state where the protrusion section is in contact with the contact face.

Accordingly, the present invention realizes a compact and solid camera driving apparatus which allows the camera section to incline in the panning direction and the tilting direction at a larger angle than by the conventional art and also to rotate in the rolling direction, and can realize good shake compensation control in a wide range of frequency band and thus compensate for image blurring caused by walk-shake.

BRIEF DESCRIPTION OF DRAWINGS

FIG. 39(a) is a plan view of the camera driving apparatus in Embodiment 5, and FIG. 39(a) is a side view of the camera driving apparatus in Embodiment 5.

DESCRIPTION OF EMBODIMENTS

Embodiment 1

Figure 1:
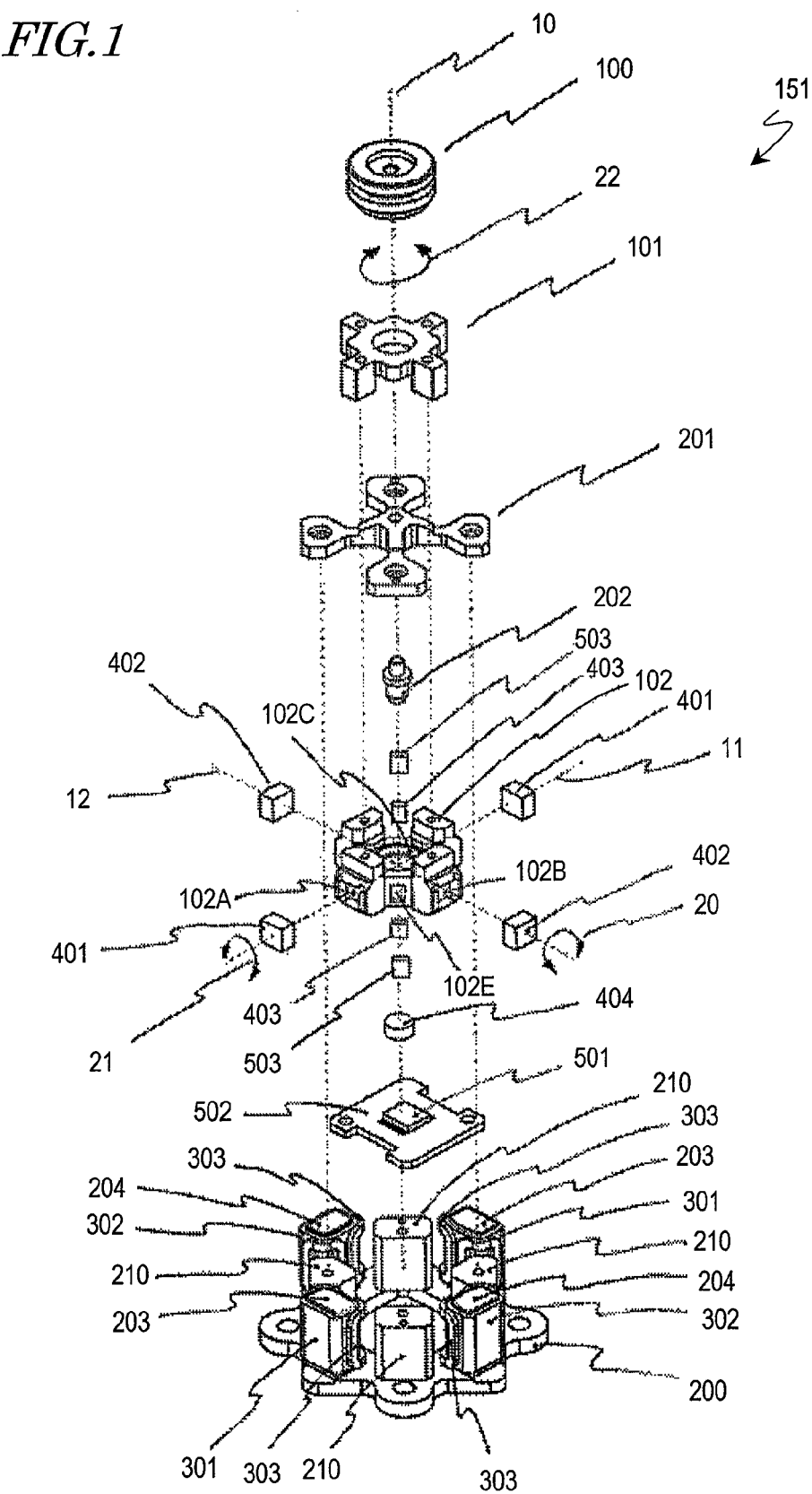
FIG. 1 is an exploded isometric view of a camera driving apparatus in Embodiment 1 according to the present invention.
Figure 2:
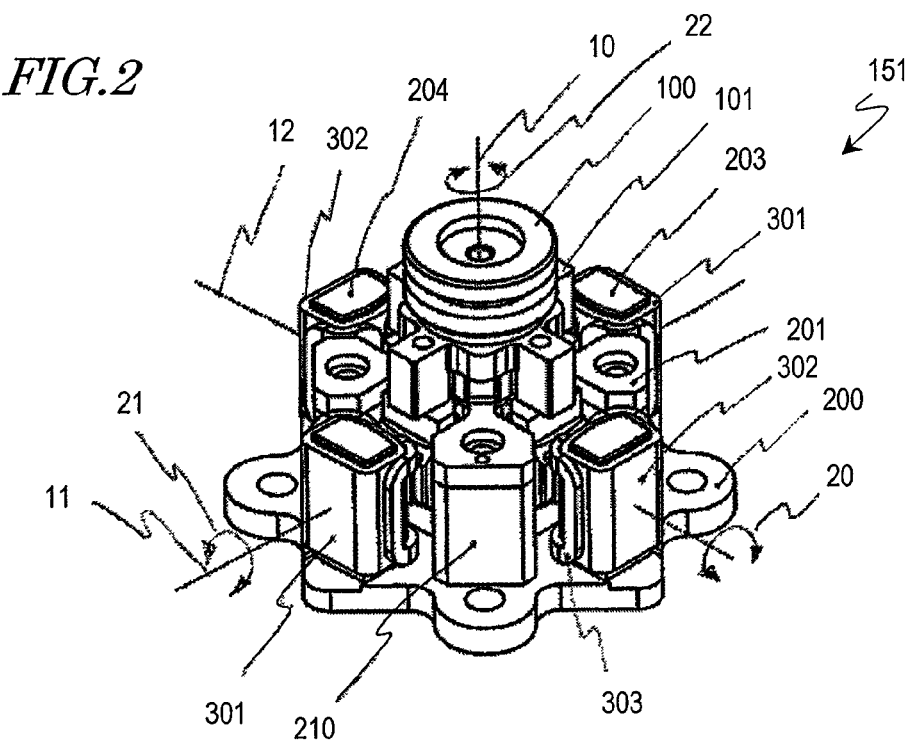
FIG. 2 is an isometric view of the camera driving apparatus in Embodiment 1 as seen from above obliquely.
Figure 3:
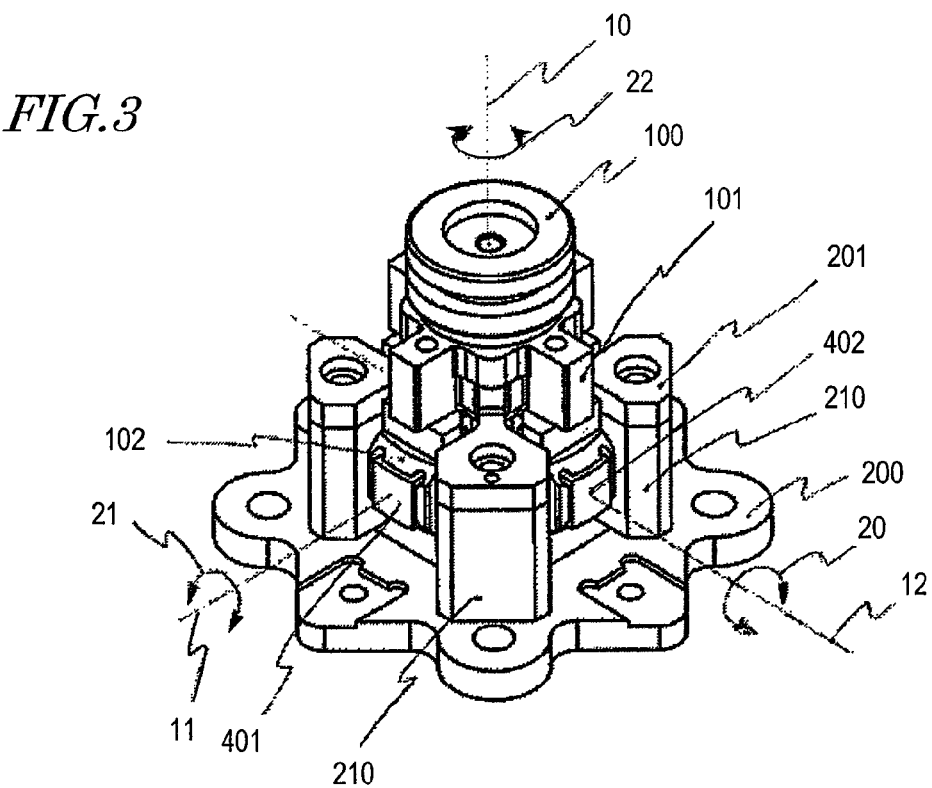
FIG. 3 is an isometric view of the camera driving apparatus in Embodiment 1 in a state where some of the elements are removed.
Figure 4:
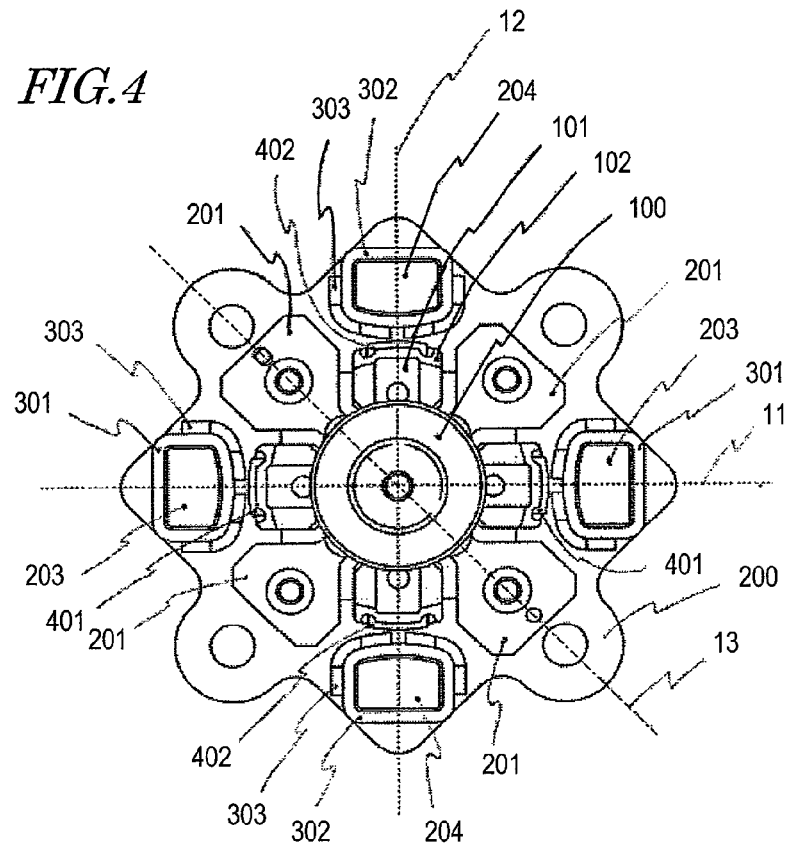
FIG. 4 is a plan view of the camera driving apparatus in Embodiment 1.
Figure 5:
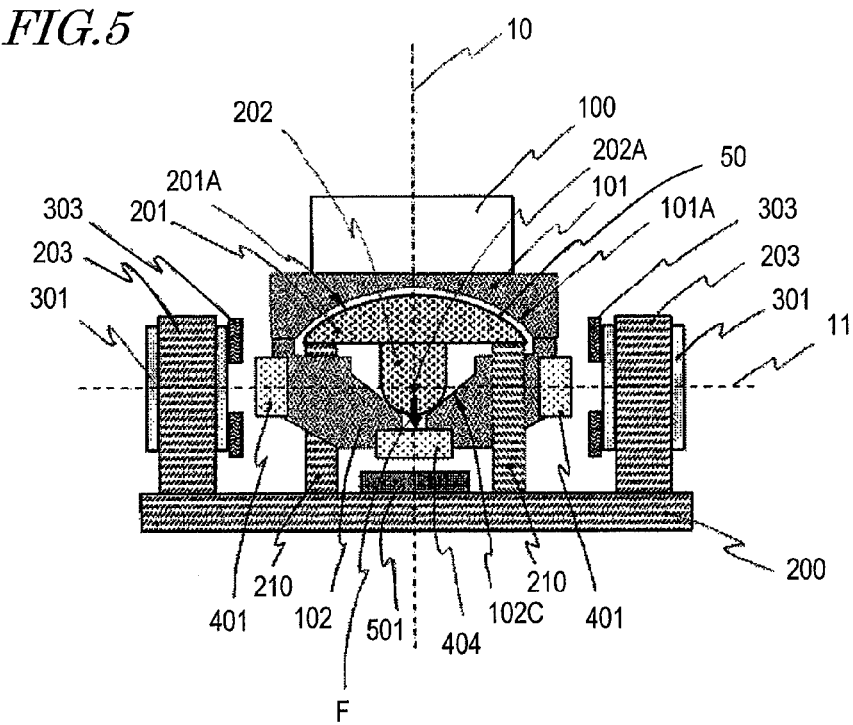
FIG. 5 is a cross-sectional view of the camera driving apparatus in Embodiment 1 taken along a plane including an optical axis 10 and a tilting direction rotation axis.

Hereinafter, a camera driving apparatus in Embodiment 1 according to the present invention will be described. FIG. 1 is an exploded isometric view of a camera driving apparatus 151 in Embodiment 1 according to the present invention. FIG. 2 is an isometric view of the camera driving apparatus 151 as seen from above obliquely. FIG. 3 is an isometric view of the camera driving apparatus 151 as seen from above obliquely. In FIG. 3, the camera driving apparatus 151 is in a state where some of the elements (panning driving coils 301, tilting driving coils 302, rolling driving coils 303, panning magnetic yokes 203, tilting magnetic yokes 204) are removed. FIG. 4 is a plan view of the camera driving apparatus 151. FIG. 5 is a cross-sectional view of the camera driving apparatus 151 taken along a plane including an optical axis 10 and a tilting direction rotation axis 11. With reference to these figures, a main structure of the camera driving apparatus 151 will be described.

The camera driving apparatus 151 includes a camera section 100, and a movable unit for supporting the camera section 100, and a fixed unit. With respect to the fixed unit, the movable unit is freely rotatable in a rolling direction 22 around the lens optical axis 10 as the center of rotation, in a tilting direction 21 around a tilting direction rotation axis 11 as the center of rotation, and a panning direction 20 around a panning direction rotation axis 12 as the center of rotation.

As shown in FIG. 1, the camera section 100 includes an imaging element (not shown), a lens (not shown) for forming an image of a subject on an imaging plane of the imaging element, the lens having the optical axis 10, and a lens barrel (not shown) for holding the lens.

The fixed unit includes a base 200, a protrusion section 202, and a protrusion supporting section 201. The protrusion supporting section 201 is cross-shaped. As shown in FIG. 5, the protrusion section 202 has a shape of at least a part of a spherical face having a sphere center 202A. Hereinafter, a portion having a shape of at least a part of the spherical face will be referred to as a "partial spherical face". At least a part of the protrusion section 202 is formed of a magnetic member. As shown in FIG. 1 and FIG. 5, the protrusion section 202 is pressurized and fixed into a central part of the cross-shaped protrusion supporting section 201. As shown in FIG. 1 through FIG. 3, the protrusion supporting section 201 having the protrusion section 202 fixed therein is fixed to the base 200 via four connection sections 210 at four ends of the cross respectively.

The movable unit includes a first movable section 102 and a second movable section 101. As shown in FIG. 1 and FIG. 5, the first movable section 102 includes an attracting magnet 404 and a contact face 102C. The contact face 102C defines a conical space inside thereof and is located on the first movable section 102 such that a tip of the conical space is located on a lower side. The attracting magnet 404 is located at the tip of the conical space, which is also a bottom of the first movable section 102. Preferably, the first movable section 102 is formed of a non-magnetic member such as a resin material or the like.

As shown in FIG. 5, the protrusion section 202 of the fixed unit is inserted into the conical space inside the contact face 102C of the first movable section 102. The protrusion section 202 is partially formed of a magnetic member and so contacts the contact face 102C by a magnetic attracting force F of the attracting magnet 404 provided on the bottom of the first movable section 102 and thus is in loose engagement with the contact face 102C.

Owing to this, the first movable section 102 freely rotates around the sphere center 202A of the spherical face while the conical contact face 102C and a partial spherical face of the protrusion section 202 are in contact with each other. More specifically, the first movable section 102 can rotate around the sphere center 202A, in two inclining directions, i.e., the panning direction 20 and the tilting direction 21, and also in the rolling direction 22. In the panning direction 20, the first movable section 102 can rotate around the panning direction rotation axis 12, which is perpendicular to the optical axis 10 and passes the sphere center 202A. In the tilting direction 21, the first movable section 102 can rotate around the tilting direction rotation axis 11, which is perpendicular to the optical axis 10 and the panning direction rotation axis 12. In the rolling direction 22, the first movable section 102 can rotate around the lens optical axis 10.

As shown in FIGS. 1 through 3 and 5, the second movable section 101 has the camera section 100 mounted thereon and is fixed to the first movable section 102. Specifically, the camera section 100 is fixed to the second movable section 101 such that the lens optical axis passes the center of the second movable section 101 which is cross-shaped and preferably matches the central axis of the conical contact face 102C. The second movable section 101 is coupled to the first movable section 102 in the state where the protrusion supporting section 201 is sandwiched therebetween, such that the four ends of the cross-shaped second movable section 101 and the four ends of the cross-shaped protrusion supporting section 201 of the fixed unit do not interfere with each other in a vertical direction and are discrete in a horizontal direction. Therefore, as shown in FIG. 2 through FIG. 4, the four ends of the cross-shaped second movable section 101 of the movable unit and the four ends of the cross-shaped protrusion supporting section 201 are located in a discrete manner so as to make an angle of 45 degrees respectively on a circumference of a circle on a plane vertical to the optical axis 10 when seen in the direction of the optical axis 10. In this manner, the second movable section 101 is attached and fixed to the first movable section 102 in a plurality of areas having no cross-section of the fixed unit. Therefore, the fixed unit and the movable unit avoid interfering with each other, which can reduce the height of the apparatus.

As described above, in this embodiment, the movable unit having the camera section 100 mounted thereon is supported by the fixed unit in a concentrated manner at the position of the center of gravity. Therefore, the frictional load can be reduced, and the mechanical resonance in a driving frequency band can be significantly suppressed.

The attracting magnet 404 provides a constant vertical drag between the protrusion section 202 and the conical contact face 102C by a constant magnetic attracting force F without being influenced by the pivoting angle. This can suppress a fluctuation of the frictional load in accordance with the pivoting angle and realize a good phase characteristic and a good gain characteristic in the driving frequency band.

In the case where a surface portion of the protrusion section 202 is covered with a resin material (not shown), the friction between the conical contact face 102C and the protrusion section 202 which are in contact with each other can be further reduced. This realizes a supporting structure having a high abrasion resistance.

The movable unit has a fall preventive structure so as not to fall from the fixed unit. As shown in FIG. 5, a prescribed gap 50 is provided between the second movable section 101 and the protrusion supporting section 201 in the direction of the optical axis 10, such that the second movable section 101 is freely pivotable with respect to the protrusion supporting section 201 in the entire area in which the second movable section 101 is movable. Specifically, the protrusion supporting section 201 has a convexed partial spherical face 201A centered around the sphere center 202A. The second movable section 101 has a fall preventive regulation face 101A having a shape of a concaved partial spherical face centered around the sphere center 202A. Between the partial spherical face 201A and the fall preventive regulation face 101A, the gap 50 is made in the state where the protrusion supporting section 201 of the fixed unit is in contact with the contact face 102C of the first movable section 102. The partial spherical face 201A and the fall preventive regulation face 101A each have a generally symmetrical shape with respect to the lens optical axis 10.

The gap 50 is set to have a distance with which even if the contact face 102C is separated from the protrusion section 202, the contact face 102C can be returned to the state of contacting the protrusion section 202 by the magnetic attracting force F of the attracting magnet 404. Namely, even in the state where the movable unit moves downward by a distance equal to the gap 50 and so the partial spherical face 201A contacts the fall preventive regulation face 101A, the movable unit can be returned by the magnetic attracting force F of the attracting magnet 404 to the original state where the contact face 102C is in contact with the protrusion section 202.

Owing to this, this embodiment can provide a camera driving apparatus having a high impact resistance, in which the movable unit, even if instantaneously falling from a prescribed position, can be immediately returned to the original well-supported state by the magnetic attracting force F of the attracting magnet 404.

In the case where the radius of the fall preventive regulation face 101A centered around the sphere center 202A is decreased to a minimum possible size, the space required to provide the fall preventive regulation face 101A can be reduced, which can contribute to the size reduction of the apparatus.

Now, a structure for driving the movable unit will be described. The camera driving apparatus 151 includes a first driving section for inclining the movable unit having the camera section 100 mounted thereon in the panning direction 20 and the tilting direction 21 with respect to the fixed unit, and a second driving section for rotating the camera section 100 in the rolling direction 22 around the lens optical axis 10 with respect to the fixed unit.

The first driving section includes two pairs of inclination driving magnets, two pairs of magnetic yokes, and driving coils provided on the magnetic yokes. More specifically, the first movable section 102 has, provided thereon, a pair of panning driving magnets 401 located symmetrically on the tilting direction rotation axis 11 with respect to the sphere center 202A for driving and rotating the movable unit in the panning direction 20, and a pair of tilting driving magnets 402 located symmetrically on the panning direction rotation axis 12 with respect to the sphere center 202A for driving and rotating the movable unit in the tilting direction 21. As shown in FIG. 1, these magnets are respectively fixed to contacting faces 102B (see FIG. 1) and contacting faces 102A which are provided on the first movable section 102. The panning driving magnets 401 are magnetized to one pole so as to have a magnetic flux in the direction of the tilting direction rotation axis 11, and similarly, the tilting driving magnets 402 are magnetized to one pole so as to have a magnetic flux in the direction of the panning direction rotation axis 12. Namely, different poles are located in the directions of the tilting direction rotation axis 11 and the panning direction rotation axis 12 by the panning driving magnets 401 and the tilting driving magnets 402.

A pair of panning magnetic yokes 203 and a pair of tilting magnetic yokes 204 are provided on a circumference of a circle on the base 200 centered around the optical axis 10 so as to face the pair of panning driving magnets 401 and the pair of tilting driving magnets 402 respectively.

Figure 6:
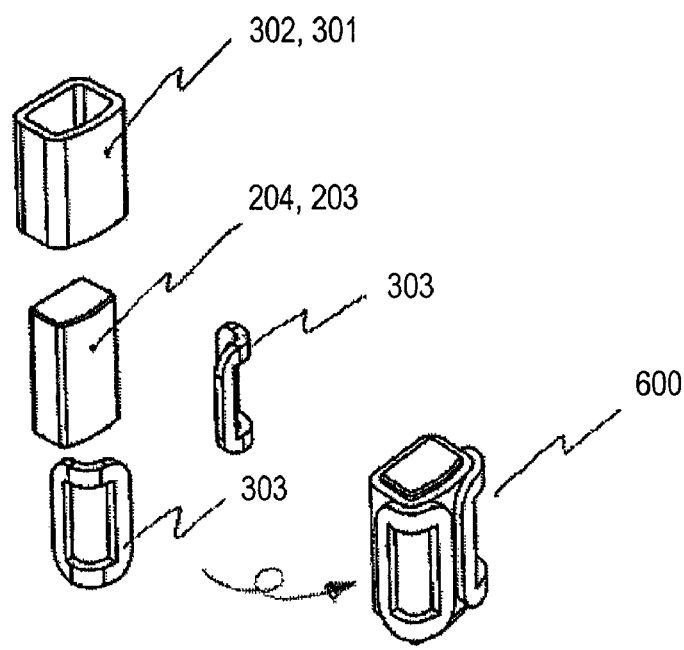
FIG. 6 is an exploded isometric view of driving coils and magnetic yokes in the camera driving apparatus in Embodiment 1.
Figure 7:
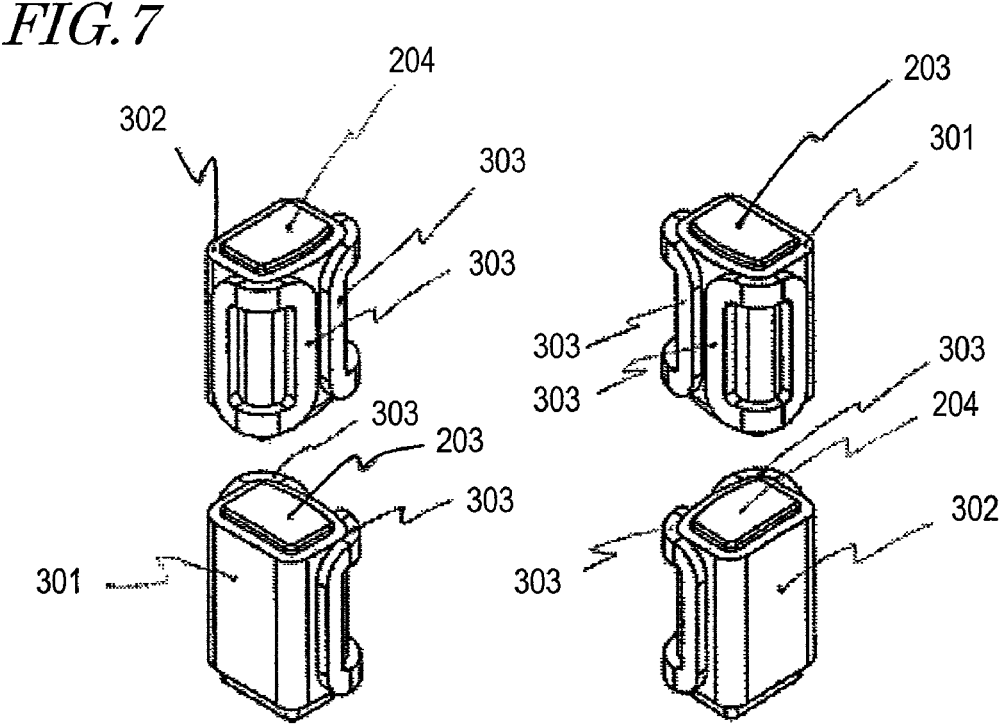
FIG. 7 is an isometric view of the driving coils and the magnetic yokes in the camera driving apparatus in Embodiment 1.

FIG. 6 and FIG. 7 are respectively an exploded isometric view and an isometric view of driving coils provided for the pair of panning magnetic yokes 203 and the pair of tilting magnetic yokes 204. As shown in FIG. 6 and FIG. 7, a panning driving coil 301 is wound around each of the pair of panning magnetic yokes 203, and a pair of rolling driving coils 303 are attached so as to be stacked on the panning driving coil 301. Similarly, a tilting driving coil 302 is wound around each of the pair of tilting magnetic yokes 204, and a pair of rolling driving coils 303 are attached so as to be stacked on the tilting driving coil 302. In other words, four coil units 600 each including the panning driving coil 301 or the tilting driving coil 302 and the pair of rolling driving coils 303 shown in FIG. 6 are located on a circumference of a circle centered around the optical axis 10 with an interval of 90 degrees.

As shown in FIG. 5, the height position of the center, in the direction of the optical axis 10, of the panning driving coils 301, the tilting driving coils 302 and the rolling driving coils 303 is generally equal to the height position of the sphere center 202A.

By electrifying the pair of panning driving coils 301, the pair of panning driving magnets 401 receive a couple electromagnetic force, and the first movable section 102, i.e., the movable unit is driven and rotated in the panning direction 20 around the panning direction rotation axis 12.

Similarly, by electrifying the pair of tilting driving coils 302, the pair of tilting driving magnets 402 receive a couple electromagnetic force, and the movable unit is driven and rotated in the tilting direction 21 around the tilting direction rotation axis 11.

By electrifying the panning driving coils 301 and the tilting driving coils 302 at the same time, the movable unit having the camera section 100 mounted thereon can be inclined two-dimensionally.

By electrifying the eight rolling driving coils 303 located on the circumference centered around the optical axis 10, the pair of panning driving magnets 401 and the pair of tilting driving magnets 402 receive a couple electromagnetic force, and the movable unit having the camera section 100 mounted thereon is driven and rotated in the rolling direction 22 around the optical axis 10.

In this manner, this embodiment adopts a moving magnet driving system in which the panning driving magnets 401 and the tilting driving magnets 402 are provided on the movable unit. This structure is generally considered to have a problem that the weight of the movable unit is increased. However, this structure does not require electric wiring for driving in the movable unit. In addition, this structure has a significant advantage that the heat of the panning driving coils 301, the tilting driving coils 302 and the rolling driving coils 303 can be cooled by the panning magnetic yokes 203, the tilting magnetic yokes 204, the base 200 and the connection sections 210. From the viewpoint of increasing the inclining angle in the panning direction 20 and the tilting direction 21 and the rotating angle in the rolling direction 22 to 10 degrees or greater, this embodiment is advantageous because the movable unit can be small and lightweight. By a moving coil driving system, the driving coils may be excessively large and thus the weight of the movable unit may be excessively increased.

In this embodiment, no exclusive driving magnet for driving in the rolling direction 22 is provided, and the panning driving magnets 401 and the tilting driving magnets 402 also act as the driving magnets for driving in the rolling direction 22. This can reduce the weight of the movable unit and also decrease the number of components.

Now, a function of returning the movable unit to a neutral position using the magnetic attracting force F will be described. As shown in FIG. 4 and FIG. 6, the side faces of the panning magnetic yokes 203 and the tilting magnetic yokes 204 facing the optical axis 10 each have a shape of a partial cylinder side face which is convexed toward the optical axis 10. Therefore, when the rotating angle in the rolling direction 22 is 0 degrees, a magnetic gap between each panning driving magnet 401 and a corresponding panning magnetic yoke 203 and a magnetic gap between each tilting driving magnet 402 and a corresponding tilting magnetic yoke 204 is each minimum. Accordingly, when the rolling driving coils 303 are not electrified, the movable unit can be kept at a neutral position in the rolling direction 22, namely, at a position where the panning driving magnets 401 and the tilting driving magnets 402 are respectively closest to the panning magnetic yokes 203 and the tilting magnetic yokes 204 by a magnetic spring effect using a change of the magnetic attracting force.

Similarly, the side faces of the panning driving magnets 401 and the tilting driving magnets 402 facing the panning magnetic yokes 203 and the tilting magnetic yokes 204 may each have a shape of a convexed partial spherical face (not shown) which is centered around one point on the lines of the tilting direction rotation axis 11 and the panning direction rotation axis 12. In this case, when the rotating angle in the panning direction 20, the tilting direction 21 and the rolling direction 22 is 0 degrees, a magnetic gap between each panning driving magnet 401 and a corresponding panning magnetic yoke 203 and a magnetic gap between each tilting driving magnet 402 and a corresponding tilting magnetic yoke 204 is each minimum. Accordingly, when neither the panning magnetic yokes 203 nor the tilting magnetic yokes 204 are electrified, the movable unit can be kept at a neutral position in the panning direction 20 and the tilting direction 21 in addition to the rolling direction 22, namely, at a position where the face of the movable unit perpendicular to the optical axis 10 is horizontal, by a magnetic spring effect using a change of the magnetic attracting force.

As described above, in this embodiment, the camera section 100, the second movable section 101, the fall preventive regulation face 101A provided on the second movable section 101, the convexed spherical face 201A provided on the protrusion supporting section 201, the first movable section 102 and the attracting magnet 404 all have a central axis matching the optical axis 10 passing the sphere center 202A, which is the supporting center and also is the driving center, and are located in this order. Therefore, the center of gravity of the movable unit matches the sphere center 202A, and so the movable unit can be supported at the center of gravity, and also the rotations around three axes which pass the center of gravity and are perpendicular to one another can be realized. In addition, the movable unit can be prevented from falling.

Figure 8:
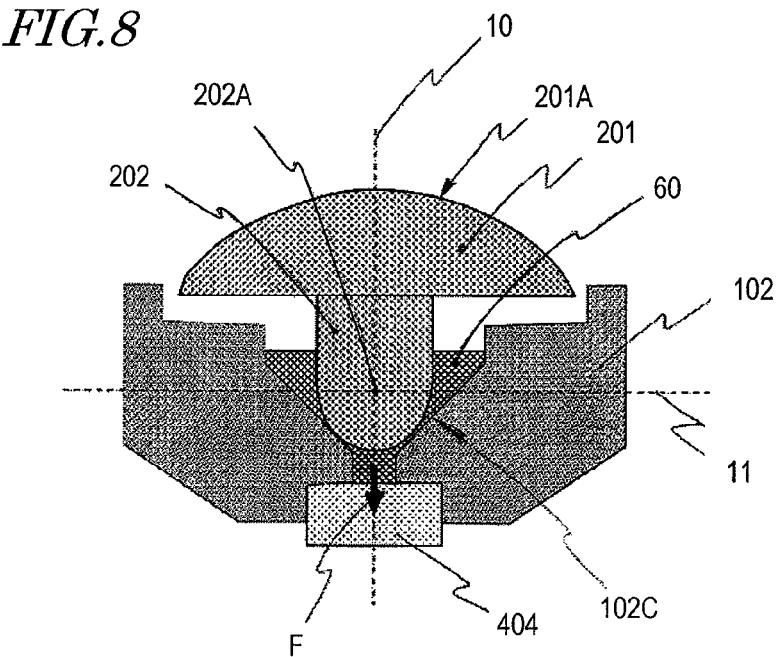
FIG. 8 is an enlarged schematic cross-sectional view of a protrusion section and the vicinity thereof.

The camera driving apparatus 151 may include a viscous member 60 for decreasing the amplitude increase coefficient (Q factor) of the movable unit. In this case, as shown in FIG. 8, the viscous member 60 is provided on the conical contact face 102C and in the vicinity of the conical contact face 102C. Owing to this, the amplitude increase coefficient (Q factor) of vibration caused by a magnetic spring effect using a change of the magnetic attracting force generated between the panning driving magnets 401 and the tilting driving magnets 402 provided on the movable unit and the panning magnetic yokes 203 and the tilting magnetic yokes 204 provided on the base 200, and the Q factor of the inherent mechanical vibration, can be decreased, and thus a good control characteristic can be provided.

The first movable section 102 and the second movable section 101 form a closed space which is defined by the conical contact face 102C and the fall preventive regulation face 101A having a shape of a partial spherical face. Therefore, even when the movable unit is pivoted, the viscous member 60 provided to fill the inside space is unlikely to leak outside, and thus a good viscous attenuation characteristic can be maintained.

To the viscous member 60, a magnetic fluid may be added. In this case, the viscous member 60 combined with the magnetic fluid can be kept in the inside space formed by the contact face 102C more certainly by the magnetic attracting force F of the attracting magnet 404. In the case where the magnetic fluid has viscosity, only the magnetic fluid may be used instead of the viscous member 60.

In the entire area in which the movable unit is movable, the surfaces of areas among areas of the contact faces 102C and areas of the protrusion section 202 which do not contact each other may be roughed to be convexed and concaved (not shown). The convexed and concaved shape increases the contact area with the viscous member 60, which can increase the viscous resistance and thus can significantly improve the viscous attenuation characteristic.

Now, detection of the inclination and rotation of the movable unit will be described. The camera driving apparatus 151 includes a detector for detecting an inclining angle of the movable unit having the camera section 100 mounted thereon, and also a rotating angle of the movable unit around the lens optical axis 10, with respect to the fixed unit. Specifically, the camera driving apparatus 151 includes a first detection section for detecting a two-dimensional inclining angle of the movable unit, namely, an inclining angle in the panning direction 20 and the tilting direction 21, and a second detection section for detecting a rotating angle around the lens optical axis 10.

First, detection of an inclining angle of the movable unit in the panning direction 20 and the tilting direction 21 will be described. As shown in FIG. 1, the camera driving apparatus 151 includes a first magnetic sensor 501 as the first detection section for detecting an inclining angle of the movable unit. The first magnetic sensor 501 is capable of detecting inclination or rotation around two axes. The first magnetic sensor 501 is located to face the attracting magnet 404 magnetized to one pole in the direction of the optical axis 10 and is fixed to the base 200 via a circuit board 502.

Inside the first magnetic sensor 501, a pair of hole elements (not shown) are provided on the tilting direction rotation axis 11 symmetrically with respect to the optical axis 10, and a pair of hole elements (not shown) are provided on the panning direction rotation axis 12 symmetrically with respect to the optical axis 10. The first magnetic sensor 501 detects a change of the magnetic force of the attracting magnet 404 which is caused by an inclination motion of the movable unit in the panning direction 20 and the tilting direction 21 as a biaxial component, and thus can calculate a panning inclining angle and a tilting inclining angle.

As described above, in this embodiment, the attracting magnet 404 acts as a magnet for detecting inclining angles in addition to having a function of providing the magnetic attracting force F to the protrusion section 202. Therefore, the number of components can be decreased and the size of the apparatus can be reduced. In addition, the distance between the attracting magnet 404 and the sphere center 202A can be shorter, and thus the first magnetic sensor 501 can be reduced in size.

Figure 9:
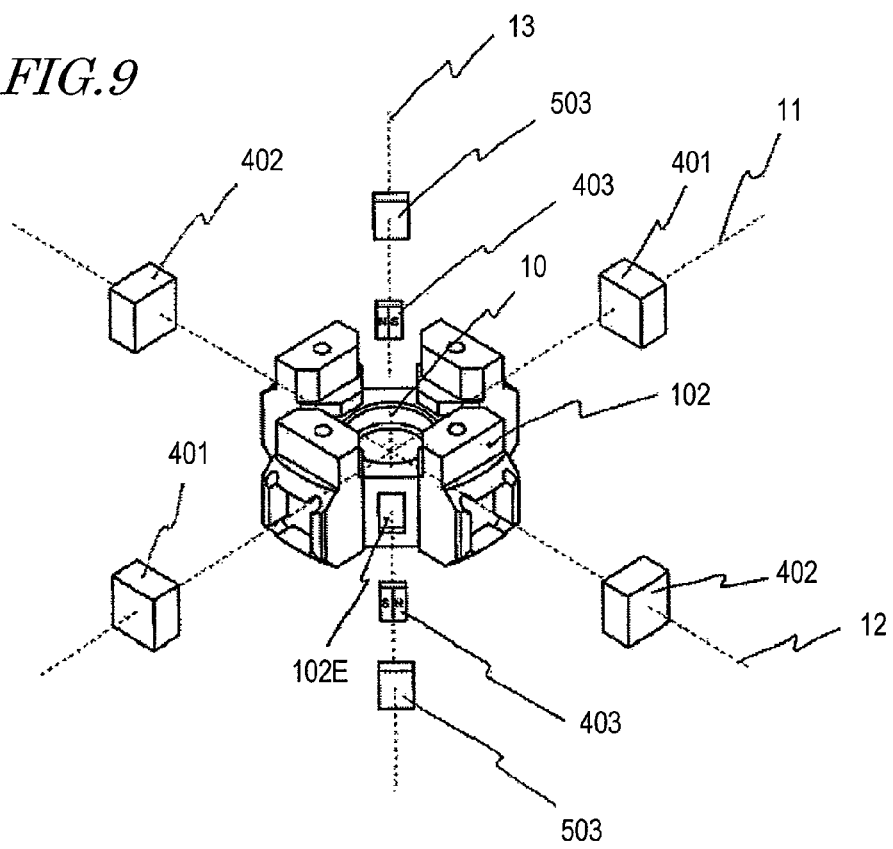
FIG. 9 is an isometric view showing a second detection section in the camera driving apparatus in Embodiment 1.

FIG. 9 is an isometric view showing locations of second magnetic sensors 503 as the second detection section for detecting a rotating angle of the movable unit around the optical axis 10. As shown in FIG. 9, the camera driving apparatus 151 includes a pair of second magnetic sensors 503 and a pair of rotation detection magnets 403. The first movable section 102 has contacting faces 102E provided on a straight line 13 which is perpendicular to the optical axis 10 and has an angle of 45 degrees with respect to the tilting direction rotation axis 11 or the panning direction rotation axis 12. The contacting faces 102E are symmetrical with respect to the sphere center 202A. On the contacting faces 102E, the pair of rotation detection magnets 403 are fixed.

The pair of rotation detection magnets 403 are magnetized on a plane perpendicular to the optical axis 10 to two poles in a divided manner in a circumferential direction of a circle centered around the optical axis 10. The pair of rotation detection magnets 403 are magnetized in a direction passing the sphere center 202A and are located to have different poles from each other. The two rotation detection magnetic sensors 503 are fixed to side faces of the connection sections 210 (FIG. 2) so as to face each other on the border between the magnetic poles of the pair of rotation detection magnets 403.

When the movable unit is rotated in the rolling direction 22, the magnetic poles of the pair of rotation detection magnets 403 move. This movement causes a drastic change of the magnetic force, and this change is detected by the second magnetic sensors 503. Owing to this, the rotating angle of the movable unit around the optical axis 10 can be detected at high precision.

When the first movable section 102 of the movable unit is inclined in the panning direction 20 and the tilting direction 21, a crosstalk output may be generated in the rolling direction 22. However, this crosstalk output can be canceled using an output obtained by the second magnetic sensors 503 detecting a change of the magnetic force of the pair of rotation detection magnets 403. Accordingly, only the rotating angle in the rolling direction 22 in the range in which the movable unit can be inclined can be accurately extracted and detected.

As shown in FIG. 1 and FIG. 9, the pair of second magnetic sensors 503 are located on the straight line 13 having an angle of 45 degrees with respect to the tilting direction rotation axis 11 or the panning direction rotation axis 12, on opposite sides with respect to the optical axis 10. Owing to this, it is possible to provide a driving section on a circumference of a circle having a large radius centered around the optical axis 10 to improve the driving moment and also to locate the second magnetic sensors 503 on a circumference of a circle having a small radius centered around the optical axis 10. Thus, the space can be effectively used.

As described above, the camera driving apparatus in this embodiment adopts a structure in which the sphere center of the partial spherical face provided on the protrusion section of the fixed unit and the central axis of the conical contact face of the movable unit are located on the lens optical axis of the camera section, and the two divided section of the movable unit are coupled to each other while sandwiching the protrusion section located therebetween. Therefore, a structure for supporting the movable unit at the center of gravity is realized, and so the mechanical resonance in the driving frequency band can be significantly suppressed.

In a pivot structure formed of the protrusion section and the contact face of the movable unit, a constant vertical drag can be provided by a magnetic attracting force which is unlikely to be influenced by the pivoting angle of the movable unit. Therefore, a fluctuation of the frictional load in accordance with the pivoting angle is reduced, and a good phase characteristic and a good gain characteristic are realized in the driving frequency band.

The two divided sections of the movable unit are coupled together in a plurality areas having no cross-section of the fixed unit. Therefore, the fixed unit and the movable unit avoid interfering with each other, which can reduce the height of the apparatus.

Conventionally, how to prevent the movable unit from falling due to an external disturbance such as vibration, impact or the like has been a serious problem specific to a supporting structure utilizing a magnetic attracting force. In order to solve this problem, a fall preventive regulation face is provided on one of the divided sections of the movable unit along a prescribed gap along which the movable unit is pivotable. Therefore, the movable unit can be prevented from falling with certainty while avoiding the apparatus from being increased in size.

In the movable unit, the fall preventive regulation face and the conical contact face are both located symmetrically on the lens optical axis as being centered around the sphere center. The sphere center of the partial curved face of the protrusion section for supporting the movable unit is located on the optical axis. Therefore, in the entire area in which the movable unit is pivotable, a concaved fall preventive regulation face can be provided with the minimum possible area size, which realizes the size reduction of the apparatus.

The position of the fall preventive regulation face is determined such that even if the movable unit falls from the fixed unit and the fixed unit contacts the fall preventive regulation face of the movable unit, the protrusion section in the fixed unit and the contact face of the movable unit are put into contact with each other again by the magnetic attracting force F to form a pivot structure. Therefore, a camera driving apparatus having a very high impact resistance can be provided, in which the movable unit, even if instantaneously falling, can be immediately returned to the original well-supported state.

The driving sections for driving in the panning and the tilting directions and for driving in the rolling direction are respectively located on two lines perpendicular to each other on a plane perpendicular to the optical axis. Each driving section includes two pairs of magnets fixed to the movable unit, and two pairs of driving coils located on a circumference of a circle centered around the optical axis, on a plane which is perpendicular to the optical axis and passes the rotation center of the movable unit, and provided on the fixed unit so as to face the magnets respectively. The height position of these components in the direction of the optical axis is generally equal to the height position of the sphere center of the protrusion section. Therefore, the movable unit can be driven mainly at the center of gravity, and the mechanical resonance in the driving frequency band can be significantly suppressed.

The side faces of the magnetic yokes facing the panning and tilting driving magnets are structured to be curved in a convexed manner. Owing to this, when the inclining angle and the rotating angle of the movable unit is 0 degrees, a magnetic spring acts to minimize the magnetic gap between the magnetic yokes and the driving magnets. This can return the movable unit to the neural position.

The side faces of the driving magnets facing the magnetic yokes are structured to be spherical in a convexed manner. Owing to this, when the inclining angle and the rotating angle of the movable unit is 0 degrees, a magnetic spring acts to minimize the magnetic gap between the magnetic yokes and the driving magnets. This can return the movable unit to the neural position.

The surface portion of the protrusion section is covered with a resin material and a magnetic member for providing a magnetic attracting force is provided inside. Owing to this, a supporting structure having a low friction and a high abrasion resistance is realized.

A viscous member or a viscous member containing a magnetic fluid is provided on the conical contact face of the movable unit and in the space in the vicinity of the protrusion section of the fixed unit. Owing to this, the amplitude increase coefficient (Q factor) of vibration caused by a magnetic spring effect provided by the magnetic attracting force generated between the magnets provided on the movable unit and the magnetic yokes provided on the fixed unit, and the Q factor of the inherent mechanical vibration, can be decreased, and thus a good control characteristic can be provided.

The first magnetic sensor is provided on the fixed unit so as to face the attracting magnet. Owing to this, a change of the magnetic force of the attracting magnet caused by the inclination and rotation of the movable unit is detected, and the inclining angle and the rotating angle can be calculated. Since the attracting magnet for supporting the fixed unit and the movable unit by a pivot structure is usable for detecting the angles, the number of components can be decreased and the apparatus can be reduced in size.

A pair of rotation detection magnets magnetized on a plane perpendicular to the optical axis to opposite poles to each other in a circumferential direction of a circle centered around the position of the optical axis are provided on the movable unit, and a change of the magnetic force is detected by a second magnetic sensor provided on the fixed unit. Using the output of this detection, the crosstalk output which is generated when the movable unit is pivoted in the panning direction and the tilting direction can be cancelled. Therefore, only the rotating angle in the rolling direction in the range in which the movable unit can be pivotable can be extracted and detected.

A pair of second magnetic sensors are located on a straight line having an angle of 45 degrees with respect to the tilting direction rotation axis or the panning direction rotation axis, on opposite sides with respect to the optical axis. Owing to this, it is possible to provide a driving section on a circumference of a circle having a large radius centered around the optical axis to improve the driving moment and also to locate the second magnetic sensors on a circumference of a circle having a small radius centered around the optical axis. Thus, the space can be effectively used.

A plurality of poles magnetized in the direction of the optical axis is provided on the attracting magnet. Owing to this, a change of the magnetic force caused by the inclination and rotation of the movable unit can be detected by the first and second magnetic sensors merely by the presence of the attracting magnet, and thus a two-dimensional inclining angle and a rotating angle can be calculated. This can decrease the number of components and reduce the size of the apparatus.

Accordingly, the camera driving apparatus in this embodiment allows the movable unit to incline at a large angle of ±10 degrees or greater in the panning direction and the tilting direction, and also to rotate at a large angle of ±10 degrees or greater in the rolling direction. In addition, good shake compensation control is realized in a wide frequency band of up to about 50 Hz. As a result, the camera driving apparatus realizes high-speed panning/tilting/rolling motions of the camera section and also can compensate for image blurring of a photo caused by camera-shake while the photographer is walking. Moreover, the camera driving apparatus has a compact and solid fall preventive structure and so is highly resistant against an external impact such as vibration, falling or the like.

Embodiment 2

Figure 10:
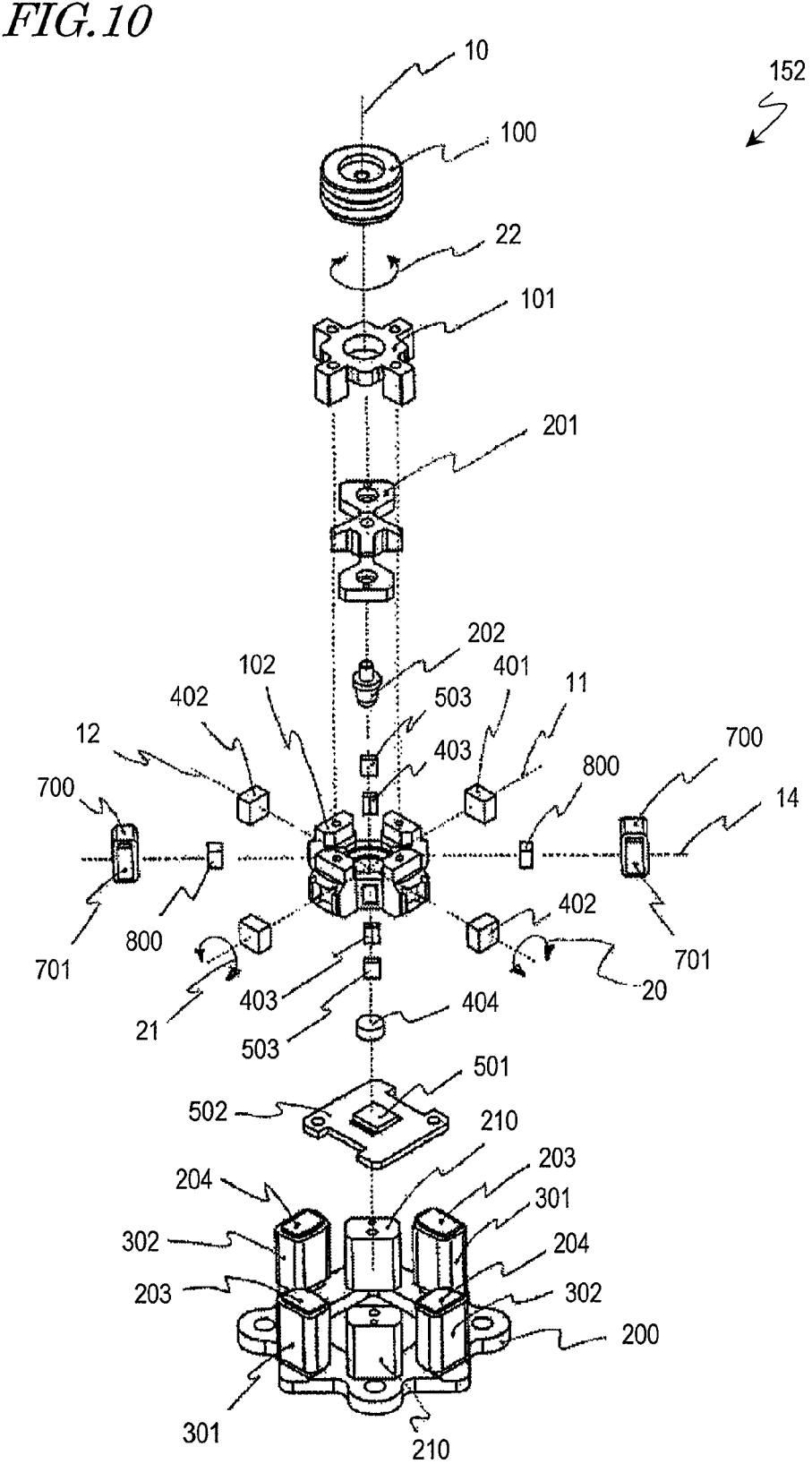
FIG. 10 is an exploded isometric view of a camera driving apparatus in Embodiment 2 according to the present invention.
Figure 11:
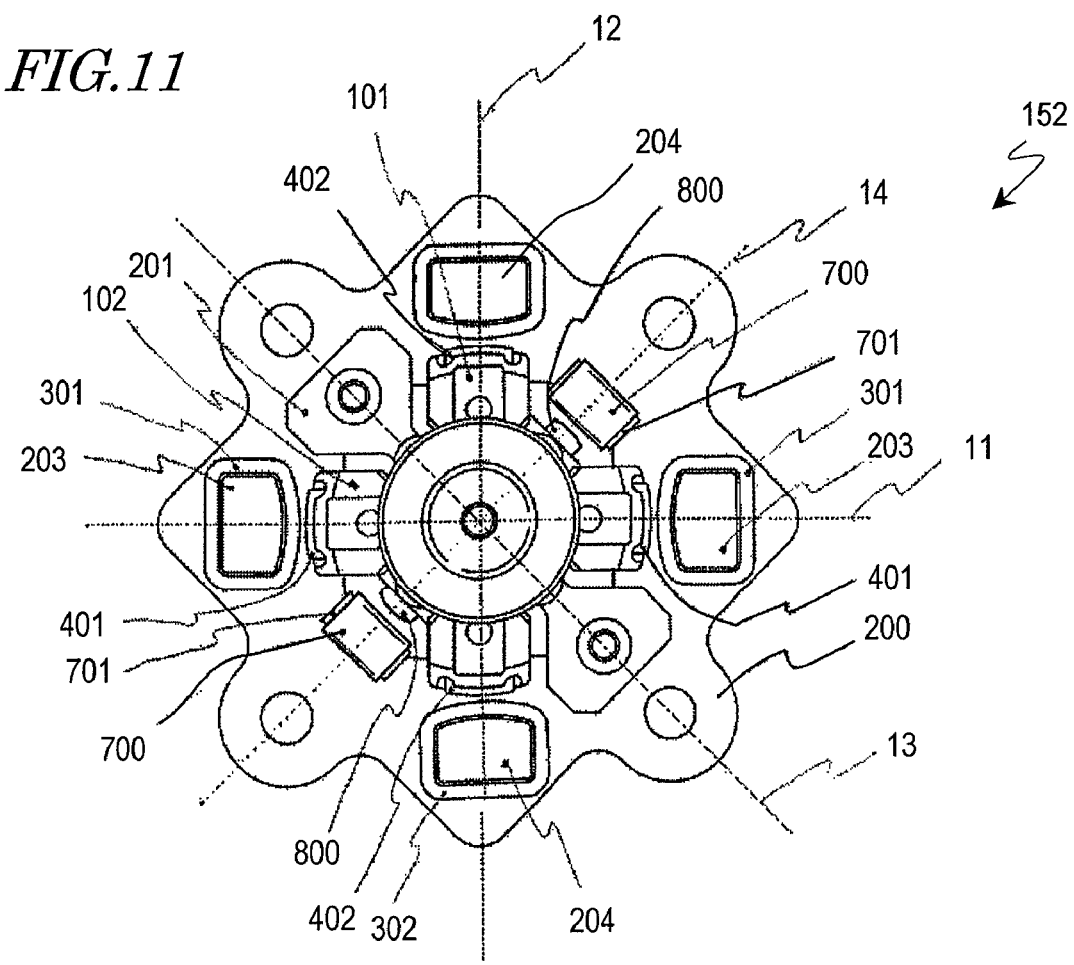
FIG. 11 is a plan view of the camera driving apparatus in Embodiment 2.

Hereinafter, a camera driving apparatus in Embodiment 2 according to the present invention will be described. FIG. 10 is an exploded isometric view showing a structure of a camera driving apparatus 152 in Embodiment 2 according to the present invention. FIG. 11 is a plan view of the camera driving apparatus 152. In these figures, identical elements as those of Embodiment 1 bear the identical reference numeral thereto.

As shown in FIG. 10 and FIG. 11, the camera driving apparatus 152 includes a driving section in the first movable section 102, exclusively for driving and rotating the movable unit in the rolling direction 22, unlike the camera driving apparatus 151 in Embodiment 1.

The camera driving apparatus 152 includes a pair of rolling driving magnets 800 and a pair of rolling magnetic yokes 701 for rotating the movable unit in the rolling direction 22.

The pair of rolling driving magnets 800 are located in the first movable section 102 so as be symmetrical with respect to the sphere center 202A on a straight line 14 which has an angle of 45 degrees with respect to the tilting direction rotation axis 11 and the panning direction rotation axis 12 and is perpendicular to the straight line 13. The rolling driving magnets 800 are magnetized to one pole so as to have a magnetic flux in the direction of the straight line 14. The pair of rolling magnetic yokes 701 are provided on a circumference of a circle on the base 200 centered around the optical axis 10 so as to face the pair of rolling driving magnets 800 respectively.

Rolling driving coils 700 are respectively wound around the pair of magnetic yokes 701. The rolling driving coils 700 are provided such that the winding central axis (not shown) of the rolling driving coils 700 is perpendicular to the winding central axis of the panning driving coils 301 and the tilting driving coils 302. In other words, on a circumference of a circle centered around the optical axis 10, the driving sections for driving in the panning direction and the tilting direction 21 and for driving in the rolling direction 22 are provided independently in a discrete manner.

According to such a structure, as compared with Embodiment 1, the gap between the panning magnetic yokes 203 and the panning driving magnets 401 and the gap between the tilting magnetic yokes 204 and the tilting driving magnets 402 can be smaller by the thickness of the rolling driving coils 303. This can increase the density of each magnetic flux and thus significantly improve the driving efficiency in the panning direction 20 and the tilting direction 21.

In addition, as compared with Embodiment 1, the magnetic saturation which would be caused by the rolling driving coils 303 can be alleviated. Therefore, the thickness of the panning magnetic yokes 203 and the tilting magnetic yokes 204 in the direction of the tilting direction rotation axis 11 and the panning direction rotation axis 12 can be further reduced, which decreases the size of the apparatus.

In Embodiments 1 and 2, the pair of rotation detection magnets 403 and the pair of second magnetic sensors 503 are provided to detect the rotating angle in the rolling direction 22. Alternatively, by magnetizing the attracting magnet 404 to a plurality of, at least four, poles on a plane perpendicular to the direction of the optical axis 10, the inclining angle in the panning direction 20 and the tilting direction 21 and the rotating angle in the rolling direction 22 can be detected by the first magnetic sensor 501. This allows omission of the provision of the rotation detection magnets 403 and the second magnetic sensors 503 and thus can significantly decrease the number of components.

Embodiment 3

Figure 12:
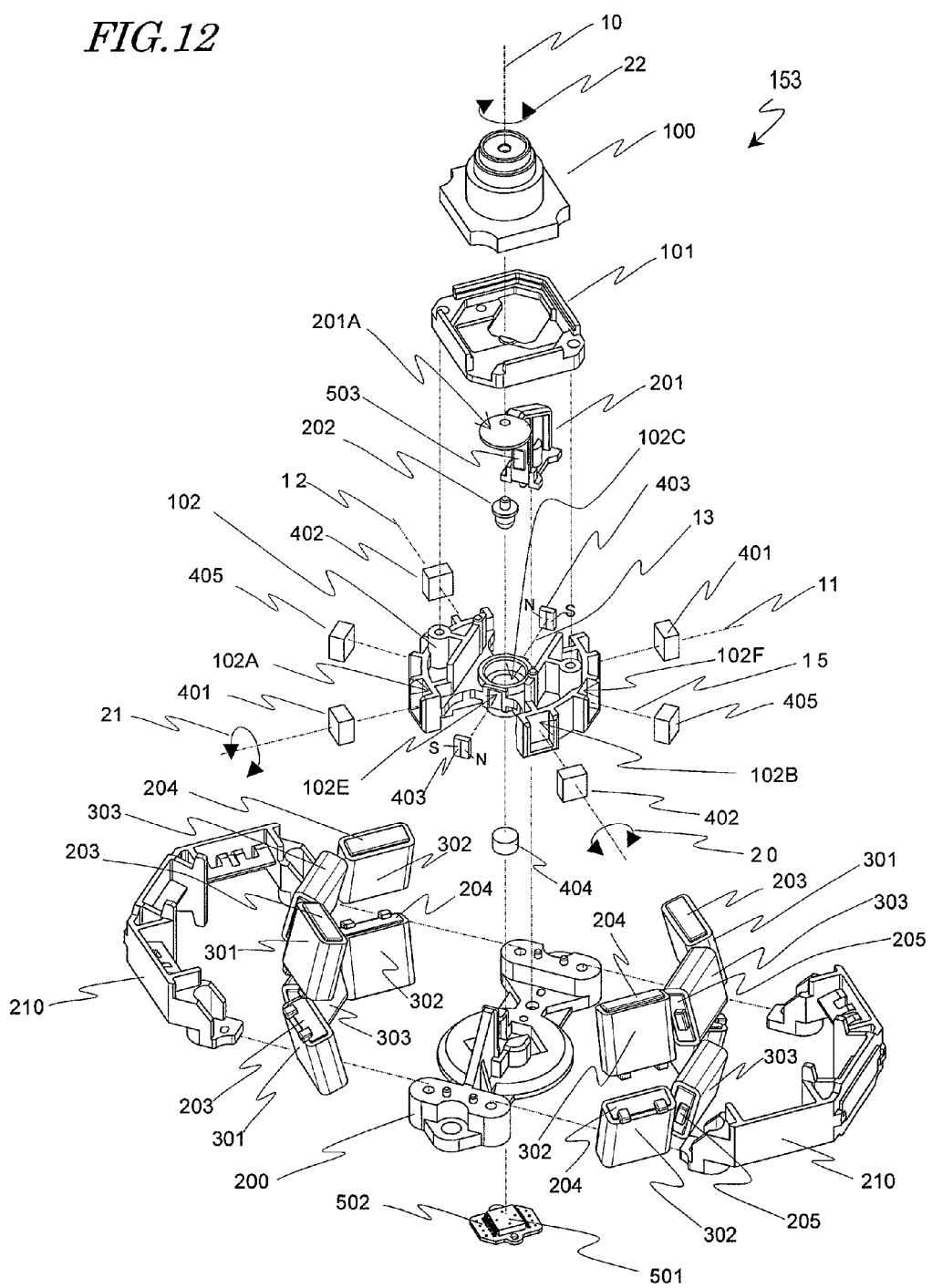
FIG. 12 is an exploded isometric view of a camera driving apparatus in Embodiment 3 according to the present invention.
Figure 13:
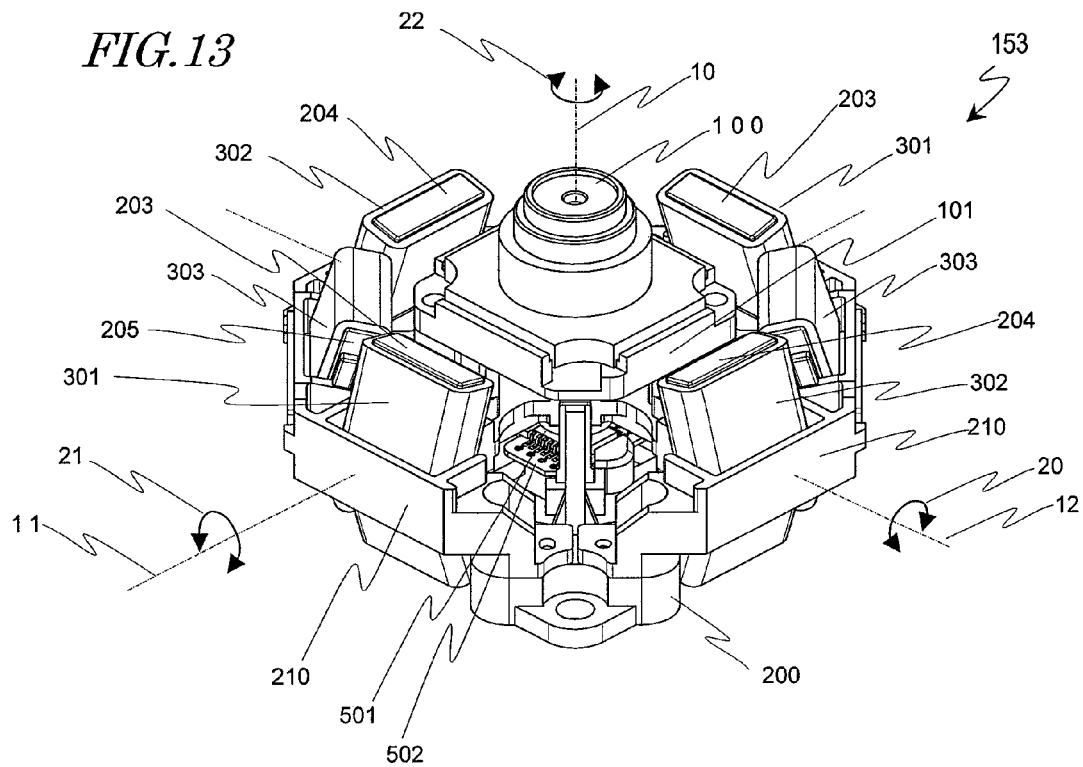
FIG. 13 is an isometric view of the camera driving apparatus in Embodiment 3 as seen from above obliquely.
Figure 14:
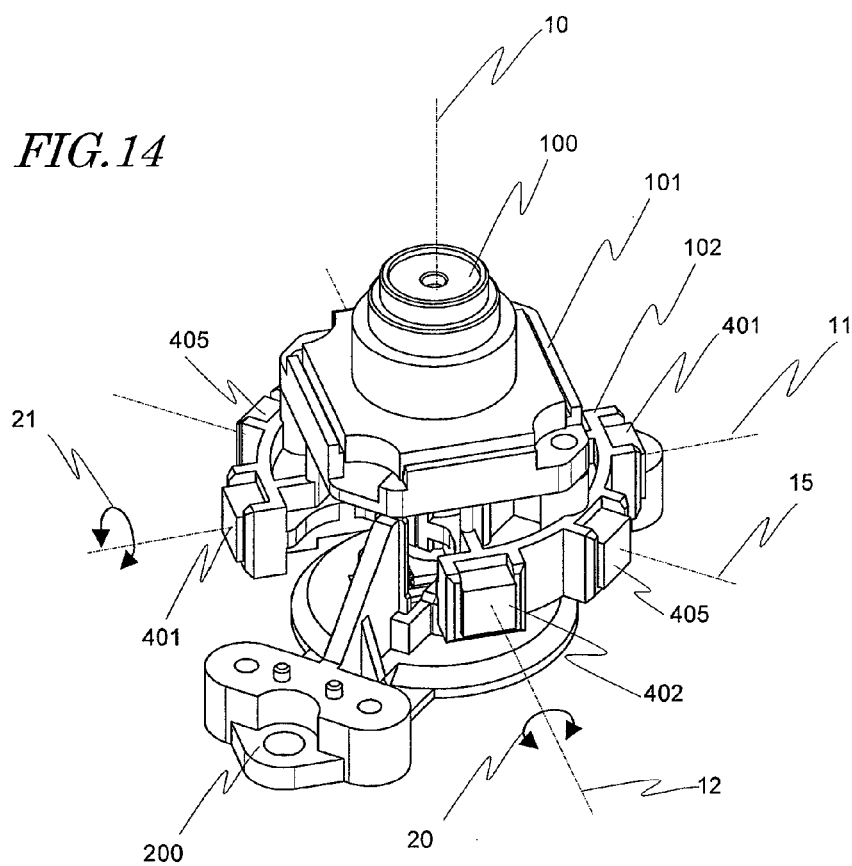
FIG. 14 is an isometric view of the camera driving apparatus in Embodiment 3 in a state where some of the elements are removed.
Figure 15:
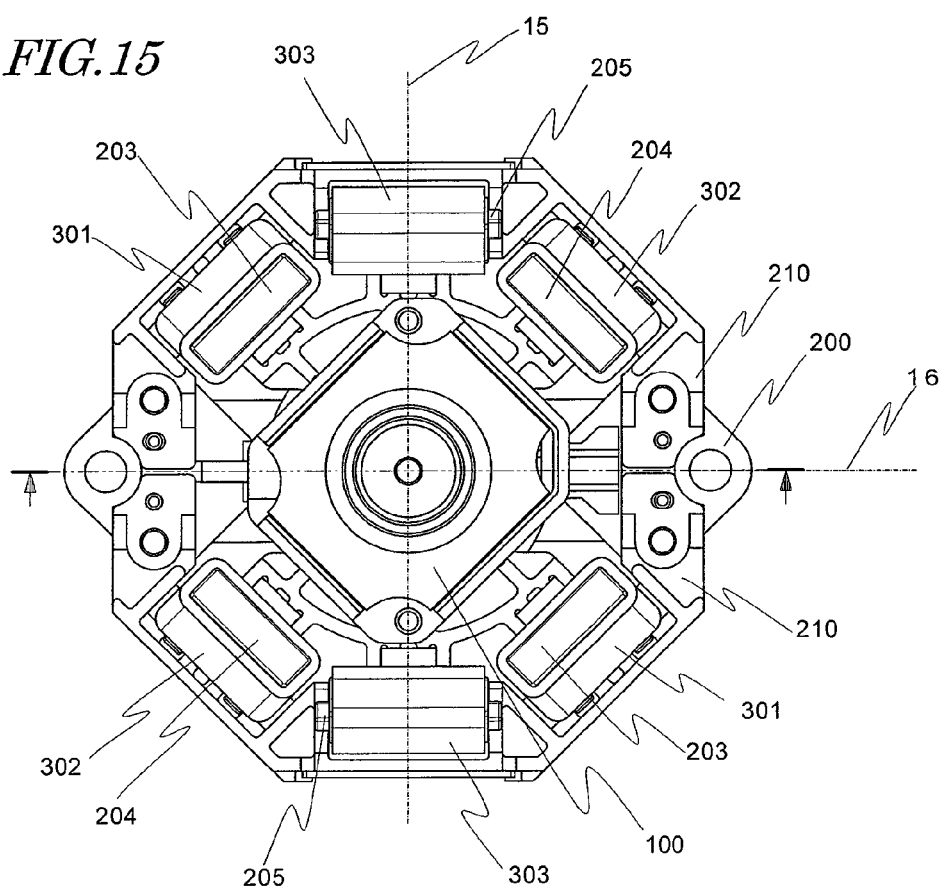
FIG. 15 is a plan view of the camera driving apparatus in Embodiment 3.
Figure 16:
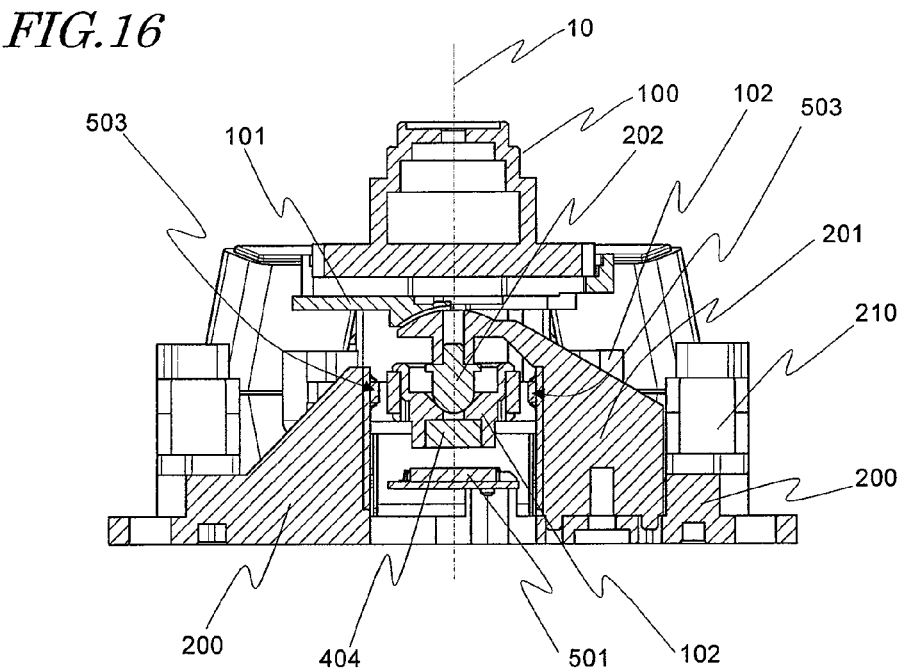
FIG. 16 is a cross-sectional view of the camera driving apparatus in Embodiment 3 taken along straight line 16 shown in FIG. 15.
Figure 17:
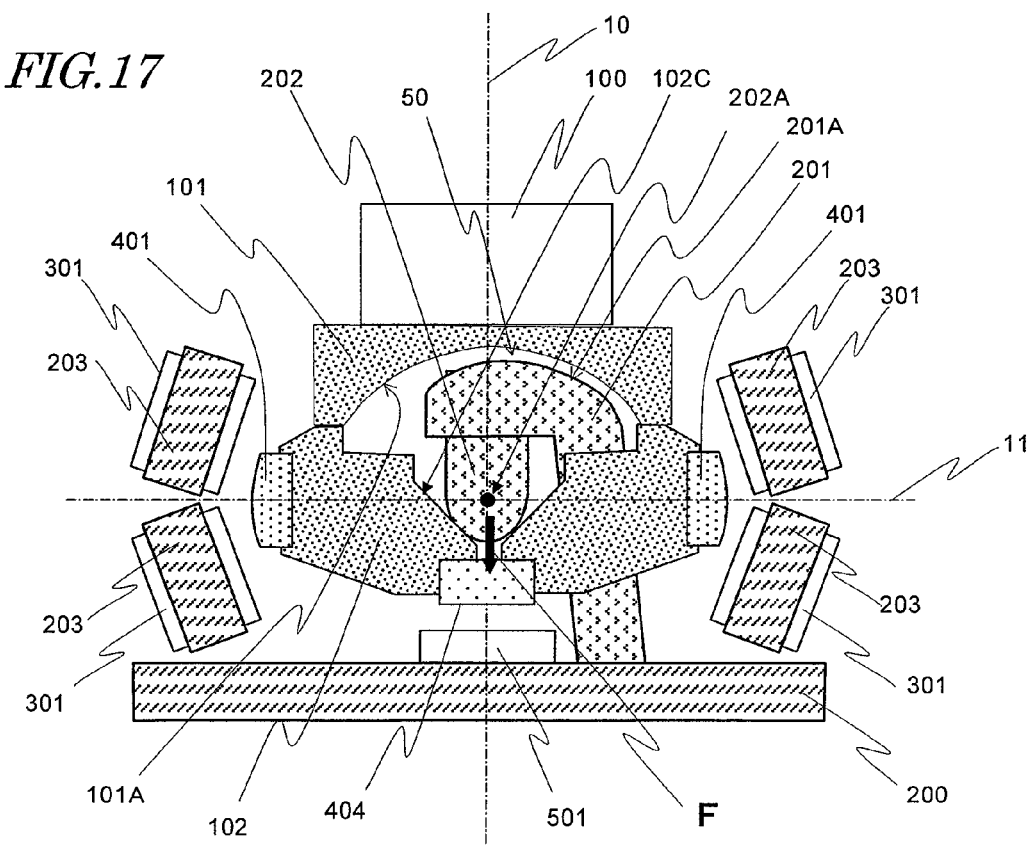
FIG. 17 is a schematic cross-sectional view of the camera driving apparatus in Embodiment 3 taken along straight line 16 shown in FIG. 15.

Hereinafter, a camera driving apparatus in Embodiment 3 according to the present invention will be described. FIG. 12 is an exploded isometric view of a camera driving apparatus 153 in Embodiment 3 according to the present invention. FIG. 13 is an isometric view of the camera driving apparatus 153 as seen from above obliquely. FIG. 14 is an isometric view of the camera driving apparatus 153 as seen from above obliquely. In FIG. 14, the camera driving apparatus 153 is in a state where some of the elements (panning driving coils 301, tilting driving coils 302, rolling driving coils 303, panning magnetic yokes 203, tilting magnetic yokes 204, connection section 210) are removed. FIG. 15 is a plan view of the camera driving apparatus 153. FIG. 16 is a cross-sectional view of the camera driving apparatus 153 taken along a plane including a straight line 16 shown in FIG. 15 and an optical axis 10. FIG. 17 is a schematic cross-sectional view of a main part of the camera driving apparatus 153 shown in FIG. 16. With reference to these figures, a main structure of the camera driving apparatus 153 will be described.

In the camera driving apparatus 153 in this embodiment, the protrusion supporting section and the magnetic yokes are different in shape from the corresponding elements in the camera driving apparatus 151 in Embodiment 1.

The camera driving apparatus 153 includes a camera section 100, and a movable unit for supporting the camera section 100, and a fixed unit. With respect to the fixed unit, the movable unit is freely rotatable in a rolling direction 22 around the lens optical axis 10 as the center of rotation, in a tilting direction 21 around a tilting direction rotation axis 11 as the center of rotation, and a panning direction 20 around a panning direction rotation axis 12 as the center of rotation.

As shown in FIG. 12, the camera section 100 includes an imaging element (not shown), a lens (not shown) for forming an image of a subject on an imaging plane of the imaging element, the lens having the optical axis 10, and a lens barrel (not shown) for holding the lens.

The fixed unit includes a base 200, a protrusion section 202, and a protrusion supporting section 201. The protrusion supporting section 201 is shaped like a cantilever beam and has the protrusion section 202 at an end. As shown in FIG. 17, the protrusion section 202 has a shape of at least a part of a spherical face having a sphere center 202A. Hereinafter, a portion having a shape of at least a part of the spherical face will be referred to as a "partial spherical face". At least a part of the protrusion section 202 is formed of a magnetic member. The protrusion supporting section 201 is fixed to the base 200.

The movable unit includes a first movable section 102 and a second movable section 101. As shown in FIG. 12 and FIG. 17, the first movable section 102 includes an attracting magnet 404 and a contact face 102C. The contact face 102C defines a conical space inside thereof and is located on the first movable section 102 such that a tip of the conical space is located on a lower side. The attracting magnet 404 is located at the tip of the conical space, which is also a bottom of the first movable section 102. Preferably, the first movable section 102 is formed of a non-magnetic member such as a resin material or the like.

As shown in FIG. 17, the protrusion section 202 of the fixed unit is inserted into the conical space inside the contact face 102C of the first movable section 102. The protrusion section 202 is partially formed of a magnetic member and so contacts the contact face 102C by a magnetic attracting force F of the attracting magnet 404 provided on the bottom of the first movable section 102 and thus is in loose engagement with the contact face 102C.

Owing to this, the first movable section 102 freely rotates around the sphere center 202A of the spherical face while the conical contact face 102C and a partial spherical face of the protrusion section 202 are in contact with each other. More specifically, the first movable section 102 can rotate around the sphere center 202A, in two inclining directions, i.e., the panning direction 20 and the tilting direction 21, and also in the rolling direction 22. In the panning direction 20, the first movable section 102 can rotate around the panning direction rotation axis 12, which is perpendicular to the optical axis 10 and passes the sphere center 202A. In the tilting direction 21, the first movable section 102 can rotate around the tilting direction rotation axis 11, which is perpendicular to the optical axis 10 and the panning direction rotation axis 12. In the rolling direction 22, the first movable section 102 can rotate around the lens optical axis 10.

As shown in FIGS. 12 through 14 and 17, the second movable section 101 has the camera section 100 mounted thereon and is fixed to the first movable section 102. Specifically, the camera section 100 is fixed to the second movable section 101 such that the lens optical axis passes the center of the second movable section 101 and preferably matches the central axis of the conical contact face 102C. The second movable section 101 is coupled to the first movable section 102 in the state where the protrusion supporting section 201 is sandwiched therebetween, such that the second movable section 101 and the arch-like cantilever-beam-shape of the protrusion supporting section 201 of the fixed unit do not interfere with each other in a vertical direction. In this manner, the second movable section 101 is attached and fixed to the first movable section 102 in an area having no cross-section of the fixed unit. Therefore, the fixed unit and the movable unit avoid interfering with each other, which can reduce the height of the apparatus.

As described above, in this embodiment, the movable unit having the camera section 100 mounted thereon is supported by the fixed unit in a concentrated manner at the position of the center of gravity. Therefore, the frictional load can be reduced, and the mechanical resonance in a driving frequency band can be significantly suppressed.

The attracting magnet 404 provides a constant vertical drag between the protrusion section 202 and the conical contact face 102C by a constant magnetic attracting force F without being influenced by the pivoting angle. This can suppress a fluctuation of the frictional load in accordance with the pivoting angle and realize a good phase characteristic and a good gain characteristic in the driving frequency band.

In the case where a surface portion of the protrusion section 202 is covered with a resin material (not shown), the friction between the conical contact face 102C and the protrusion section 202 which are in contact with each other can be further reduced. This realizes a supporting structure having a high abrasion resistance.

The movable unit has a fall preventive structure so as not to fall from the fixed unit. As shown in FIG. 16 and FIG. 17, a prescribed gap 50 is provided between the second movable section 101 and the protrusion supporting section 201 in the direction of the optical axis 10, such that the second movable section 101 is freely pivotable with respect to the protrusion supporting section 201 in the entire area in which the second movable section 101 is movable. Specifically, the protrusion supporting section 201 has a convexed partial spherical face 201A centered around the sphere center 202A. The second movable section 101 has a fall preventive regulation face 101A having a shape of a concaved partial spherical face centered around the sphere center 202A. Between the partial spherical face 201A and the fall preventive regulation face 101A, the gap 50 is made in the state where the protrusion supporting section 201 of the fixed unit is in contact with the contact face 102C of the first movable section 102. The partial spherical face 201A and the fall preventive regulation face 101A each have a generally symmetrical shape with respect to the lens optical axis 10.

The gap 50 is set to have a distance with which even if the contact face 102C is separated from the protrusion section 202, the contact face 102C can be returned to the state of contacting the protrusion section 202 by the magnetic attracting force F of the attracting magnet 404. Namely, even in the state where the movable unit moves downward by a distance equal to the gap 50 and so the partial spherical face 201A contacts the fall preventive regulation face 101A, the movable unit can be returned by the magnetic attracting force F of the attracting magnet 404 to the original state where the contact face 102C is in contact with the protrusion section 202.

Owing to this, this embodiment can provide a camera driving apparatus having a high impact resistance, in which the movable unit, even if instantaneously falling from a prescribed position, can be immediately returned to the original well-supported state by the magnetic attracting force F of the attracting magnet 404.

In the case where the radius of the fall preventive regulation face 101A centered around the sphere center 202A is decreased to a minimum possible size, the space required to provide the fall preventive regulation face 101A can be reduced, which can contribute to the size reduction of the apparatus.

Now, a structure for driving the movable unit will be described. The camera driving apparatus 153 includes a first driving section for inclining the movable unit having the camera section 100 mounted thereon in the panning direction 20 and the tilting direction 21 with respect to the fixed unit, and a second driving section for rotating the camera section 100 in the rolling direction 22 around the lens optical axis 10 with respect to the fixed unit.

Figure 21:
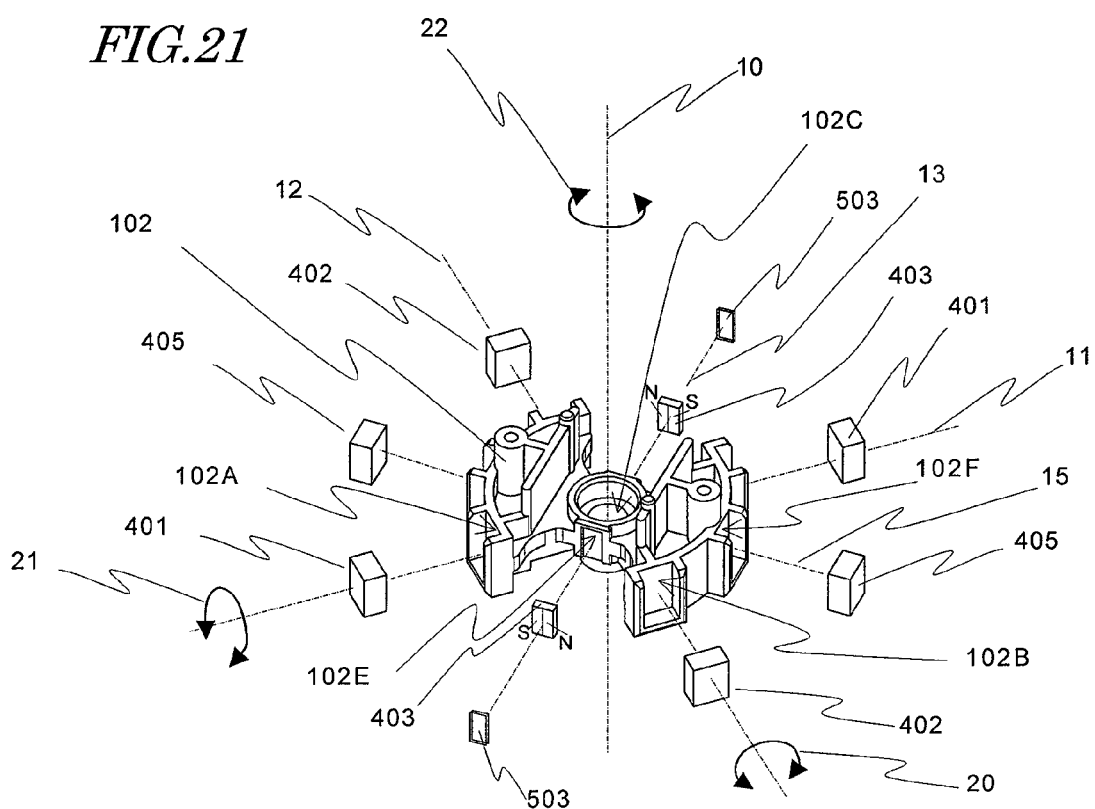
FIG. 21 is an isometric view showing a second detection section in the camera driving apparatus in Embodiment 3.

The first driving section includes two pairs of inclination driving magnets, eight magnetic yokes, and driving coils provided on the magnetic yokes. More specifically, as shown in FIG. 12 and FIG. 14, the first movable section 102 has, provided thereon, a pair of panning driving magnets 401 located symmetrically on the tilting direction rotation axis 11 with respect to the sphere center 202A for driving and rotating the movable unit in the panning direction 20, and a pair of tilting driving magnets 402 located symmetrically on the panning direction rotation axis 12 with respect to the sphere center 202A for driving and rotating the movable unit in the tilting direction 21. As shown in FIG. 12 and FIG. 21, these magnets are respectively fixed to contacting faces 102A and contacting faces 102B which are provided on the first movable section 102. The panning driving magnets 401 are magnetized to one pole so as to have a magnetic flux in the direction of the tilting direction rotation axis 11, and similarly, the tilting driving magnets 402 are magnetized to one pole so as to have a magnetic flux in the direction of the panning direction rotation axis 12. Namely, different poles are located in the directions of the tilting direction rotation axis 11 and the panning direction rotation axis 12 by the panning driving magnets 401 and the tilting driving magnets 402.

As shown in FIG. 12 and FIG. 13, a pair of panning magnetic yokes 203 are located in a V-shape while facing each of the pair of panning driving magnets 401. A pair of tilting magnetic yokes 204 are located in a V-shape while facing each of the pair of tilting driving magnets 402. Two pairs of panning magnetic yokes 203 are located such that trough portions of the V-shapes face each other. Two pairs of tilting magnetic yokes 204 are located such that trough portions of the V-shapes face each other. These magnetic yokes form a V-shape in order to keep the magnetic gaps uniform when the driving magnets are rotated.

Figure 18:
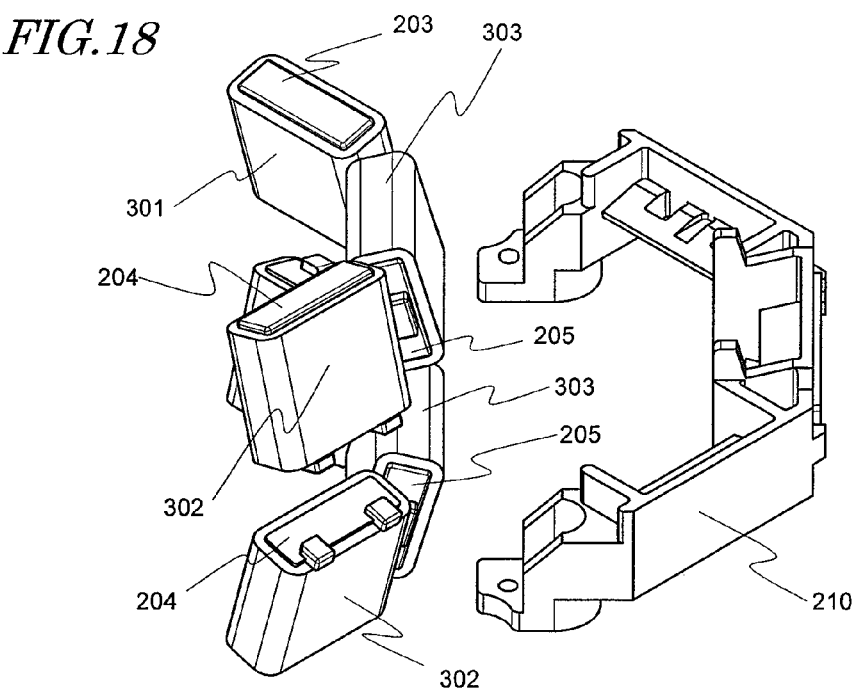
FIG. 18 is an exploded isometric view of driving coils and magnetic yokes in the camera driving apparatus in Embodiment 3.
Figure 19:
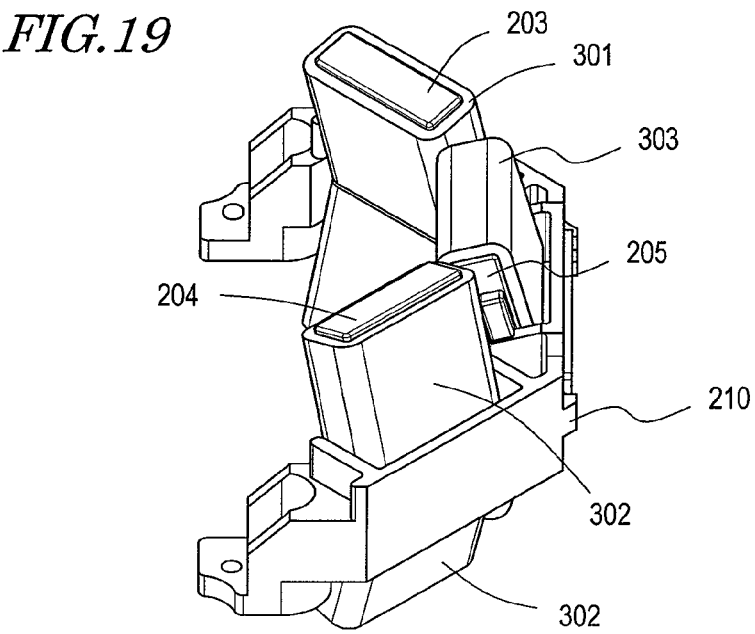
FIG. 19 is an isometric view of the driving coils and the magnetic yokes in the camera driving apparatus in Embodiment 3.

FIG. 18 and FIG. 19 are respectively an exploded isometric view and an isometric view showing driving coils provided on the pair of panning magnetic yokes 203 and the pair of tilting magnetic yokes 204. As shown in FIG. 18 and FIG. 19, a panning driving coil 301 is wound around the pair of panning magnetic yokes 203, and a tilting driving coil 302 is wound around the pair of tilting magnetic yokes 204. The magnetic yokes and the driving coils are fixed to the base 200 by the connection sections 210 so as to be located on a circumference of a circle centered around the optical axis 10. In this manner, the first driving section includes the two panning driving magnets 401, the two tilting driving magnets 402, and eight magnetic yokes (four magnetic yokes for the panning driving magnets, and four magnetic yokes for the tilting driving magnets) and the driving coils.

Now, the second driving section for driving and rotating the movable unit in the rolling direction 22 will be described. As shown in FIG. 12 and FIG. 14, the first movable section 102 has, provided thereon, a pair of rolling driving magnets 405 located symmetrically with respect to the sphere center 202A on a straight line 15 having an angle of 45 degrees with respect to the panning direction 20 or the tilting direction 21. The pair of rolling driving magnets 405 are provided for driving and rotating the movable unit in the rolling direction 22 around the optical axis 10. The pair of rolling driving magnets 405 are fixed to contacting faces 102F provided on the movable section 102. The rolling driving magnets 405 are magnetized to one pole so as to have a magnetic flux in the direction of the straight line 15.

As shown in FIGS. 12, 13, 18 and 19, a pair of rolling magnetic yokes 205 are located in a V-shape while facing the pair of rolling driving magnets 405. The pair of rolling magnetic yokes 205 are located such that trough portions of the V-shapes face each other. The rolling magnetic yokes form a V-shape in order to keep the magnetic gaps uniform when the rolling driving magnets 405 are rotated. A rolling driving coil 303 is wound around each of the pair of rolling magnetic yokes 205 so as to be perpendicular to the panning driving coils 301 and the tilting driving coils 302.

The panning magnetic yokes 203, the tilting magnetic yokes 204, the rolling magnetic yokes 205, the panning driving coils 301, the tilting driving coils 302, and the rolling driving coils 303 are fixed to the base 200 via the connection sections 210 so as to be located on a circumference of a circle centered around the optical axis 10.

The height position of the center, in the direction of the optical axis 10, of the panning driving coils 301, the tilting driving coils 302 and the rolling driving coils 303 is equal to the height position of the sphere center 202A of the protrusion section 202.

By electrifying the pair of panning driving coils 301, the pair of panning driving magnets 401 receive a couple electromagnetic force, and the first movable section 102, namely, the movable unit is driven and rotated in the panning direction 20 around the panning direction rotation axis 12.

Similarly, by electrifying the pair of tilting driving coils 302, the pair of tilting driving magnets 402 receive a couple electromagnetic force, and the movable unit is driven and rotated in the tilting direction 21 around the tilting direction rotation axis 11.

By electrifying the panning driving coils 301 and the tilting driving coils 302 at the same time, the movable unit having the camera section 100 mounted thereon can be inclined two-dimensionally.

By electrifying the pair of rolling driving coils 303, the pair of rolling driving magnets 405 receive a couple electromagnetic force, and the movable unit having the camera section 100 mounted thereon is driven and rotated in the rolling direction 22 around the optical axis 10.

In this manner, this embodiment adopts a moving magnet driving system in which the panning driving magnets 401, the tilting driving magnets 402 and the rolling driving magnets 405 are provided on the movable unit. This structure is generally considered to have a problem that the weight of the movable unit is increased. However, this structure does not require electric wiring for driving in the movable unit. In addition, this structure has a significant advantage that the heat of the panning driving coils 301, the tilting driving coils 302 and the rolling driving coils 303 can be cooled by the panning magnetic yokes 203, the tilting magnetic yokes 204, the rolling magnetic yokes 205, the base 200 and the connection sections 210.

From the viewpoint of increasing the inclining angle in the panning direction 20 and the tilting direction 21 and the rotating angle in the rolling direction 22 to 20 degrees or greater, this embodiment is advantageous because the movable unit can be small and lightweight. By a moving coil driving system, the driving coils may be excessively large and thus the weight of the movable unit may be excessively increased.

In this embodiment, exclusive driving magnets and magnetic circuits are provided independently for driving in the panning direction 20, the tilting direction 21 and the rolling direction 22. Therefore, as compared with the structure in which the same driving components are used for driving in different directions, the driving efficiency of the movable unit can be improved.

As shown in FIG. 17, the side faces of the panning driving magnets 401, the tilting driving magnets 402 and the rolling driving magnets 405 are structured to have a shape of a convexed partial spherical face centered around the sphere center 202A. Owing to this, the magnetic gaps formed by these driving magnets, the panning driving yokes 203, the tilting driving yokes 204 and the rolling driving yokes 205 can be uniform, and so a change of the magnetic attracting force can be suppressed.

In addition, the side surfaces of the panning magnetic yokes 203, the tilting magnetic yokes 204 and the rolling magnetic yokes 205 for rolling facing the panning driving magnets 401, the tilting driving magnets 402 and the rolling driving magnets 403 each have a shape of a concaved partial spherical face centered around the sphere center 202A. Owing to this, a change of the magnetic attracting force can be further suppressed.

As described above, in this embodiment, the camera section 100, the second movable section 101, the fall preventive regulation face 101A provided on the second movable section 101, the convexed spherical face 201A provided on the protrusion supporting section 201, the first movable section 102 and the attracting magnet 404 all have a central axis matching the optical axis 10 passing the sphere center 202A, which is the supporting center and also is the driving center, and are located in this order. Therefore, the center of gravity of the movable unit matches the sphere center 202A, and so the movable unit can be supported at the center of gravity, and also the rotations around three axes which pass the center of gravity and are perpendicular to one another can be realized. In addition, the movable unit can be prevented from falling.

Figure 20:
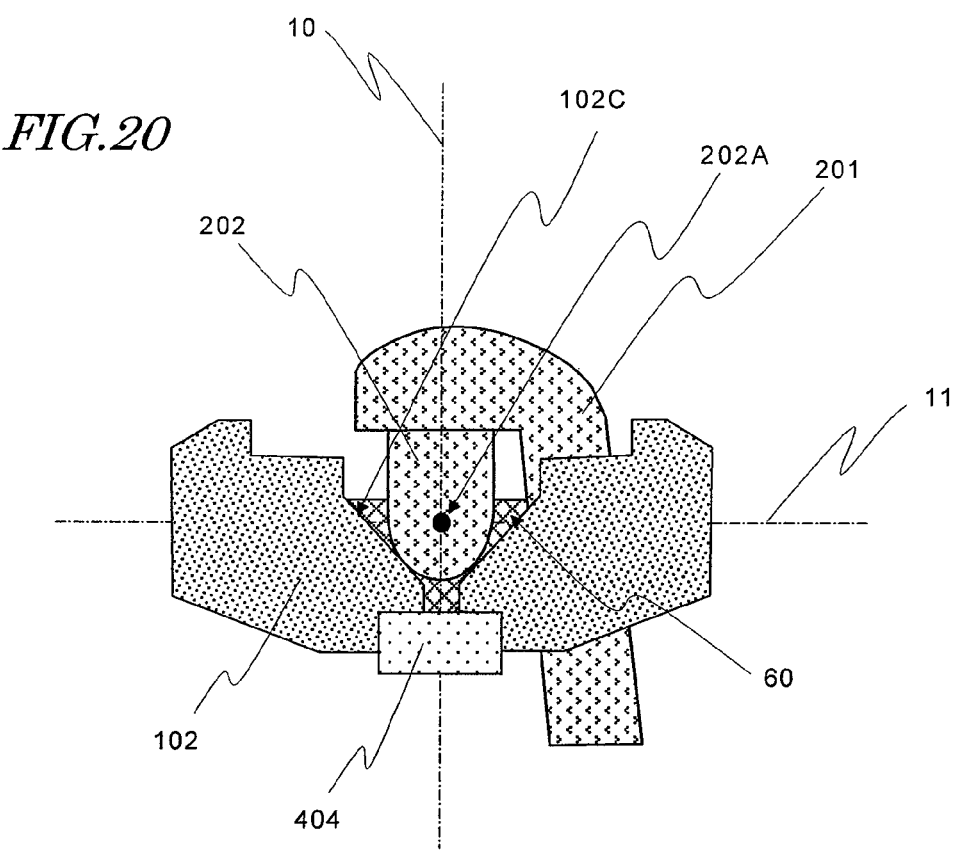
FIG. 20 is an enlarged schematic cross-sectional view of a protrusion section and the vicinity thereof.

The camera driving apparatus 153 may include a viscous member 60 for decreasing the amplitude increase coefficient (Q factor) of the movable unit. In this case, as shown in FIG. 20, the viscous member 60 is provided on the conical contact face 102C and in the vicinity of the conical contact face 102C. Owing to this, the amplitude increase coefficient (Q factor) of vibration caused by a magnetic spring effect using a change of the magnetic attracting force generated between the panning driving magnets 401 and the tilting driving magnets 402 provided on the movable unit and the panning magnetic yokes 203 and the tilting magnetic yokes 204 provided on the base 200, and the Q factor of the inherent mechanical vibration, can be decreased, and thus a good control characteristic can be provided.

The first movable section 102 and the second movable section 101 form a closed space which is defined by the conical contact face 102C and the fall preventive regulation face 101A having a shape of a partial spherical face. Therefore, even when the movable unit is pivoted, the viscous member 60 provided to fill the inside space is unlikely to leak outside, and thus a good viscous attenuation characteristic can be maintained.

To the viscous member 60, a magnetic fluid may be added. In this case, the viscous member 60 combined with the magnetic fluid can be kept in the inside space formed by the contact face 102C more certainly by the magnetic attracting force F of the attracting magnet 404. In the case where the magnetic fluid has viscosity, only the magnetic fluid may be used instead of the viscous member 60.

In the entire area in which the movable unit is movable, the surfaces of areas among areas of the contact faces 102C and areas of the protrusion section 202 which do not contact each other may be roughed to be convexed and concaved (not shown). The convexed and concaved shape increases the contact area with the viscous member 60, which can increase the viscous resistance and thus can significantly improve the viscous attenuation characteristic.

Now, detection of the inclination and rotation of the movable unit will be described. The camera driving apparatus 153 includes a detector for detecting an inclining angle of the movable unit having the camera section 100 mounted thereon, and also a rotating angle of the movable unit around the lens optical axis 10, with respect to the fixed unit. Specifically, the camera driving apparatus 153 includes a first detection section for detecting the two-dimensional inclining angle of the movable unit, namely, an inclining angle in the panning direction 20 and the tilting direction 21, and a second detection section for detecting a rotating angle around the lens optical axis 10.

First, detection of an inclining angle of the movable unit in the panning direction 20 and the tilting direction 21 will be described. As shown in FIGS. 12, 13, 16 and 17, the camera driving apparatus 153 includes a first magnetic sensor 501 as the first detection section for detecting an inclining angle of the movable unit. The first magnetic sensor 501 is capable of detecting inclination or rotation around two axes. The first magnetic sensor 501 is located to face the attracting magnet 404 magnetized to one pole in the direction of the optical axis 10 and is fixed to the base 200 via a circuit board 502.

Inside the first magnetic sensor 501, a pair of hole elements (not shown) are provided on the tilting direction rotation axis 11 symmetrically with respect to the optical axis 10, and a pair of hole elements (not shown) are provided on the panning direction rotation axis 12 symmetrically with respect to the optical axis 10. The first magnetic sensor 501 detects a change of the magnetic force of the attracting magnet 404 which is caused by an inclination motion of the movable unit in the panning direction 20 and the tilting direction 21 as a biaxial component, and thus can calculate a panning inclining angle and a tilting inclining angle.

As described above, in this embodiment, the attracting magnet 404 acts as a magnet for detecting inclining angles in addition to having a function of providing the magnetic attracting force F to the protrusion section 202. Therefore, the number of components can be decreased and the size of the apparatus can be reduced. In addition, the distance between the attracting magnet 404 and the sphere center 202A can be shorter, and thus the first magnetic sensor 501 can be reduced in size.

FIG. 21 is an isometric view showing locations of second magnetic sensors 503 as the second detection section for detecting a rotating angle of the movable unit around the optical axis 10. As shown in FIG. 21, the camera driving apparatus 153 includes a pair of second magnetic sensors 503 and a pair of rotation detection magnets 403. The first movable section 102 has contacting faces 102E provided on a straight line 13 which is perpendicular to the optical axis 10 and has an angle of 45 degrees with respect to the tilting direction rotation axis 11 or the panning direction rotation axis 12. The contacting faces 102E are symmetrical with respect to the sphere center 202A. On the contacting faces 102E, the pair of rotation detection magnets 403 are fixed.

The pair of rotation detection magnets 403 are magnetized on a plane perpendicular to the optical axis 10 to two poles in a divided manner in a circumferential direction of a circle centered around the optical axis 10. The pair of rotation detection magnets 403 are magnetized to opposite poles to each other. The two rotation detection magnetic sensors 503 are fixed to side surface of the protrusion supporting section 201 and the base 200 (FIG. 12) so as to face each other on the border between the magnetic poles of the pair of rotation detection magnets 403.

When the movable unit is rotated in the rolling direction 22, the magnetic poles of the pair of rotation detection magnets 403 move. This movement causes a drastic change of the magnetic force, and this change is detected by the second magnetic sensors 503. Owing to this, the rotating angle of the movable unit around the optical axis 10 can be detected at high precision.

When the first movable section 102 of the movable unit is inclined in the panning direction 20 and the tilting direction 21, a crosstalk output may be generated in the rolling direction 22. However, this crosstalk output can be canceled using an output obtained by the second magnetic sensors 503 detecting a change of the magnetic force of the pair of rotation detection magnets 403. Accordingly, only the rotating angle in the rolling direction 22 in the range in which the movable unit can be inclined can be accurately extracted and detected.

As shown in FIGS. 12, 16 and 21, the pair of second magnetic sensors 503 are located on the straight line 13 having an angle of 45 degrees with respect to the tilting direction rotation axis 11 or the panning direction rotation axis 12, on opposite sides with respect to the optical axis 10. Owing to this, it is possible to provide a driving section on a circumference of a circle having a large radius centered around the optical axis 10 to improve the driving moment and also to locate the second magnetic sensors 503 on a circumference of a circle having a small radius centered around the optical axis 10. Thus, the space can be effectively used.

As described above, the camera driving apparatus in this embodiment adopts a structure in which the sphere center of the partial spherical face provided on the protrusion section of the fixed unit and the central axis of the conical contact face of the movable unit are located on the lens optical axis of the camera section, and the two divided sections of the movable unit are coupled to each other while sandwiching the protrusion section located therebetween. Therefore, a structure for supporting the movable unit at the center of gravity is realized, and so the mechanical resonance in the driving frequency band can be significantly suppressed.

In a pivot structure formed of the protrusion section and the contact face of the movable unit, a constant vertical drag can be provided by a magnetic attracting force which is unlikely to be influenced by the pivoting angle of the movable unit. Therefore, a fluctuation of the frictional load in accordance with the pivoting angle is reduced, and a good phase characteristic and a good gain characteristic are realized in the driving frequency band.

The two divided sections of the movable unit are coupled together in a plurality areas having no cross-section of the fixed unit. Therefore, the fixed unit and the movable unit avoid interfering with each other, which can reduce the height of the apparatus.

Conventionally, how to prevent the movable unit from falling due to an external disturbance such as vibration, impact or the like has been a serious problem specific to a supporting structure utilizing a magnetic attracting force. In order to solve this problem, a fall preventive regulation face is provided on one of the divided sections of the movable unit along a prescribed gap along which the movable unit is pivotable. Therefore, the movable unit can be prevented from falling with certainty while avoiding the apparatus from being increased in size.

In the movable unit, the fall preventive regulation face and the conical contact face are both located symmetrically on the lens optical axis. The sphere center of the partial curved face of the protrusion section for supporting the movable unit is located on the optical axis. Therefore, in the entire area in which the movable unit is pivotable, a concaved fall preventive regulation face can be provided with the minimum possible area size, which realizes the size reduction of the apparatus.

The position of the fall preventive regulation face is determined such that even if the movable unit falls from the fixed unit and the fixed unit contacts the fall preventive regulation face of the movable unit, the protrusion section in the fixed unit and the contact face of the movable unit are put into contact with each other again by the magnetic attracting force F to form a pivot structure. Therefore, a camera driving apparatus having a very high impact resistance can be provided, in which the movable unit, even if instantaneously falling, can be immediately returned to the original well-supported state.

The driving sections for driving in the panning and the tilting directions and for driving in the rolling direction are respectively located on two lines perpendicular to each other on a plane perpendicular to the optical axis. Each driving section includes two pairs of magnets fixed to the movable unit, and two pairs of driving coils located on a circumference of a circle centered around the optical axis, on a plane which is perpendicular to the optical axis and passes the rotation center of the movable unit, and provided on the fixed unit so as to face the magnets respectively. The height position of these components in the direction of the optical axis is generally equal to the height position of the sphere center of the protrusion section. Therefore, the movable unit can be driven mainly at the center of gravity, and the mechanical resonance in the driving frequency band can be significantly suppressed.

The protrusion supporting section is fixed to the base such that when the protrusion supporting section is projected on a plane perpendicular to the optical axis, the projection area is located on one straight line having an angle of 45 degrees with respect to the panning direction and the tilting direction as seen in the direction of the optical axis. The protrusion supporting section is shaped like a cantilever beam having a protrusion section at an end. Owing to this, the projection area of the protrusion section as seen in the direction of the optical axis can be reduced, and the area usable for the driving section for driving the movable unit can be enlarged.

Therefore, in this embodiment, the second driving section for rotating the movable unit in the rolling direction, namely, the rolling magnetic yokes and the rolling driving coils can also be located on the base, symmetrically on a circumference of a circle centered around the optical axis. The driving sections for driving in the panning and the tilting directions and for driving in the rolling direction are respectively located on two lines perpendicular to each other on a plane perpendicular to the optical axis. Each driving section includes two pairs of magnets fixed to the movable unit, and two pairs of driving coils located on a circumference of a circle centered around the optical axis, on a plane which is perpendicular to the optical axis and passes the rotation center of the movable unit, and provided on the fixed unit so as to face the magnets respectively. The height position of the centers of these components in the direction of the optical axis is generally equal to the height position of the sphere center of the protrusion section. Therefore, the movable unit can be driven mainly at the center of gravity, and the mechanical resonance in the driving frequency band can be significantly suppressed.

The panning driving section, the tilting driving section and the rolling driving section can be provided on a circumference of a circle centered around the optical axis, and thus the magnetic gaps formed of the magnets and the magnetic yokes of the driving sections can be set to have the same length. This can increase the density of each magnetic flux, and also improve and uniformize the driving efficiency in the panning, tilting and rolling directions.

Each pair of panning magnetic yokes, each pair of tilting magnetic yokes, and each rolling magnetic yoke are located generally in a V-shape. Each pair of magnetic yokes are located symmetrically with respect to the optical axis such that the trough portions of the V-shapes face each other. Therefore, even when the movable unit is inclined or rotated at a large angle, the magnetic gap between the driving magnets and the magnetic yokes can be small, which can improve the driving efficiency in the panning, tilting and tilting directions.

The side faces of the panning magnetic yokes, the tilting magnetic yokes and the rolling magnetic yokes facing the respective driving magnets each have a shape of a concaved partial spherical face centered around the center of the protrusion section. Owing to this, a fluctuation of the magnetic attracting force can be further suppressed.

The surface portion of the protrusion section is covered with a resin material and a magnetic member for providing a magnetic attracting force is provided inside. Owing to this, a supporting structure having a low friction and a high abrasion resistance is realized.

A viscous member or a viscous member containing a magnetic fluid is provided on the conical contact face of the movable unit and in the space in the vicinity of the protrusion section of the fixed unit. Owing to this, the amplitude increase coefficient (Q factor) of vibration caused by a magnetic spring effect provided by the magnetic attracting force generated between the magnets provided on the movable unit and the magnetic yokes provided on the fixed unit, and the Q factor of the inherent mechanical vibration, can be decreased, and thus a good control characteristic can be provided.

A change of the magnetic force of the attracting magnet for supporting the movable unit and the fixed unit by a pivot structure is detected by the first and second magnetic sensors. Thus, the inclining angle in the yawing direction and the tilting direction and the rotating angle in the rolling direction of the movable unit can be calculated. Therefore, there is no need to provide an additional magnet for detecting the rotating angle, which decreases the number of components and reduces the size of the apparatus.

The protrusion supporting section has a shape of a cantilever beam. Owing to this, for assembling the apparatus, the protrusion section can be inserted along the conical contact face provided on the movable unit. This allows the first and second movable sections to be integrally formed and so can decrease the number of components and improve the ease of assembly.

Accordingly, the camera driving apparatus in this embodiment allows the movable unit to incline at a large angle of ±20 degrees or greater in the panning direction and the tilting direction, and also to rotate at a large angle of ±20 degrees or greater in the rolling direction. In addition, good shake compensation control is realized in a wide frequency band of up to about 50 Hz. As a result, the camera driving apparatus realizes high-speed panning/tilting/rolling motions of the camera section and also can compensate for image blurring of a photo caused by camera-shake while the photographer is walking. Moreover, the camera driving apparatus has a compact and solid fall preventive structure and so is highly resistant against an external impact such as vibration, falling or the like.

Embodiment 4

Figure 22:
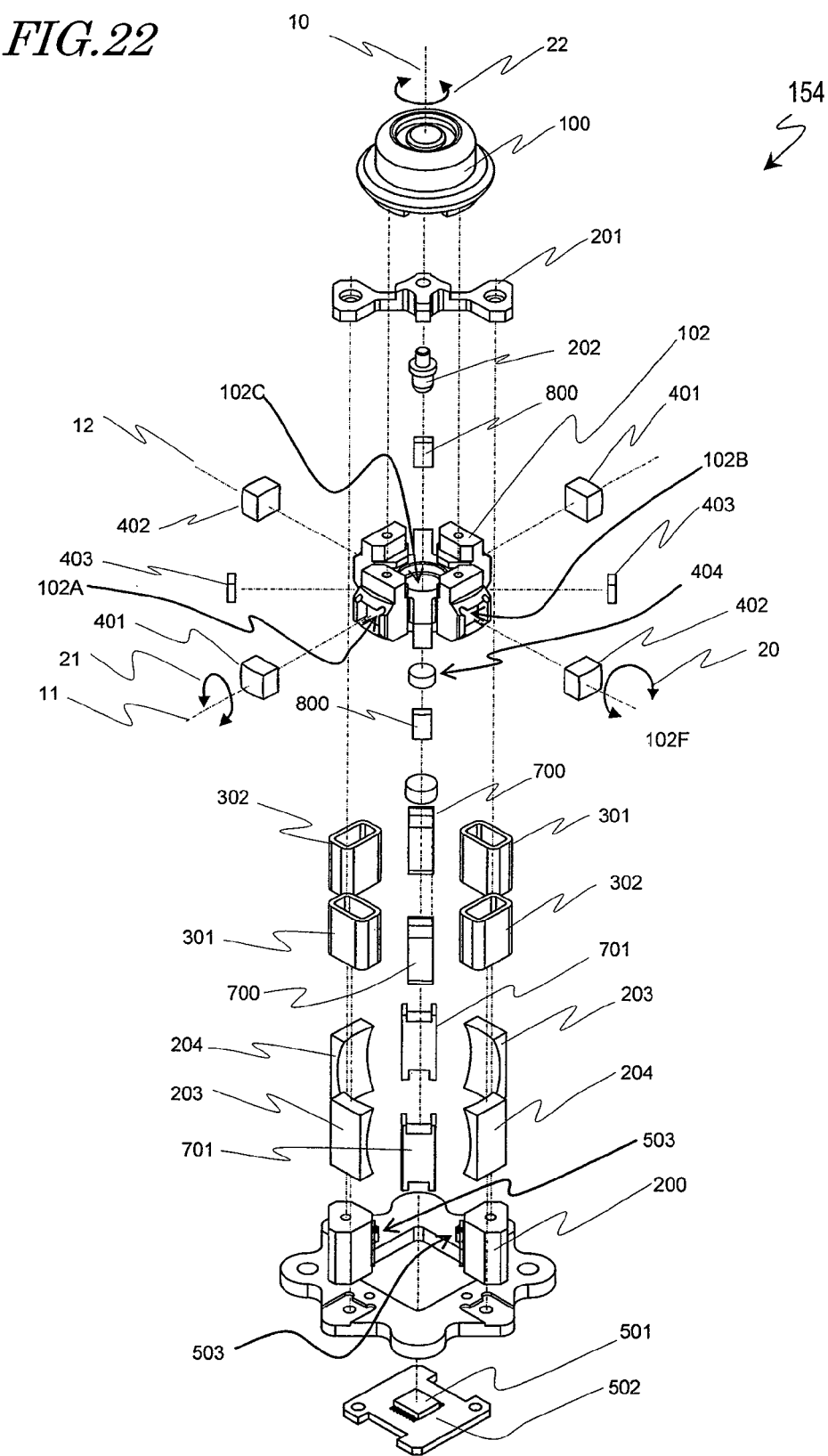
FIG. 22 is an exploded isometric view of a camera driving apparatus in Embodiment 4 according to the present invention.
Figure 23:
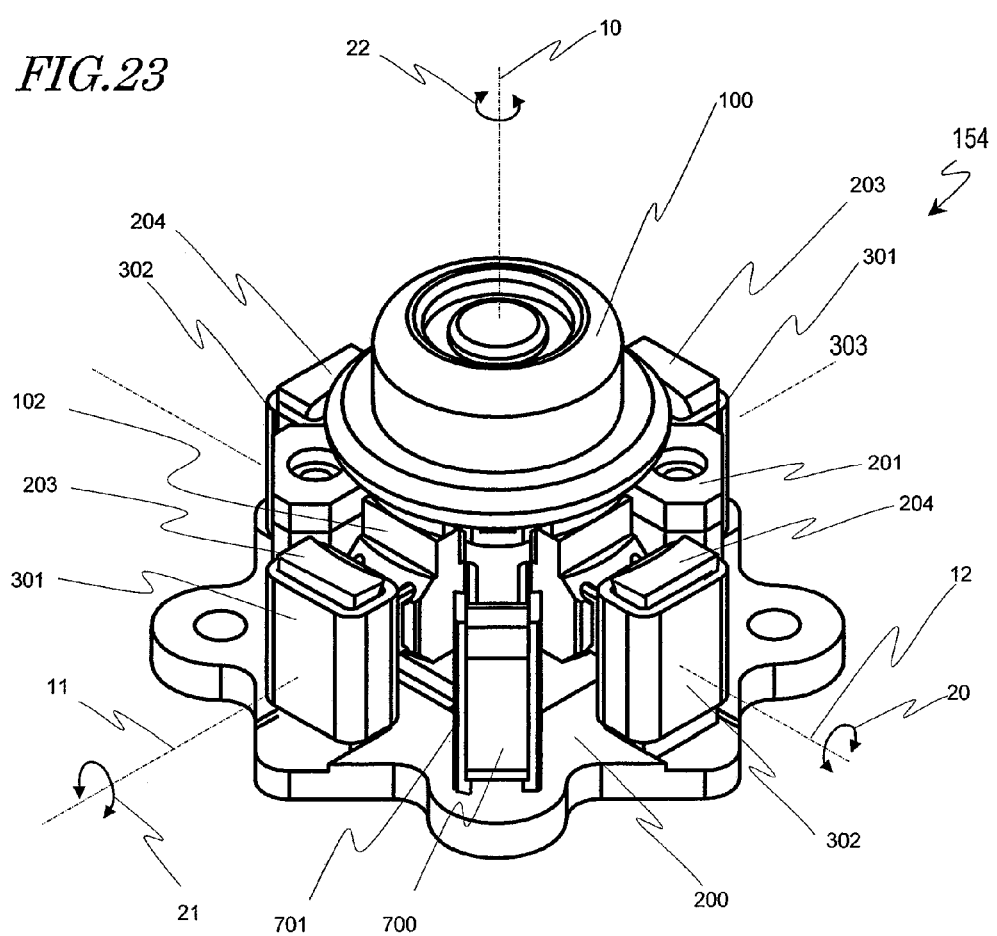
FIG. 23 is an isometric view of the camera driving apparatus in Embodiment 4 as seen from above obliquely.
Figure 24:
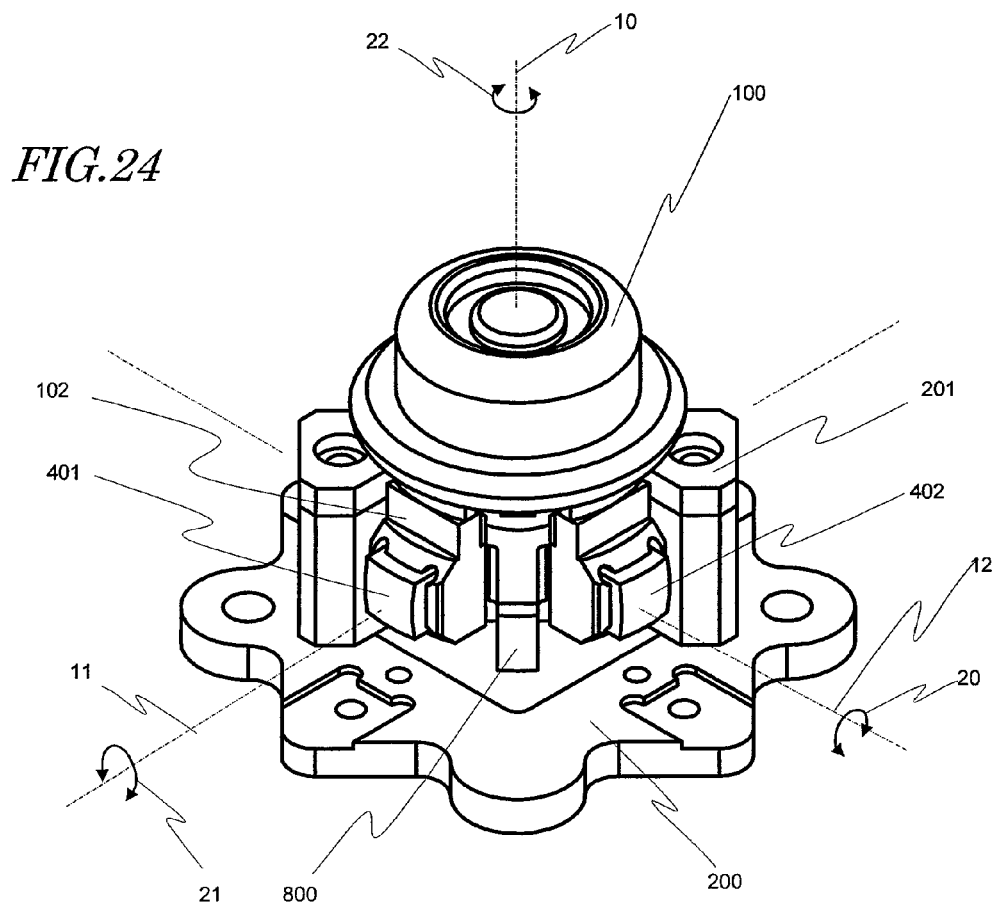
FIG. 24 is an isometric view of the camera driving apparatus in Embodiment 4 in a state where some of the elements are removed.
Figure 25:
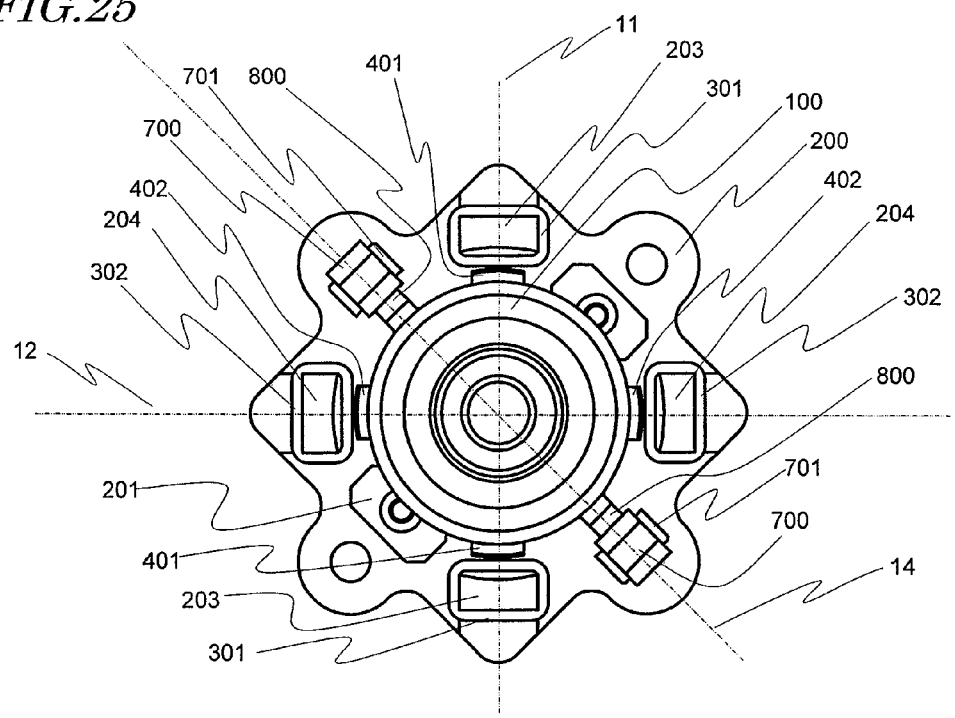
FIG. 25 is a plan view of the camera driving apparatus in Embodiment 4.
Figure 26:
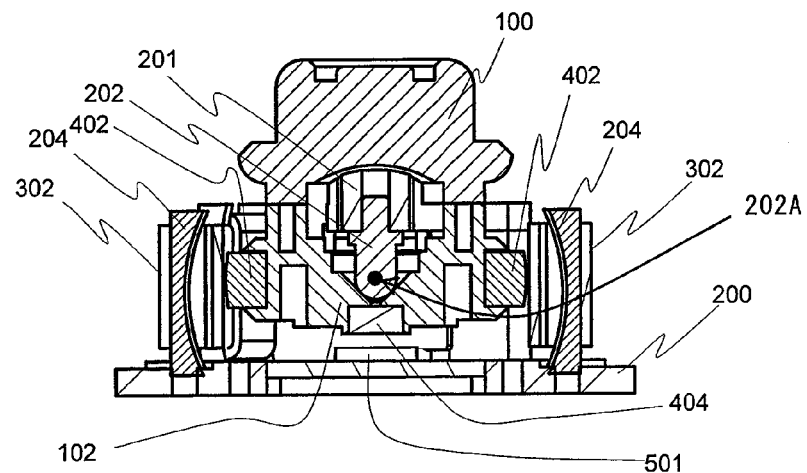
FIG. 26 is a cross-sectional view of the camera driving apparatus in Embodiment 4 taken along a panning direction rotation axis 12 shown in FIG. 25.
Figure 27:
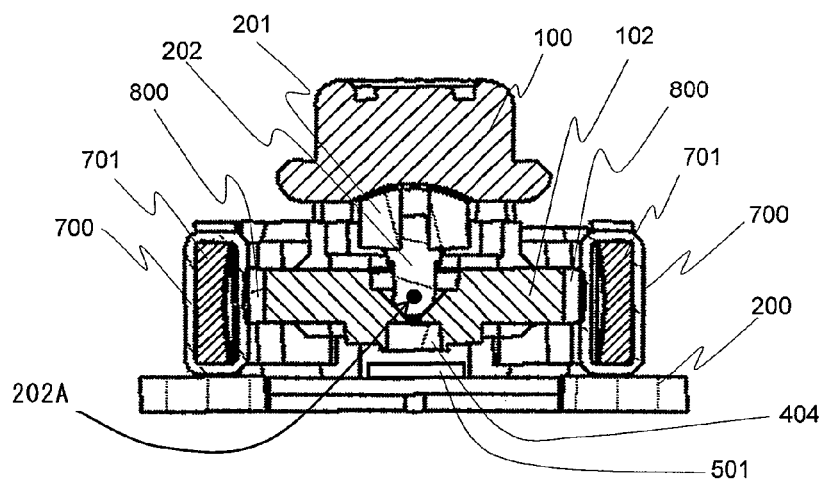
FIG. 27 is a cross-sectional view of the camera driving apparatus in Embodiment 4 taken along straight line 14 shown in FIG. 25.
Figure 28:
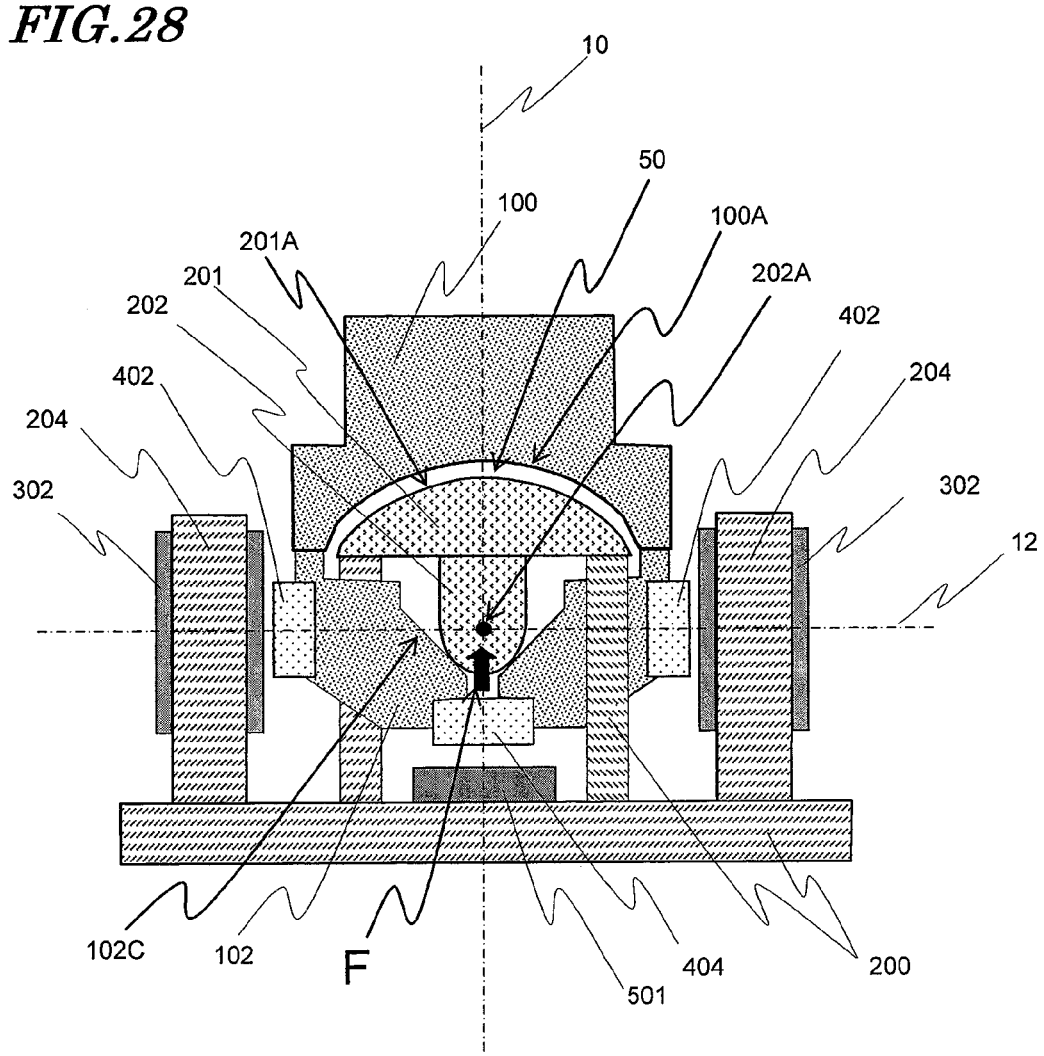
FIG. 28 is an enlarged schematic cross-sectional view of a protrusion section and the vicinity thereof.
Figure 29:
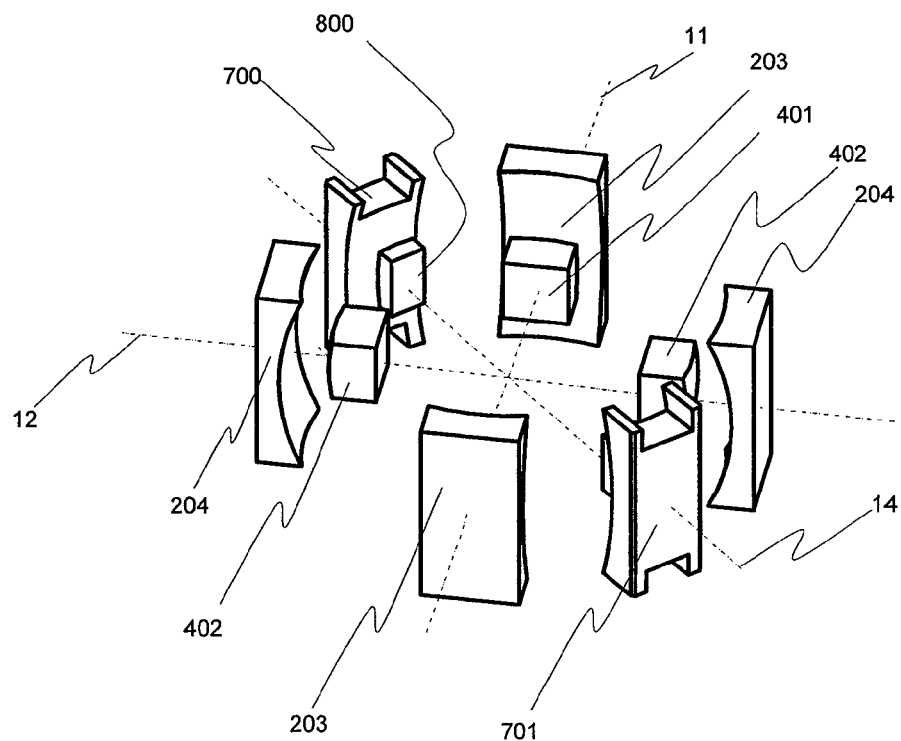
FIG. 29 is an exploded isometric view of driving magnets and magnetic yokes in the camera driving apparatus in Embodiment 4.
Figure 30:
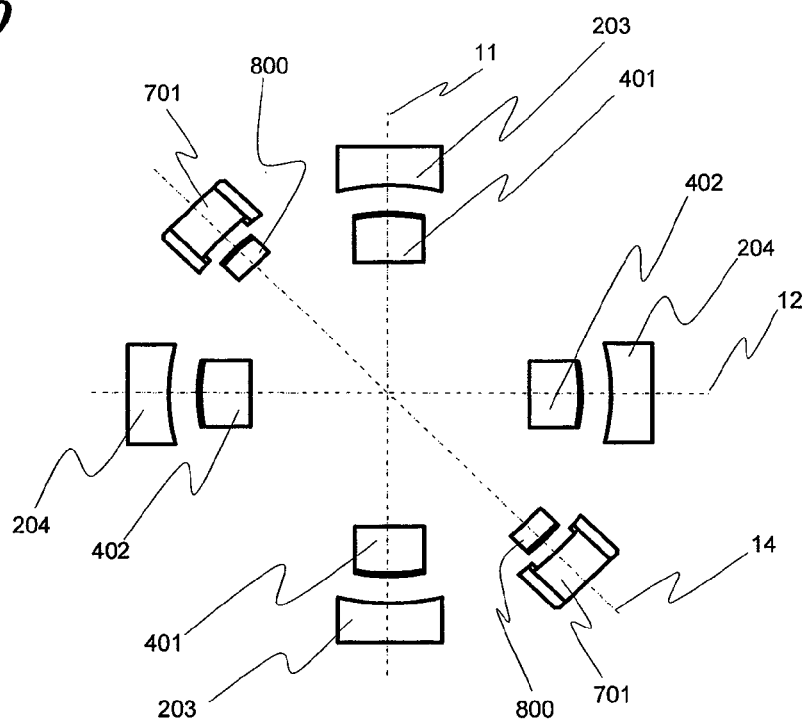
FIG. 30 is a plan view of the driving magnets and the magnetic yokes in the camera driving apparatus in Embodiment 4.

Hereinafter, a camera driving apparatus in Embodiment 4 according to the present invention will be described. FIG. 22 is an exploded isometric view of a camera driving apparatus 154 in Embodiment 4 according to the present invention. FIG. 23 is an isometric view of the camera driving apparatus 154 as seen from above obliquely. FIG. 24 is an isometric view of the camera driving apparatus 154 as seen from above obliquely. In FIG. 24, the camera driving apparatus 154 is in a state where some of the elements (panning driving coils 301, tilting driving coils 302, rolling driving coils 700, panning magnetic yokes 203, tilting magnetic yokes 204) are removed. FIG. 25 is a plan view of the camera driving apparatus 154. FIG. 26 is a cross-sectional view of the camera driving apparatus 154 taken along a plane including a dotted line 12 shown in FIG. 25 and an optical axis 10. FIG. 27 is a cross-sectional view of the camera driving apparatus 154 taken along a plane including a dotted line 14 shown in FIG. 25 and the optical axis 10. FIG. 28 is a schematic cross-sectional view of a main part of the camera driving apparatus 154 shown in the cross-sectional view of FIG. 26. FIG. 29 and FIG. 30 are respectively an isometric view and a plan view showing locations of the driving magnets and the magnetic yokes. With reference to these figures, a main structure of the camera driving apparatus 154 will be described.

In the camera driving apparatus 154 in this embodiment, a main housing of the movable unit is formed only of the first movable section and does not include the second movable section unlike the camera driving apparatus 151 in Embodiment 1. The magnetic structure for driving the movable unit is optimized.

Like in the Embodiment 1, the camera driving apparatus 154 includes a camera section 100, and a movable unit for supporting the camera section 100, and a fixed unit. With respect to the fixed unit, the movable unit is freely rotatable in a rolling direction 22 around the lens optical axis 10 as the center of rotation, in a tilting direction 21 around a tilting direction rotation axis 11 as the center of rotation, and a panning direction 20 around a panning direction rotation axis 12 as the center of rotation.

As shown in FIG. 22, the camera section 100 includes an imaging element (not shown), a lens (not shown) for forming an image of a subject on an imaging plane of the imaging element, the lens having the optical axis 10, and a lens barrel (not shown) for holding the lens.

The fixed unit includes a base 200, a protrusion section 202, and a protrusion supporting section 201. As shown in FIG. 28, the protrusion section 202 has a shape of at least a part of a spherical face having a sphere center 202A. Hereinafter, a portion having a shape of at least a part of the spherical face will be referred to as a "partial spherical face". At least a part of the protrusion section 202 is formed of a magnetic member. As shown in FIG. 22 and FIG. 28, the protrusion section 202 is pressurized and fixed into a central part of the protrusion supporting section 201. As shown in FIG. 22 through FIG. 24, the protrusion supporting section 201 having the protrusion section 202 fixed therein is fixed to the base 200.

In this embodiment, the movable unit includes only a first movable section 102 and does not include a second movable section. As shown in FIG. 22 and FIG. 28, the first movable section 102 includes an attracting magnet 404 and a contact face 102C. The contact face 102C defines a conical space inside thereof and is located on the first movable section 102 such that a tip of the conical space is located on a lower side. The attracting magnet 404 is located at the tip of the conical space, which is also a bottom of the first movable section 102. Preferably, the first movable section 102 is formed of a non-magnetic member such as a resin material or the like.

As shown in FIG. 28, the protrusion section 202 of the fixed unit is inserted into the conical space inside the contact face 102C of the first movable section 102. The protrusion section 202 is partially formed of a magnetic member and so contacts the contact face 102C by a magnetic attracting force F of the attracting magnet 404 provided on the bottom of the first movable section 102 and thus is in loose engagement with the contact face 102C.

Owing to this, the first movable section 102 freely rotates around the sphere center 202A of the spherical face while the conical contact face 102C and a partial spherical face of the protrusion section 202 are in contact with each other. More specifically, the first movable section 102 can rotate around the sphere center 202A, in two inclining directions, i.e., the panning direction 20 and the tilting direction 21, and also in the rolling direction 22. In the panning direction 20, the first movable section 102 can rotate around the panning direction rotation axis 12, which is perpendicular to the optical axis 10 and passes the sphere center 202A. In the tilting direction 21, the first movable section 102 can rotate around the tilting direction rotation axis 11, which is perpendicular to the optical axis 10 and the panning direction rotation axis 12. In the rolling direction 22, the first movable section 102 can rotate around the lens optical axis 10.

Preferably, the first movable section 102 supports the camera section 100 such that the optical axis 10 of the lens of the camera section 100 matches the axis of the conical contact face 102C and such that the camera section 100 does not interfere with the fixed unit in a vertical direction. Specifically, the camera section 100 is attached and fixed to the first movable section 102 in a plurality of areas having no cross-section of the protrusion supporting section 201 in the fixed unit. Therefore, the fixed unit and the movable unit avoid interfering with each other, which can reduce the height of the apparatus.

As described above, in this embodiment, the movable unit having the camera section 100 mounted thereon is supported by the fixed unit in a concentrated manner at the position of the center of gravity. Therefore, the frictional load can be reduced, and the mechanical resonance in a driving frequency band can be significantly suppressed.

The attracting magnet 404 provides a constant vertical drag between the protrusion section 202 and the conical contact face 102C by a constant magnetic attracting force F without being influenced by the pivoting angle. This can suppress a fluctuation of the frictional load in accordance with the pivoting angle and realize a good phase characteristic and a good gain characteristic in the driving frequency band.

In the case where a surface portion of the protrusion section 202 is covered with a resin material (not shown), the friction between the conical contact face 102C and the protrusion section 202 which are in contact with each other can be further reduced. This realizes a supporting structure having a high abrasion resistance.

In this embodiment, the movable unit does not include the second movable section. Therefore, the fall preventive regulation face for preventing the movable unit from falling from the fixed unit is provided on the camera section 100.

As shown in FIG. 28, a prescribed gap 50 is provided between the camera section 100 and the protrusion supporting section 201 in the direction of the optical axis 10 such that the camera section 100 is freely pivotable with respect to the protrusion supporting section 201 in the entire area in which the camera section 100 is movable. Specifically, the protrusion supporting section 201 has a convexed partial spherical face 201A centered around the sphere center 202A. On a face of the camera section 100 on which no lens is provided, a fall preventive regulation face 100A having a shape of a concaved partial spherical face centered around the sphere center is provided. Between the partial spherical face 201A and the fall preventive regulation face 100A, the gap 50 is made in the state where the protrusion supporting section 201 of the fixed unit is in contact with the contact face 102C of the first movable section 102. The partial spherical face 201A and the fall preventive regulation face 100A each have a generally symmetrical shape with respect to the lens optical axis 10.

The gap 50 is set to have a distance with which even if the contact face 102C is separated from the protrusion section 202, the contact face 102C can be returned to the state of contacting the protrusion section 202 by the magnetic attracting force F of the attracting magnet 404. Namely, even in the state where the movable unit moves downward by a distance equal to the gap 50 and so the partial spherical face 201A contacts the fall preventive regulation face 100A, the movable unit can be returned by the magnetic attracting force F of the attracting magnet 404 to the original state where the contact face 102C is in contact with the protrusion section 202.

Owing to this, this embodiment can provide a camera driving apparatus having a high impact resistance, in which the movable unit, even if instantaneously falling from a prescribed position, can be immediately returned to the original well-supported state by the magnetic attracting force F of the attracting magnet 404.

In the case where the radius of the fall preventive regulation face 100A centered around the sphere center 202A is decreased to a minimum possible size, the space required to provide the fall preventive regulation face 100A can be reduced, which can contribute to the size reduction of the apparatus.

Now, a structure for driving the movable unit will be described. The camera driving apparatus 154 includes a first driving section for inclining the movable unit having the camera section 100 mounted thereon in the panning direction 20 and the tilting direction 21 with respect to the fixed unit, and a second driving section for rotating the camera section 100 in the rolling direction 22 around the lens optical axis 10 with respect to the fixed unit.

The first driving section includes two pairs of inclination driving magnets, two pairs of magnetic yokes, and driving coils provided to the magnetic yokes. More specifically, as shown in FIGS. 22, 23, 24, 29 and 30, the first movable section 102 has, provided thereon, a pair of panning driving magnets 401 located symmetrically on the tilting direction rotation axis 11 with respect to the sphere center 202A for driving and rotating the movable unit in the panning direction 20, and a pair of tilting driving magnets 402 located symmetrically on the panning direction rotation axis 12 with respect to the sphere center 202A for driving and rotating the movable unit in the tilting direction 21. As shown in FIG. 22, these components are respectively fixed to contacting faces 102A (see FIG. 22) and contacting faces 102B which are provided on the first movable section 102. The panning driving magnets 401 are magnetized to one pole so as to have a magnetic flux in the direction of the tilting direction rotation axis 11, and similarly, the tilting driving magnets 402 are magnetized to one pole so as to have a magnetic flux in the direction of the panning direction rotation axis 12. Namely, different poles are located in the directions of the tilting direction rotation axis 11 and the panning direction rotation axis 12 by the panning driving magnets 401 and the tilting driving magnets 402.

As shown in FIGS. 22 and 23, a pair of panning magnetic yokes 203 and a pair of tilting magnetic yokes 204 are provided on a circumference of a circle on the base 200 centered around the optical axis 10 so as to face the pair of panning driving magnets 401 and the pair of tilting driving magnets 402 respectively.

As described above, in this embodiment, the camera section 100, the fall preventive regulation face 100A provided on the camera section 100, the convexed spherical face 201A provided on the protrusion supporting section 201, the first movable section 102 and the attracting magnet 404 all have a central axis matching the optical axis 10 passing the sphere center 202A, which is the supporting center and also is the driving center, and are located in this order. Therefore, the center of gravity of the movable unit matches the sphere center 202A, and so the movable unit can be supported at the center of gravity, and also the rotations around three axes which pass the center of gravity and are perpendicular to one another can be realized. In addition, the movable unit can be prevented from falling.

Now, the second driving section for driving and rotating the movable unit in the rolling direction 22 will be described. As shown in FIGS. 27, 29 and 30, the first movable section 102 has, provided thereon, a pair of rolling driving magnets 800 located symmetrically with respect to the sphere center 202A on a straight line 14 (see FIG. 29) having an angle of 45 degrees with respect to the tilting direction rotation axis 11 or the panning direction rotation axis 12. The pair of rolling driving magnets 800 are magnetized to one pole so as to have a magnetic flux in the direction of the straight line 14. A pair of rolling magnetic yokes 701 are provided on a circumference of a circle on the base 200 centered around the optical axis 10 so as to face the pair of rolling driving magnets 800 respectively.

Rolling driving coils 700 are respectively wound around the pair of magnetic yokes 701. The rolling driving coils 700 are provided such that the winding central axis (not shown) of the rolling driving coils 700 is perpendicular to the winding central axis of the panning driving coils 301 and the tilting driving coils 302.

In this manner, on a circumference of a circle on the base 200 centered around the optical axis 10, the driving sections for driving in the panning direction 20 and the tilting direction 21 and for driving in the rolling direction 22 are provided independently in a discrete manner.

The height position of the center, in the direction of the optical axis 10, of the panning driving coils 301, the tilting driving coils 302 and the rolling driving coils 700 is equal to the height position of the sphere center 202A of the protrusion section 202.

By electrifying the pair of panning driving coils 301, the pair of panning driving magnets 401 receive a couple electromagnetic force, and the first movable section 102, namely, the movable unit is driven and rotated in the panning direction 20 around the panning direction rotation axis 12.

Similarly, by electrifying the pair of tilting driving coils 302, the pair of tilting driving magnets 402 receive a couple electromagnetic force, and the movable unit is driven and rotated in the tilting direction 21 around the tilting direction rotation axis 11.

By electrifying the panning driving coils 301 and the tilting driving coils 302 at the same time, the movable unit having the camera section 100 mounted thereon can be inclined two-dimensionally.

By electrifying the pair of rolling driving coils 700, a pair of rolling driving magnets 800 receive an electromagnetic force, and the movable unit having the camera section 100 mounted thereon is driven and rotated in the rolling direction 22 around the optical axis 10.

In this manner, this embodiment adopts a moving magnet driving system in which the panning driving magnets 401, the tilting driving magnets 402 and the rolling driving magnets 800 are provided on the first movable unit 102. This structure is generally considered to have a problem that the weight of the movable unit is increased. However, this structure does not require electric wiring for driving in the movable unit. In addition, this structure has a significant advantage that the heat of the panning driving coils 301, the tilting driving coils 302 and the rolling driving coils 700 can be cooled by the panning magnetic yokes 203, the tilting magnetic yokes 204, the rolling magnetic yokes 701, the base 200 and the connection sections 210.

From the viewpoint of increasing the inclining angle in the panning direction 20 and the tilting direction 21 and the rotating angle in the rolling direction 22 to 10 degrees or greater, this embodiment is advantageous because the movable unit can be small and lightweight. By a moving coil driving system, the driving coils may be excessively large and thus the weight of the movable unit may be excessively increased.

Figure 31:
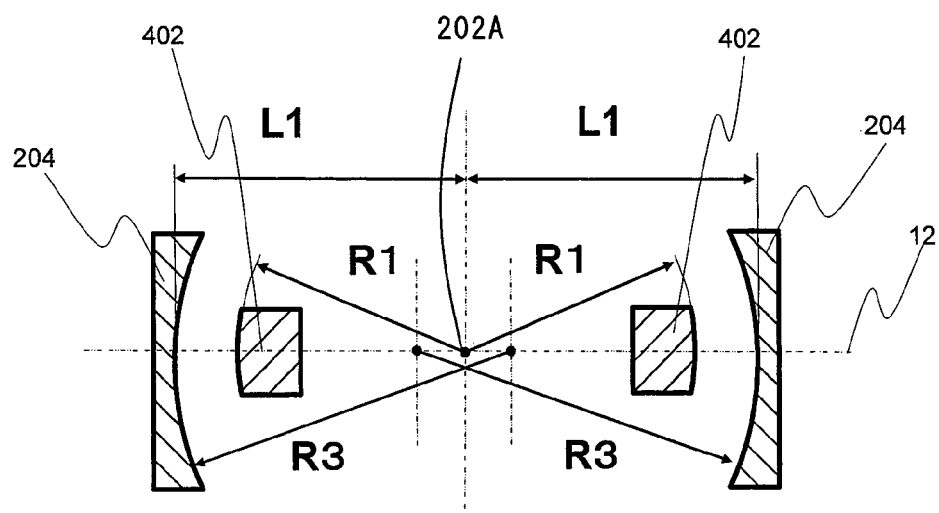
FIG. 31 is a cross-sectional view showing shapes and locations of the driving magnets and the magnetic yokes for an inclination driving section in the camera driving apparatus in Embodiment 4.
Figure 32:
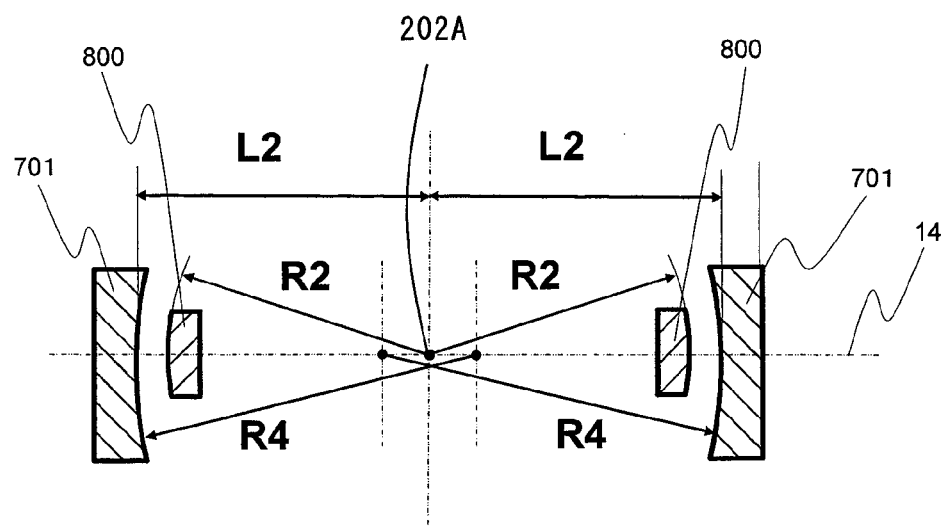
FIG. 32 is a cross-sectional view showing shapes and locations of the driving magnets and the magnetic yokes for a rotation driving section in the camera driving apparatus in Embodiment 4.

FIG. 31 is a cross-sectional view showing shapes and locations of the tilting driving magnets 402 and the tilting magnetic yokes 204 which act as the first driving section. FIG. 32 is a cross-sectional view showing shapes and locations of the rolling driving magnets 800 and the rolling magnetic yokes 701 which act as the second driving section.

As shown in FIG. 31, preferably, the side faces of the tilting driving magnets 402 facing the tilting magnetic yokes 204 each have a part of a convexed spherical face. The convexed spherical face is centered around the sphere center 202A of the protrusion section 202, and has distance R1 as the radius. Distance R1 is defined on a plane which is perpendicular to the optical axis 10 and passes the sphere center 202A, and is the distance from the sphere center to a median of the side face of the respective driving magnet. Similarly, it is preferable that the side faces of the panning driving magnets 401 facing the panning driving yokes 203 also each have a part of a convexed spherical face having distance R1 as the radius.

Preferably, the side faces of the rolling driving magnets 800 facing the pair of rolling magnetic yokes 701 each have a part of a second convexed spherical face. The second convexed spherical face has a center matching the sphere center 202A, and has distance R2 as the radius. Distance R2 is defined on a plane which is perpendicular to the optical axis 10 and passes the sphere center 202A, and is a distance from the center to a median of the side face of respective rolling driving magnet 800.

By contrast, it is preferable that the side faces of the tilting magnetic yokes 204 facing the convexed spherical faces of the tilting driving magnets 402 each have a part of a concaved spherical face. The concaved spherical face is centered around a point on a line extended from the line connecting the above center and a median of the side face of the respective tilting driving magnet 402, the line being defined on a plane perpendicular to the optical axis 10 and passing the sphere center 202A. The concaved spherical face has distance R3 as the radius. Distance R3 is longer than length L1, which is defined on the above plane and is a distance from the point on the extended line to a median of the side face of the respective tilting magnetic yoke 204. Similarly, it is preferable that the side faces of the panning magnetic yokes 203 facing the convexed spherical faces of the panning driving magnets 401 also each have a part of a concaved spherical face having distance R3 as the radius. More preferably, R3 is about 1.2 times to twice as long as distance L1.

It is preferable that the side faces of the rolling magnetic yokes 701 facing the convexed spherical faces of the rolling driving magnets 800 each have a part of a concaved spherical face. The concaved spherical face is centered around a point on a line extended from the line connecting the sphere center 202A and a median of the side face of the respective tilting driving magnet 800, the line being defined on the above plane. The concaved spherical face has distance R4 as the radius. Distance R4 is longer than length L2, which is defined on the above plane and is a distance from the point on the extended line to a median of the side face of the respective rolling magnetic yoke 701. More preferably, R4 is about 1.2 times to twice as long as distance L2.

Figure 33:
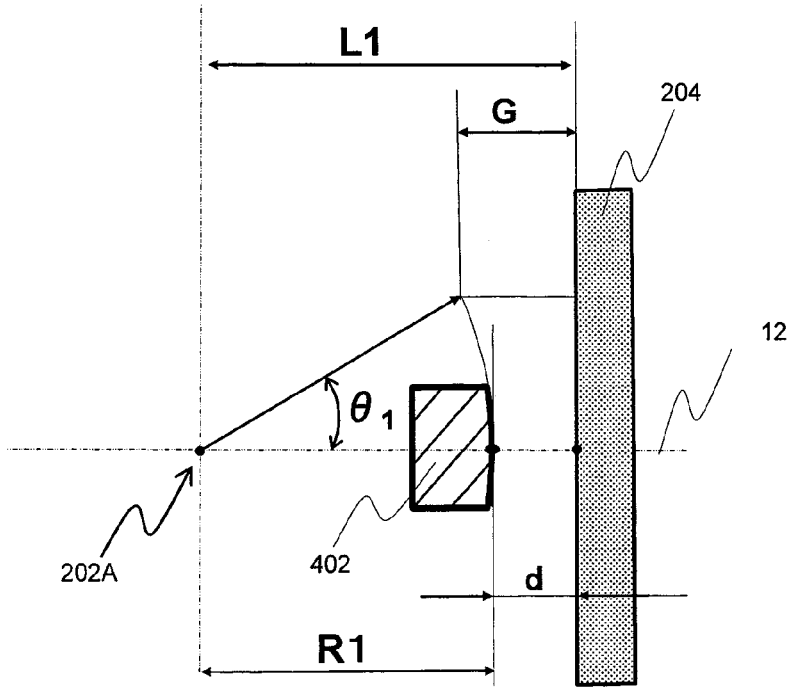
FIG. 33 is a cross-sectional view showing a structure of a magnetic yoke and a driving magnet for comparison.
Figure 34:
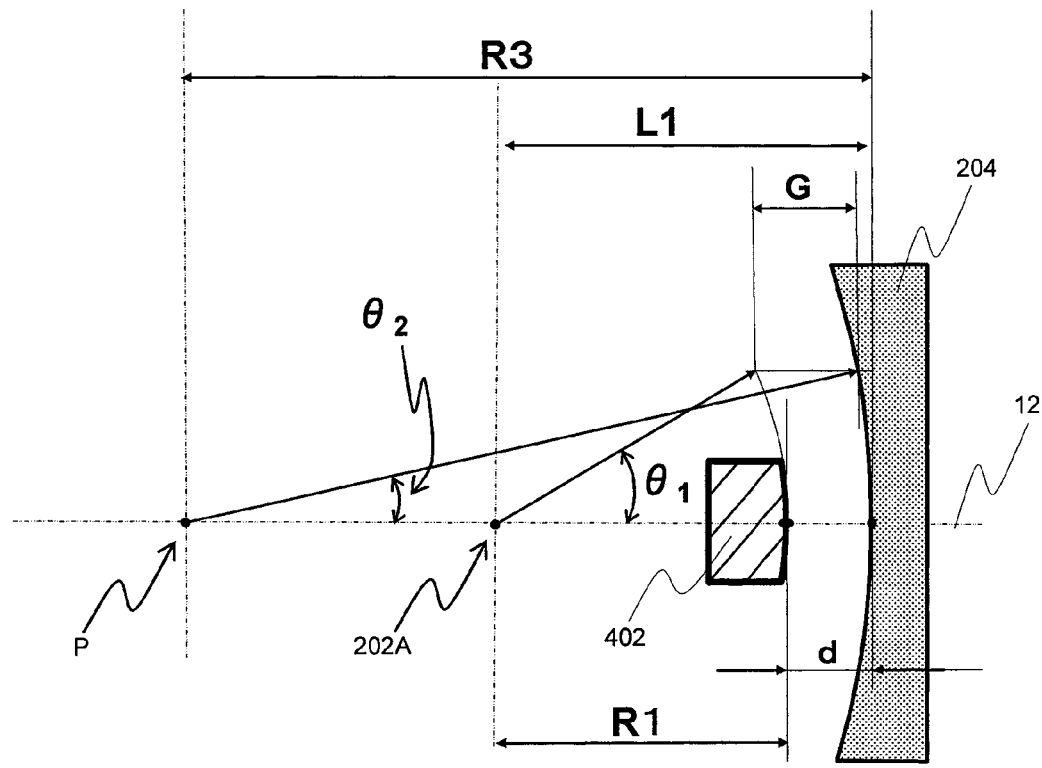
FIG. 34 is a cross-sectional view showing a structure of a magnetic yoke and a driving magnet in the camera driving apparatus in Embodiment 4.

Effects provided by such a structure of the driving magnets and magnetic yokes will be described. FIG. 33 shows a structure in the case where the tilting magnetic yoke 204 is a flat plate. FIG. 34 shows shapes and locations of the tilting driving magnet 402 and the tilting magnetic yoke 204 in this embodiment.

In the case of the tilting magnetic yoke 204 shown in FIG. 33, a magnetic gap G is represented by $G=d+R1\times(1-\cos\theta 1)$. In the expression, d is the minimum distance of the magnetic gap in the case where the inclining angle and the rotating angle of the first movable section 102 are 0 degrees, and $\theta 1$ is the tilting angle.

In the case of this embodiment shown in FIG. 34, the magnetic gap G is represented by $G=d+R1\times(1-\cos\theta 1)-R3\times(1-\cos\theta 2)$. In the expression, $\theta 1$ is the tilting angle. $\theta 2$ is an angle of a line, which connects center P of radius R3 to the point obtained by projecting the median of the tilting driving magnet 402 on a side surface of the tilting magnetic yoke 204 in a horizontal direction, with respect to the horizontal direction when the tilting angle is $\theta 1$. $\theta 1$ and $\theta 2$ fulfill the relationship of $R3\times\sin\theta 2=R1\times\sin\theta 1$.

Figure 35:
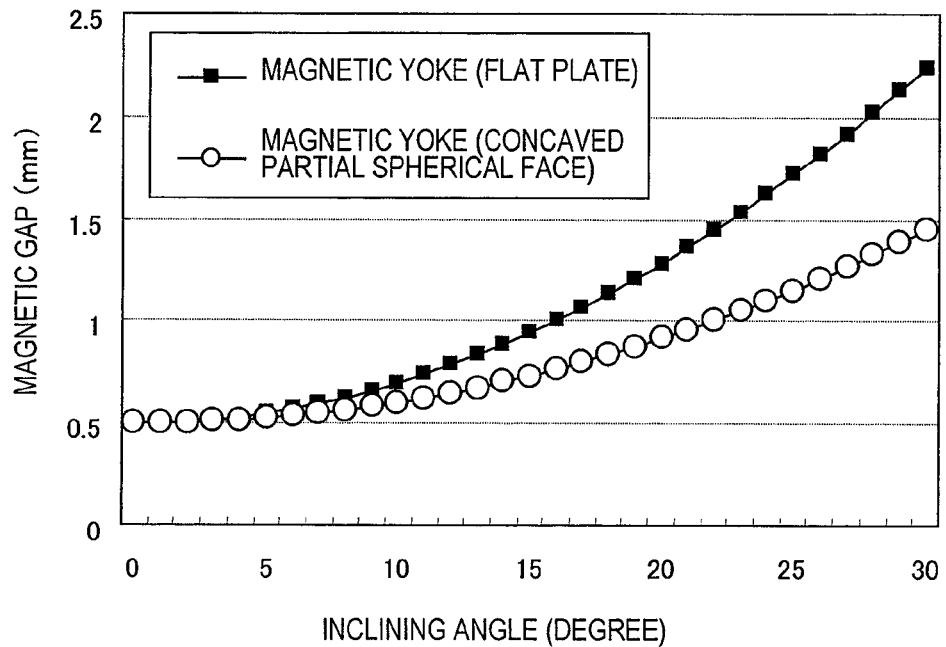
FIG. 35 is a graph showing a characteristic of the relationship between the inclining angle and the magnetic gap in the camera driving apparatus in Embodiment 4 when the condition of $R3=2 \times L1$ is fulfilled.

FIG. 35 is a graph showing a characteristic, i.e., a change of the magnetic gap with respect to the tilting inclining angle in the case where the tilting magnetic yoke 204 is a flat plate (square) and has a shape of a concaved partial spherical face fulfilling $R3=2\times L1$ (circle).

As understood from FIG. 35, with the flat plate-shaped magnet yoke, when the inclining angle is 30 degrees, the magnetic gap rapidly increases to about five times as large as the minimum magnetic gap distance d (in this example, 0.5 mm). By contrast, with the magnetic yoke having a shape of the concaved partial spherical face, the increase of the magnetic gap is suppressed to about three times as large as the minimum magnetic gap distance d (in this example, 0.5 mm).

Figure 36:
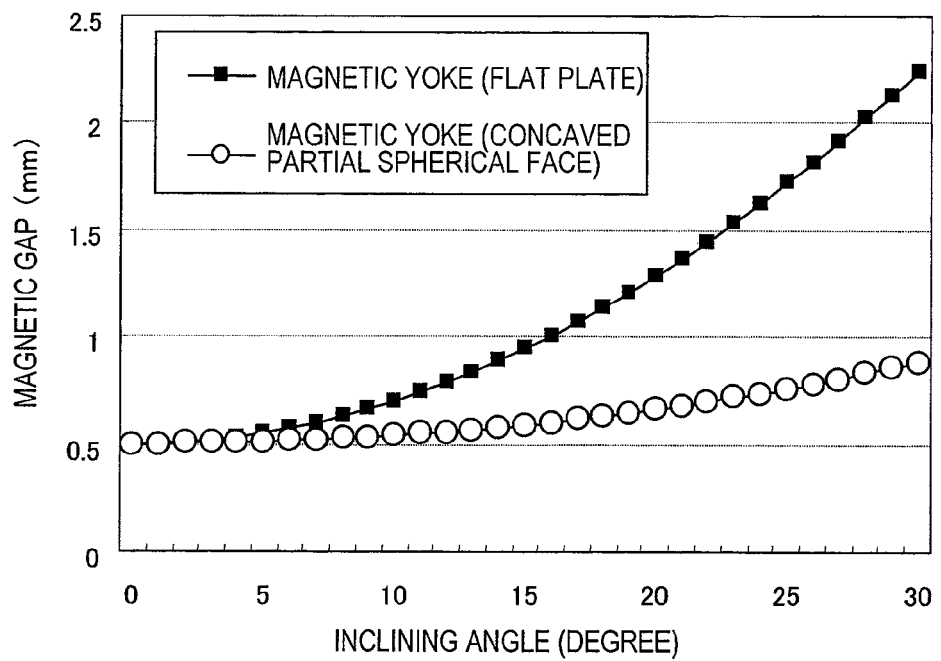
FIG. 36 is a graph showing a characteristic of the relationship between the inclining angle and the magnetic gap in the camera driving apparatus in Embodiment 4 when the condition of $R3=1.2 \times L1$ is fulfilled.

FIG. 36 is a graph showing a characteristic, i.e., a change of the magnetic gap with respect to the tilting inclining angle in the case where the tilting magnetic yoke 204 is a flat plate (square) and has a shape of a concaved partial spherical face fulfilling $R3=1.2\times L1$ (circle).

As understood from FIG. 36, with the magnetic yoke having a shape of the concaved partial spherical face, even when the inclining angle becomes 30 degrees, the increase of the magnetic gap is suppressed to about twice as large as the minimum magnetic gap distance d (in this example, 0.5 mm).

In this manner, the change of the magnetic gap can be controlled by structuring the side surface of the tilting driving magnet to have a shape of a convexed partial spherical face having radius R1, by structuring the side surface of the tilting magnetic yoke 204 to have a shape of a concaved partial spherical face having radius R3, and then adjusting R1 and R3.

Where R3 is matched to L1, the change of the magnetic gap can be completely suppressed, and the magnetic gap is made constant regardless of the tilting inclining angle.

However, in this case, the function of allowing the first movable section 102 to return to the neutral position using the magnetic attracting force is spoiled, and so the first movable section 102 having the camera section 100 mounted thereon cannot be kept at the neutral position in the in the panning direction 20, the tilting direction 21 and the rolling direction 22 by the magnetic spring effect. Therefore, in order to keep the camera section 100 at the neutral position three-dimensionally, it is required to apply a steady driving current to the panning driving coils 301, the tilting driving coils 302 and the rolling driving coils 700. This significantly decreases the efficiency as the camera driving apparatus. For these reasons, it is understood that R3>L1 preferably should be fulfilled in order to make use of the magnetic spring effect.

By contrast, it is conceivable to improve the function of allowing the first movable section 102 to return to the neutral position by drastically changing the magnetic gap and thus actively using the magnetic attracting force. However, in this case, a resultant of magnetic spring urging forces in the three directions of the panning, tilting and rolling directions makes an adverse influence on the frequency response characteristic of the first movable section 102 in the three directions. As a result, a good servo driving band cannot be obtained.

Therefore, how to provide both of a good three-direction neutral position return function and a good frequency response characteristic is a very important issue for designing a camera driving apparatus. One important measure for solving this problem is to optimize the radius of the concaved spherical face of the magnetic yoke with respect to the convexed spherical face of the driving magnet.

As shown in FIG. 35 and FIG. 36, when the inclining angle is within 30 degrees, as long as L1 and R3 fulfill the relationship of $1.2L1 \leq R3 \leq 2L$, the distance change of the magnetic gap can be suppressed to twice or three times as large. As a result of detailed examinations, it was found that as long as the change of the magnetic gap is within this range, it is possible to provide both of a good three-direction neutral position return function and a good frequency response characteristic.

The same is applied to L1 and R3 of the panning magnetic yokes 203 and the panning driving magnets 401, and it is preferable that L1 and R3 fulfill the relationship of $1.2 \times L1 \leq R3 \leq 2 \times L1$. The same is also applied to L2 and R4 of the rolling driving magnets 800 and the rolling magnetic yokes 701, and it is preferable that L2 and R4 fulfill the relationship of $1.2 \times L2 \leq R4 \leq 2 \times L2$.

Now, detection of the inclination and rotation of the movable unit will be described. The camera driving apparatus 154 includes a detector for detecting an inclining angle of the movable unit having the camera section 100 mounted thereon, and also a rotating angle of the movable unit around the lens optical axis 10, with respect to the fixed unit. Specifically, the camera driving apparatus 154 includes a first detection section for detecting a two-dimensional inclining angle of the movable unit, namely, an inclining angle in the panning direction 20 and the tilting direction 21, and a second detection section for detecting a rotating angle around the lens optical axis 10.

First, detection of an inclining angle of the movable unit in the panning direction 20 and the tilting direction 21 will be described. As shown in FIGS. 22, 26, 27 and 28, the camera driving apparatus 154 includes a first magnetic sensor 501 as the first detection section for detecting an inclining angle of the movable unit. The first magnetic sensor 501 is capable of detecting inclination or rotation around two axes. The first magnetic sensor 501 is located to face the attracting magnet 404 magnetized to one pole in the direction of the optical axis 10 and is fixed to the base 200 via a circuit board 502.

Inside the first magnetic sensor 501, a pair of hole elements (not shown) are provided on the tilting direction rotation axis 11 symmetrically with respect to the optical axis 10, and a pair of hole elements (not shown) are provided on the panning direction rotation axis 12 symmetrically with respect to the optical axis 10. The first magnetic sensor 501 detects a change of the magnetic force of the attracting magnet 404 which is caused by an inclination motion of the movable unit in the panning direction 20 and the tilting direction 21 as a biaxial component, and thus can calculate a panning inclining angle and a tilting inclining angle.

As described above, in this embodiment, the attracting magnet 404 acts as a magnet for detecting inclining angles in addition to having a function of providing the magnetic attracting force F to the protrusion section 202. Therefore, the number of components can be decreased and the size of the apparatus can be reduced. In addition, the distance between the attracting magnet 404 and the sphere center 202A can be shorter, and thus the first magnetic sensor 501 can be reduced in size.

Now, the second detection section for detecting a rotating angle of the movable unit around the optical axis 10 will be described. As shown in FIG. 22, the camera driving apparatus 154 includes a pair of second magnetic sensors 503 and two pairs of rotation detection magnets 403. The two pairs of rotation detection magnets 403 are fixed to the first movable section 102 so as to be symmetrical with respect to the sphere center 202A on two straight lines which are perpendicular to the optical axis 10, have an angle of 45 degrees with respect to the tilting direction rotation axis or the panning direction rotation axis 12 and are perpendicular to each other. The four rotation detection magnets 403 are magnetized to two poles in a circumferential direction of a circle on a plane which is centered around the optical axis 10 and is perpendicular to the optical axis 10. Each pair of rotation detection magnets 403 located symmetrically with respect to the optical axis 10 are magnetized to opposite directions to each other.

The two rotation detection magnetic sensors 503 are fixed to the base 200 so as to face each other on the border between the magnetic poles of one pair of rotation detection magnets 403.

When the movable unit is rotated in the rolling direction 22, the magnetic poles of the pair of rotation detection magnets 403 move. This movement causes a drastic change of the magnetic force, and this change is detected by the second magnetic sensors 503. Owing to this, the rotating angle of the movable unit around the optical axis 10 can be detected at high precision.

When the first movable section 102 of the movable unit is inclined in the panning direction 20 and the tilting direction 21, a crosstalk output may be generated in the rolling direction 22. However, this crosstalk output can be canceled using an output obtained by the second magnetic sensors 503 detecting a change of the magnetic force of the pair of rotation detection magnets 403. Accordingly, only the rotating angle in the rolling direction 22 in the range in which the movable unit can be inclined can be accurately extracted and detected.

As shown in FIG. 22, the pair of second magnetic sensors 503 are located on the straight line 13 having an angle of 45 degrees with respect to the tilting direction rotation axis 11 or the panning direction rotation axis 12, on opposite sides with respect to the optical axis 10. Owing to this, it is possible to provide a driving section on a circumference of a circle having a large radius centered around the optical axis 10 to improve the driving moment and also to locate the second magnetic sensors 503 on a circumference of a circle having a small radius centered around the optical axis 10. Thus, the space can be effectively used.

As described above, the camera driving apparatus in this embodiment adopts a structure in which the sphere center of the partial spherical face provided on the protrusion section of the fixed unit and the central axis of the conical contact face of the movable unit are located on the lens optical axis of the camera section, and the two divided section of the movable unit are coupled to each other while sandwiching the protrusion section located therebetween. Therefore, a structure for supporting the movable unit at the center of gravity is realized, and so the mechanical resonance in the driving frequency band can be significantly suppressed.

In a pivot structure formed of the protrusion section and the contact face of the movable unit, a constant vertical drag can be provided by a magnetic attracting force which is unlikely to be influenced by the pivoting angle of the movable unit. Therefore, a fluctuation of the frictional load in accordance with the pivoting angle is reduced, and a good phase characteristic and a good gain characteristic are realized in the driving frequency band.

Conventionally, how to prevent the movable unit from falling due to an external disturbance such as vibration, impact or the like has been a serious problem specific to a supporting structure utilizing a magnetic attracting force. In order to solve this problem, a fall preventive regulation face is provided on one of the divided sections of the movable unit along a prescribed gap along which the camera section is pivotable. Therefore, the movable unit can be prevented from falling with certainty while avoiding the apparatus from being increased in size.

In the movable unit, the fall preventive regulation face and the conical contact face are both located symmetrically on the lens optical axis. The sphere center of the partial curved face of the protrusion section for supporting the movable unit is located on the optical axis. Therefore, in the entire area in which the movable unit is pivotable, a concaved fall preventive regulation face can be provided with the minimum possible area size, which realizes the size reduction of the apparatus.

The position of the fall preventive regulation face is determined such that even if the movable unit falls from the fixed unit and the fixed unit contacts the fall preventive regulation face of the movable unit, the protrusion section in the fixed unit and the contact face of the movable unit are put into contact with each other again by the magnetic attracting force F to form a pivot structure. Therefore, a camera driving apparatus having a very high impact resistance can be provided, in which the movable unit, even if instantaneously falling, can be immediately returned to the original well-supported state.

The driving sections for driving in the panning and the tilting directions and for driving in the rolling direction are respectively located on two lines perpendicular to each other on a plane perpendicular to the optical axis. Each driving section includes two pairs of magnets fixed to the movable unit, and two pairs of driving coils located on a circumference of a circle centered around the optical axis, on a plane which is perpendicular to the optical axis and passes the rotation center of the movable unit, and provided on the fixed unit so as to face the magnets respectively. The height position of these components in the direction of the optical axis is generally equal to the height position of the sphere center of the protrusion section. Therefore, the movable unit can be driven mainly at the center of gravity, and the mechanical resonance in the driving frequency band can be significantly suppressed.

The side faces of the panning and tilting driving magnets facing the panning and tilting magnetic yokes each have a shape of a partial spherical face, which is centered around the sphere center of the spherical face of the protrusion section and has distance R1 from the sphere center to the center of the side face of the respective driving magnet as the radius. The side faces of the rolling driving magnets facing the rolling magnetic yokes each have a shape of a partial spherical face, which is centered around the sphere center of the spherical face of the protrusion section and has distance R2 from the sphere center to the center of the side face of the respective driving magnet as the radius.

The side faces of the panning and tilting magnetic yokes facing the convexed spherical faces of the panning and tilting driving magnets each have a shape of a concaved partial spherical face, which has radius R3, which is longer than distance L1 from the sphere center to the side face of the respective panning or tilting magnetic yoke. The side faces of the rolling magnetic yokes facing the convexed spherical faces of the rolling driving magnets each have a shape of a concaved partial spherical face, which has radius R4, which is longer than distance L2 from the sphere center to the side face of the respective rolling magnetic yoke.

Owing to this, a change of each of the magnetic gaps between the magnetic yokes and the driving magnets with respect to the inclining angle and the rotating angle of the movable unit can be suppressed within a prescribed range in the entire area in which the movable unit is movable. By adjusting the radius of the convexed spherical faces of the driving magnets and the radius of the concaved spherical faces of the magnetic yokes, the amount of change of the magnetic gaps can be controlled.

In general, the magnetic attracting force is in proportion to the square of the magnetic flux, and the magnetic flux is in inverse proportion to the magnetic gap. Therefore, the magnetic attracting force is in inverse proportion to the square of the magnetic gap. A rapid change of the magnetic gap caused by a change of the motion angle increases the spring constant of a magnetic spring. Thus, the radius of the convexed spherical faces of the driving magnets and the radius of the concaved spherical faces of the magnetic yokes are adjusted in accordance with the rotation radius of curvature of the driving magnets provided on the movable unit. Owing to this, the amount of change of the magnetic gap can be appropriately set, which allows the movable unit to return to the neutral position three-dimensionally and also realizes a magnetic spring characteristic which does not deteriorate the frequency response characteristic in the driving control frequency band.

Especially where the radius of the concaved spherical faces of the magnetic yokes is set to at least 1.2 times and twice at most of the distance from the center to the side face of the respective magnetic yoke, both of the return of the movable unit to the neutral position and a good frequency response characteristic are provided.

With the moving magnet driving system, the magnetic attracting force is increased in proportion to the inclining angle and the rotating angle. This requires the motion angle to be maintained against the magnetic attracting force. This presents a problem specific to this system that an extra driving current is needed and the driving efficiency is significantly reduced. According to the camera driving apparatus in this embodiment, the magnetic gap in the motion angle range can be set to change slowly. Therefore, the movable unit is allowed to return to the neutral position while suppressing the reduction of the driving efficiency.

The rotation radius of curvature of the panning and tilting driving magnets and the rolling driving magnets mounted on the movable unit are made different from distance R1 or distance R2. Owing to this, the magnetic coupling of the panning and tilting driving magnets and the rolling driving magnets is avoided, and thus a rapid change of the magnetic attracting force can be prevented.

A pair of second magnetic sensors are located on the straight line 13 having an angle of 45 degrees with respect to the tilting direction rotation axis or the panning direction rotation axis, on opposite sides with respect to the optical axis 10. Owing to this, it is possible to provide a driving section on a circumference of a circle having a large radius centered around the optical axis 10 to improve the driving moment and also to locate the second magnetic sensors on a circumference of a circle having a small radius centered around the optical axis 10. Thus, the space can be effectively used.

Accordingly, the camera driving apparatus in this embodiment allows the movable unit to incline at a large angle of ±10 degrees or greater in the panning direction and the tilting direction, and also to rotate at a large angle of ±10 degrees or greater in the rolling direction. In addition, good shake compensation control is realized in a wide frequency band of up to about 50 Hz. As a result, the camera driving apparatus realizes high-speed panning/tilting/rolling motions of the camera section and also can compensate for image blurring of a photo caused by camera-shake while the photographer is walking. Moreover, the camera driving apparatus has a compact and solid fall preventive structure and so is highly resistant against an external impact such as vibration, falling or the like.

Embodiment 5

Figure 37:
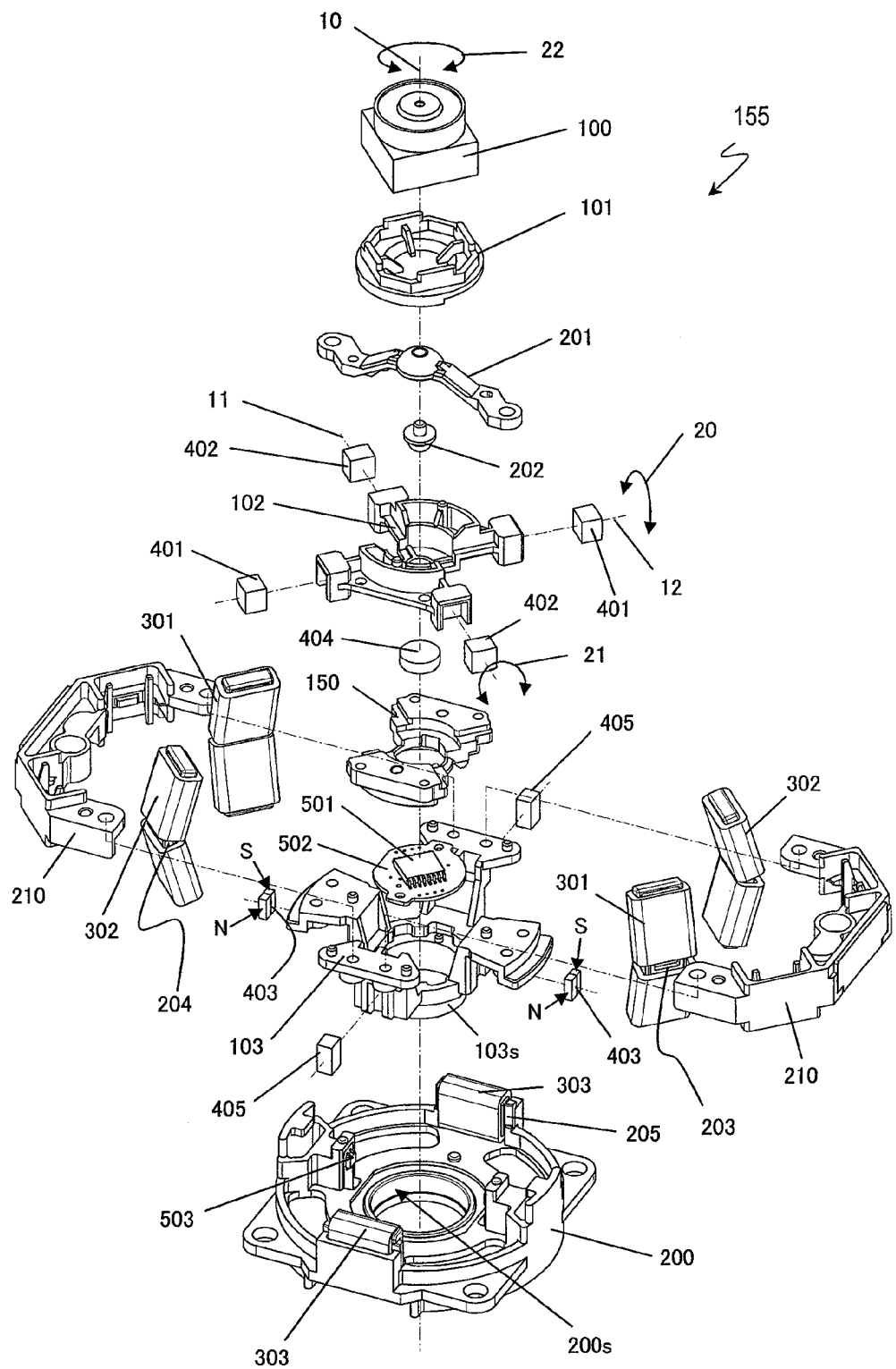
FIG. 37 is an exploded isometric view of a camera driving apparatus in Embodiment 5 according to the present invention.
Figure 38:
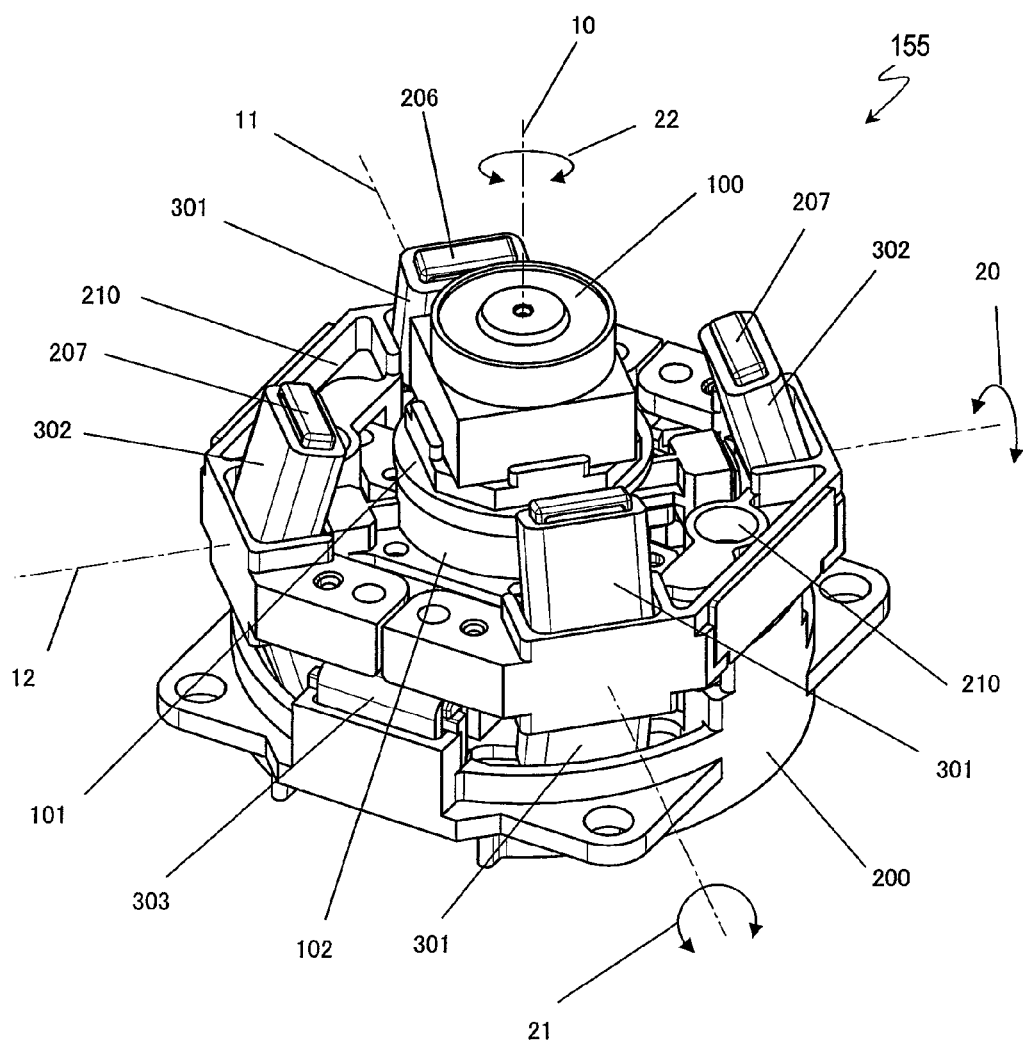
FIG. 38 is an isometric view of the camera driving apparatus in Embodiment 5 as seen from above obliquely.
Figure 40:
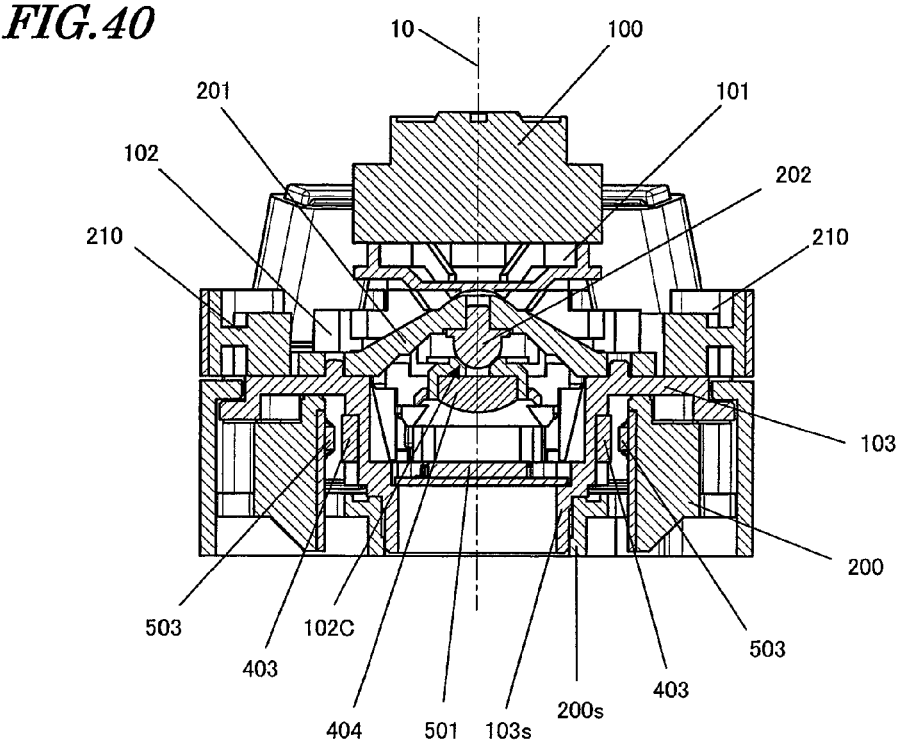
FIG. 40 is a cross-sectional view of the camera driving apparatus in Embodiment 5 taken along line B-B shown in FIG. 39(a).
Figure 41:
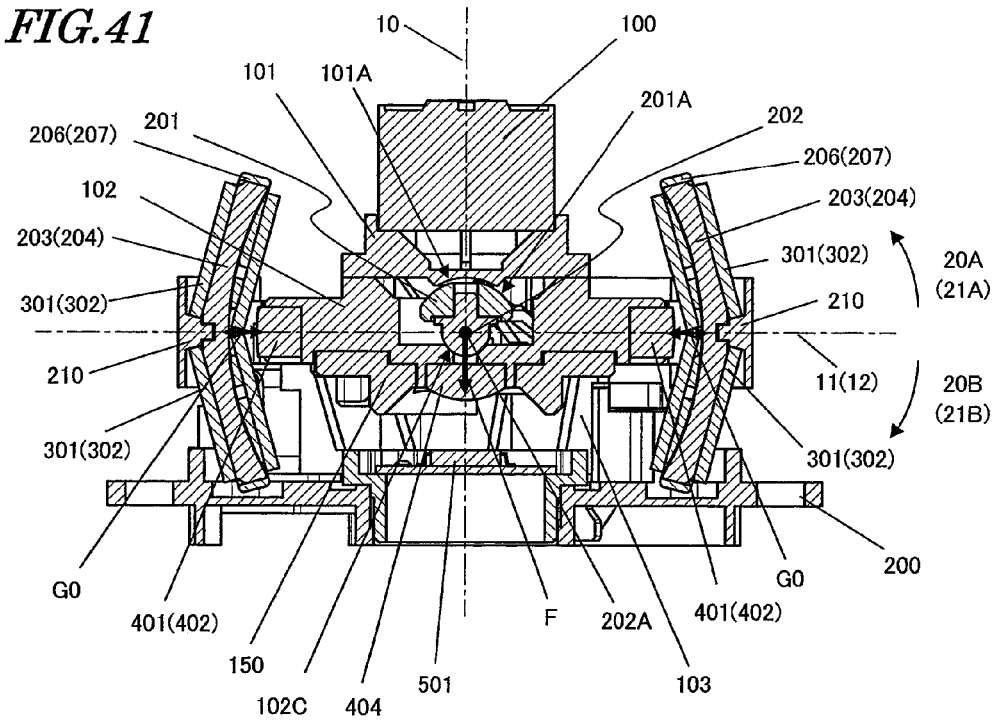
FIG. 41 is a cross-sectional view of the camera driving apparatus in Embodiment 5 taken along line A-A shown in FIG. 39(a).
Figure 42:
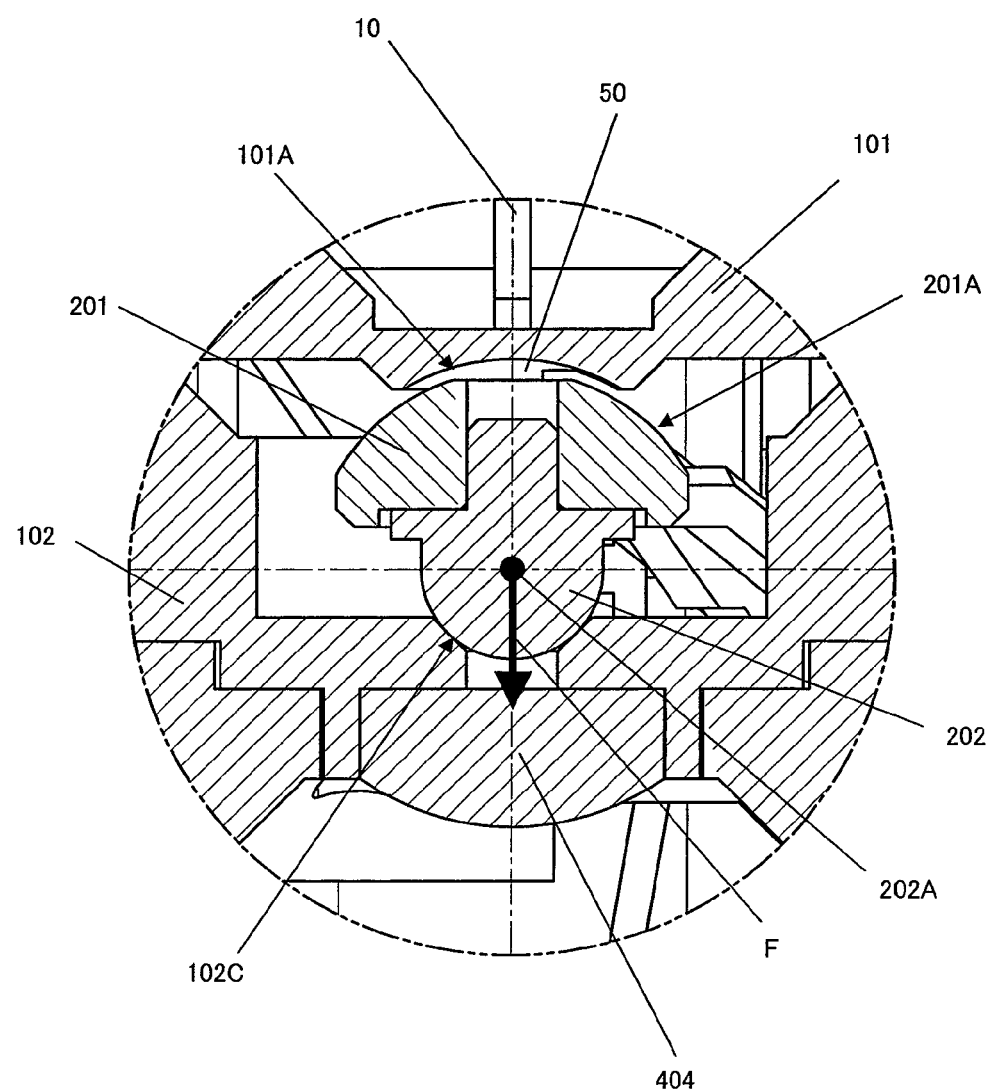
FIG. 42 is a cross-sectional view of a main part of the camera driving apparatus in Embodiment 5, showing a protrusion section and the vicinity thereof.
Figure 43:
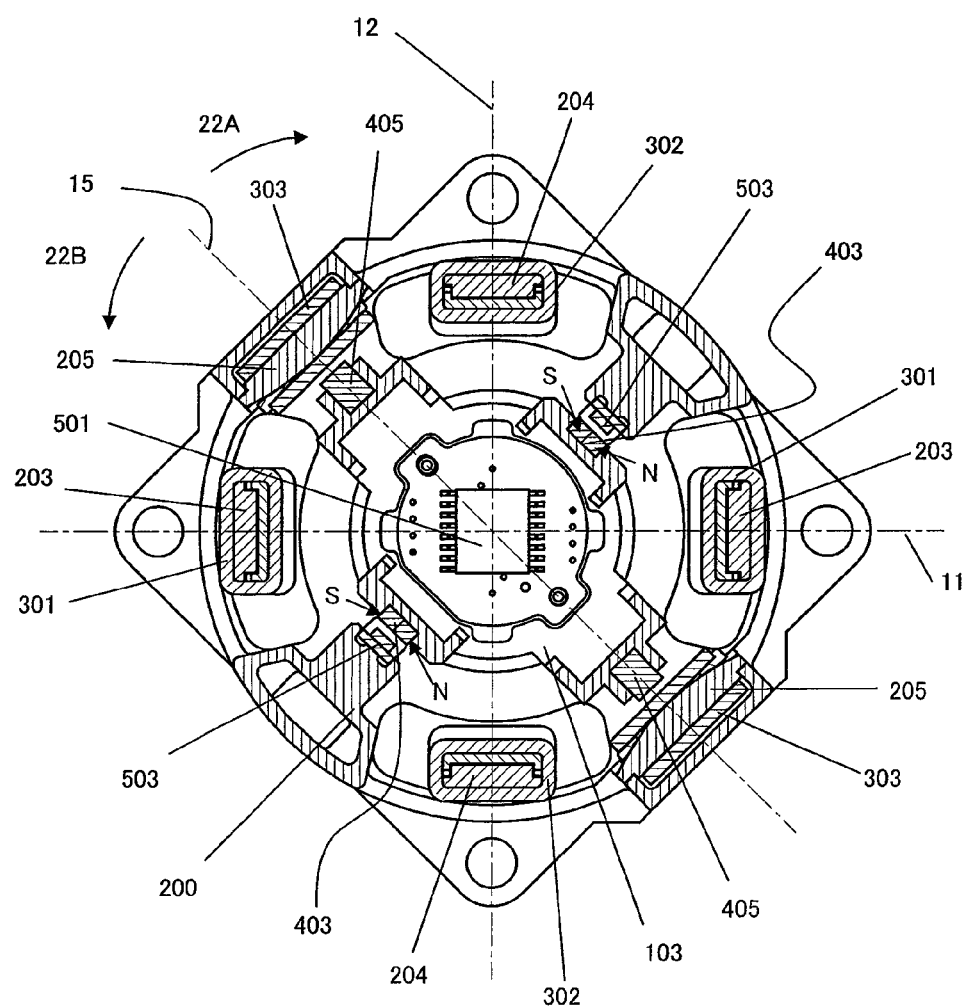
FIG. 43 is a cross-sectional view of the camera driving apparatus in Embodiment 5 taken along line C-C shown in FIG. 39(b).

Hereinafter, a camera driving apparatus in Embodiment 5 according to the present invention will be described. FIG. 37 is an exploded isometric view of a camera driving apparatus 155 in Embodiment 5 according to the present invention. FIG. 38 is an isometric view of the camera driving apparatus 155 as seen from above obliquely. FIGS. 39(*a*) and (*b*) are respectively a plan view and a side view of the camera driving apparatus 155. FIG. 40 and FIG. 41 are respectively a cross-sectional view taken along line A-A and a cross-sectional view taken along line B-B shown in FIG. 39(*a*). FIG. 42 is an enlarged cross-sectional view of a main part of the protrusion section 202 and the vicinity thereof of the camera driving apparatus 155. FIG. 43 is a cross-sectional view taken along line C-C shown in FIG. 39(*b*). With reference to these figures, a main structure of the camera driving apparatus 155 will be described.

The camera driving apparatus 155 includes a camera section 100, and a movable unit for supporting the camera section 100, and a fixed unit. In the camera driving apparatus 155, a first movable section 102 having a camera section 100 mounted thereon and a second movable section 101 are freely rotatable in a tilting direction 21 around a tilting direction rotation axis 11 as the center of rotation, and a panning direction 20 around a panning direction rotation axis 12 as the center of rotation, with respect to a third movable section 103, and the third movable section 103 is freely rotatable in a rolling direction 22 around the lens optical axis 10 as the center of rotation, with respect to the fixed unit, unlike in Embodiments 1 through 4.

As shown in FIG. 37 and FIG. 38, the camera section 100 includes an imaging element (not shown), a lens (not shown) for forming an image of a subject on an imaging plane of the imaging element, the lens having the optical axis 10, and a lens barrel (not shown) for holding the lens.

The movable unit includes the first movable unit 102, the second movable unit 101, the third movable unit 103, a protrusion supporting section 201 and the protrusion section 202.

As shown in FIG. 37, the protrusion supporting section 201 has a shape of a generally arch-like fixed-fixed beam. Into a hole provided at the center of the beam, the protrusion section 202 is pressurized and fixed. As shown in FIG. 41 and FIG. 42, the protrusion section 202 has a shape of at least a part of a spherical face having a sphere center 202A. At least a part of the protrusion section 202 is formed of a magnetic member. The protrusion supporting section 201 is fixed to the third movable section 103.

The first movable section 102 includes a contact face 102C and an attracting magnet 404. The contact face 102C defines a conical space inside thereof and is located on the first movable section 102 such that a tip of the conical space is located on a lower side. The attracting magnet 404 is located at the tip of the conical space, which is also a bottom of the first movable section 102. Preferably, the first movable section 102 is formed of a non-magnetic member such as a resin material or the like.

As shown in FIG. 42, the protrusion section 202 is inserted into the conical space inside the contact face 102C of the first movable section 102. The protrusion section 202 is partially formed of a magnetic member and so contacts the contact face 102C by a magnetic attracting force F of the attracting magnet 404 provided on the bottom of the first movable section 102 and thus is in loose engagement with the contact face 102C.

Owing to this, the first movable section 102 freely rotates around the sphere center 202A while the conical contact face 102C and a partial spherical face of the protrusion section 202 are in contact with each other. More specifically, the first movable section 102 can rotate around the sphere center 202A, in two inclining directions, i.e., the panning direction 20 and the tilting direction 21, and also in the rolling direction 22. In the panning direction 20, the first movable section 102 can rotate around the panning direction rotation axis 12, which is perpendicular to the optical axis 10 and passes the center 201A. In the tilting direction 21, the first movable section 102 can rotate around the tilting direction rotation axis 11, which is perpendicular to the optical axis 10 and the panning direction rotation axis 12. In the rolling direction 22, the first movable section 102 can rotate around the lens optical axis 10.

The second movable section 101 has the camera section 100 mounted thereon and is fixed to the first movable section 102. Specifically, the camera section 100 is fixed to the second movable section 101 such that the lens optical axis 10 passes the center of the second movable section 101 and preferably matches the central axis of the conical contact face 102C. The second movable section 101 is coupled to the first movable section 102 in the state where the second movable section 101 does not interfere with the protrusion supporting section 201 in a vertical direction.

As shown in FIG. 37, the third movable section 103 supports the protrusion supporting section 201, and a rolling pivoting shaft 103*s* provided in the third movable section 103 is fit into a rolling pivoting central hole 200*s* provided in a base 200 of the fixed unit as being centered around the optical axis 10. The third movable section 103 is pivotably supported by the base 200. Owing to this, the first movable section 102 and the second movable section 101 supported via the protrusion supporting section 201 can rotate in the rolling direction 22 around the optical axis 10.

Below the first movable section 102 (opposite from the second movable section 101 with respect to the sphere center 202A), a counterweight 150 is provided. This provides a weight balance with the camera section 100 fixed to the first movable section 102 with respect to the sphere center 202A. Therefore, the degree of freedom of the design and the manner of mounting of the camera section 100 are raised. In addition, the center of gravity of the entire movable unit including the camera section 100, the first movable section 102, the second movable section 101 and the counterweight 150 can be supported in a concentrated manner at a position in the vicinity of the sphere center 202A of the protrusion section 202. Therefore, the frictional load can be reduced, and the mechanical resonance in a driving frequency band can be significantly suppressed.

The attracting magnet 404 provides a constant vertical drag between the protrusion section 202 and the conical contact face 102C by a constant magnetic attracting force F without being influenced by the pivoting angle. This can suppress a fluctuation of the frictional load in accordance with the pivoting angle, and realize a good phase characteristic and a good gain characteristic in the driving frequency band.

A surface portion of the protrusion section 202 may be covered with a highly wet resin material (not shown) or the like. In this case, the friction between the conical contact face 102C and the protrusion section 202 which are in contact with each other can be further reduced. This realizes a supporting structure having a high abrasion resistance.

As shown in FIG. 42, a prescribed gap 50 is provided between the second movable section 101 and the protrusion supporting section 201 in the direction of the optical axis 10, such that the second movable section 101 is freely pivotable with respect to the protrusion supporting section 201 in the entire area in which the second movable section 101 is movable. Therefore, the protrusion supporting section 201 has a convexed partial spherical face 201A centered around the sphere center 202A. The second movable section 101 has a fall preventive regulation face 101A having a shape of a concaved spherical face centered around the sphere center 202A. Between the partial spherical face 201A and the fall preventive regulation face 101A, the gap 50 is made.

The gap 50 is set to have a distance with which even if the contact face 102C is separated from the protrusion section 202, the contact face 102C can be returned to the state of contacting the protrusion section 202 by the magnetic attracting force F of the attracting magnet 404. Namely, even in the state where the first movable section 102 moves downward by a distance equal to the gap 50 and so the partial spherical face 201A contacts the fall preventive regulation face 101A, the movable unit can be returned by the magnetic attracting force F of the attracting magnet 404 to the original state where the contact face 102C is in contact with the protrusion section 202.

Owing to this, this embodiment can provide a camera driving apparatus having a high impact resistance, in which the first movable section 102, even if instantaneously falling from a prescribed position, can be immediately returned to the original well-supported state by the magnetic attracting force F of the attracting magnet 404.

In the case where the radius of the fall preventive regulation face 101A centered around the sphere center 202A is decreased to a minimum possible size, the space required to provide the fall preventive regulation face 101A can be reduced, which can contribute to the size reduction of the apparatus.

Now, a structure for driving the movable unit will be described. The camera driving apparatus 155 includes a first driving section for inclining the first movable section 102 having the camera section 100 mounted thereon and the second movable section 101 in the panning direction 20 and the tilting direction 21 with respect to the third movable section 103, and a second driving section for rotating the third movable section 103 in the rolling direction 22 with respect to the base 200.

The first driving section includes a panning driving section including panning driving magnets 401, panning magnetic yokes 203 and panning driving coils 301; and a tilting driving section including tilting driving magnets 402, tilting magnetic yokes 204 and tilting driving coils 302.

Figure 44:
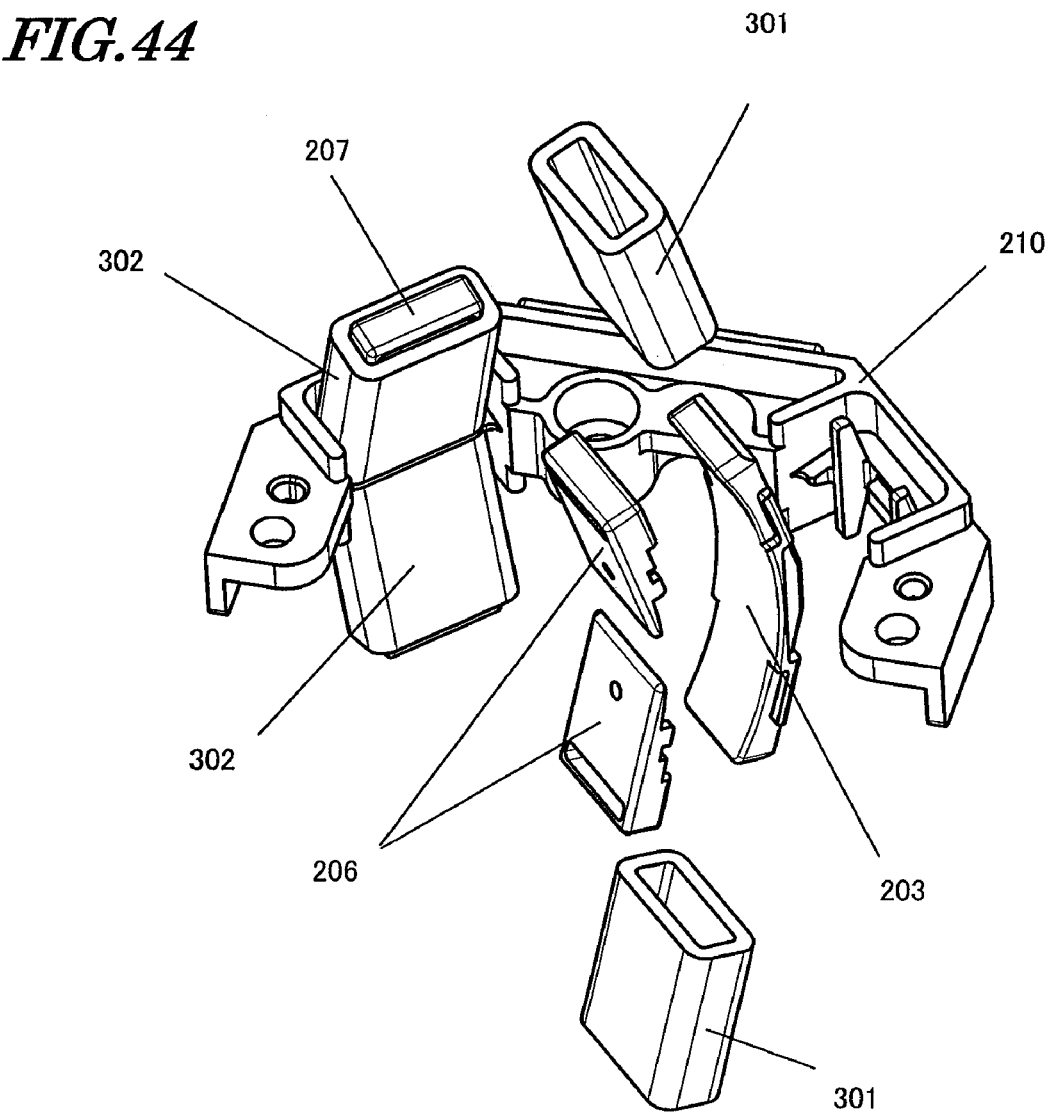
FIG. 44 is an exploded isometric view showing a structure of a first driving section in the camera driving apparatus in Embodiment 5.

With reference to FIGS. 37, 41 and 44, a structure of the panning driving section and the tilting driving section will be described.

FIG. 44 is an exploded isometric view showing a structure of the panning driving section and the tilting driving section. FIG. 41 is a cross-sectional view of the panning driving section taken along the tilting direction rotation axis 11. The panning driving section and the tilting driving section have the same basic structure except that the rotation axes thereof are shifted from each other by degrees. Hence, a cross-sectional view of the tilting driving section taken along the panning direction rotation axis 12 is omitted, and the corresponding elements are represented in the parentheses.

The panning driving section drives and rotates the first movable section 102 in the panning direction 20 around the panning direction rotation axis 12. For this operation, the panning driving section includes the panning driving magnets 401 attached to the first movable section 102, the panning magnetic yokes 203 attached to the connection sections 210 so as to face the panning driving magnets 401, panning bobbins 206 attached to the panning magnet yokes 203, and panning driving coils 301 wound around the panning bobbins 206.

The panning driving magnets 401 are a pair of magnets located on the tilting direction rotation axis 11 symmetrically with respect to the sphere center 202A, and are each magnetized to one pole so as to have a magnetic flux in the direction of the tilting direction rotation axis 11.

The panning magnetic yokes 203 are magnetic yokes formed of a pair of magnetic members and face the pair of panning driving magnets 401. Faces of the panning magnetic yokes 203 facing the panning driving magnets 401 each have a shape of a partial cylinder side face having a center on the tilting direction rotation axis 11 such that a rapid change of the magnetic gap is not caused by the rotation of the panning driving magnets 401 in the directions of arrows 20A and 20B.

The panning bobbins 206 are attached to each panning magnetic yoke 203 so as to wind (attach) the panning driving coils 301 on the panning magnetic yoke 203 having a shape of a partial cylinder side face. The panning bobbins 206 are structured to fill the gap between the panning driving coils 301 and the panning magnetic yoke 203 when the panning driving coils 301 are formed in a V-shape along the rotation of the panning driving magnets 401 in the directions of arrows 20A and 20B.

Two panning driving coils 301 are provided for one panning driving magnet 401 and are wound around the panning bobbins 206 while being separated at the height position of the sphere center 202A.

The pair of panning magnetic yokes 203 and the panning driving coils 301 are fixed to the third movable section 103 via the pair of connection sections 210 (FIG. 37), which are located symmetrically with respect to the optical axis 10.

Similarly, the tilting driving section drives and rotates the first movable section 102 in the tilting direction 21 around the tilting direction rotation axis 11. For this operation, the tilting driving section includes the tilting driving magnets 402 attached to the first movable section 102, the tilting magnetic yokes 204 attached to the connection sections 210 so as to face the tilting driving magnets 402, tilting bobbins 207 attached to the tilting magnet yokes 204, and tilting driving coils 302 wound around the tilting bobbins 207.

The tilting driving magnets 402 are a pair of magnets located on the panning direction rotation axis 12 symmetrically with respect to the sphere center 202A, and are each magnetized to one pole so as to have a magnetic flux in the direction of the panning direction rotation axis 12.

The tilting magnetic yokes 204 are magnetic yokes formed of a pair of magnetic members and face the pair of tilting driving magnets 402. Faces of the tilting magnetic yokes 204 facing the tilting driving magnets 402 each have a shape of a partial cylinder side face having a center on the panning direction rotation axis 12 such that a rapid change of the magnetic gap is not caused by the rotation of the tilting driving magnets 402 in the directions of arrows 21A and 21B.

The tilting bobbins 207 are attached to each tilting magnetic yoke 204 so as to wind (attach) the tilting driving coils 302 on the tilting magnetic yoke 204 having a shape of a partial cylinder side face. The tilting bobbins 207 are structured to fill the gap between the tilting driving coils 302 and the tilting magnetic yoke 204 when the tilting driving coils 302 are formed in a V-shape along the rotation of the tilting driving magnets 402 in the directions of arrows 21A and 21B.

Two tilting driving coils 302 are provided for one tilting driving magnet 402 and are wound around the tilting bobbins 207 while being separated at the height position of the sphere center 202A.

The pair of tilting magnetic yokes 204 and the tilting driving coils 302 are fixed to the third movable section 103 via the pair of connection sections 210 (FIG. 37), which are located symmetrically with respect to the optical axis 10.

Accordingly, a structure for performing the driving and rotating operation in the panning direction 20 includes two panning driving magnets 401, two magnetic yokes and four driving coils. A structure for performing the driving and rotating operation in the tilting direction 21 includes two panning driving magnets 402, two magnetic yokes and four driving coils.

Now, with reference to FIGS. 41, 45 and 46, a neutral position return function of the first movable section 102 using an inclination motion of the panning driving section and the tilting driving section and the magnetic attracting force will be described.

Figure 45:
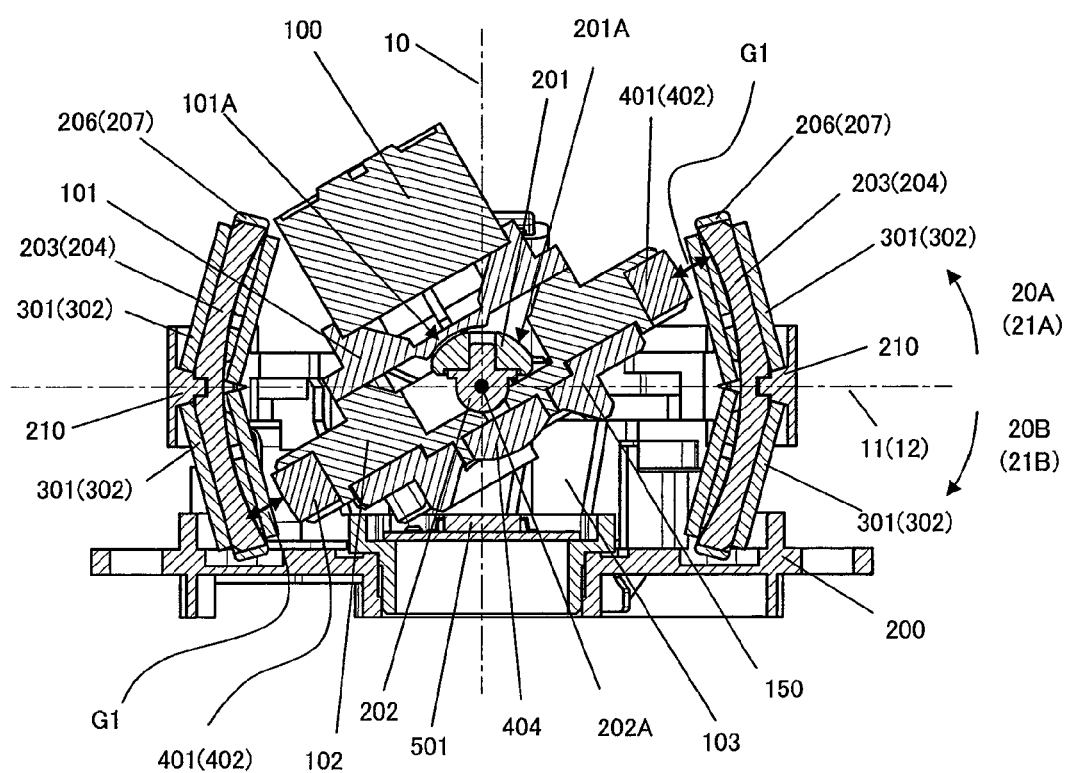
FIG. 45 is a cross-sectional view of the camera driving apparatus in Embodiment 5 taken along line A-A shown in FIG. 39(a) when a first movable section is driven in the panning direction (tilting direction).

FIG. 45 is a cross-sectional view of the camera driving apparatus 155 taken along line A-A in FIG. 39(*a*), which shows a state when driving in the panning direction (tilting direction) is performed. FIG. 45 is a cross-sectional view of the panning driving section taken along the tilting direction rotation axis 11. The panning driving section and the tilting driving section have the same basic structure except that the rotation axes thereof are shifted from each other by 90 degrees. Hence, a cross-sectional view of the tilting driving section taken along the panning direction rotation axis 12 is omitted, and the corresponding elements are represented in the parentheses.

Figure 46:
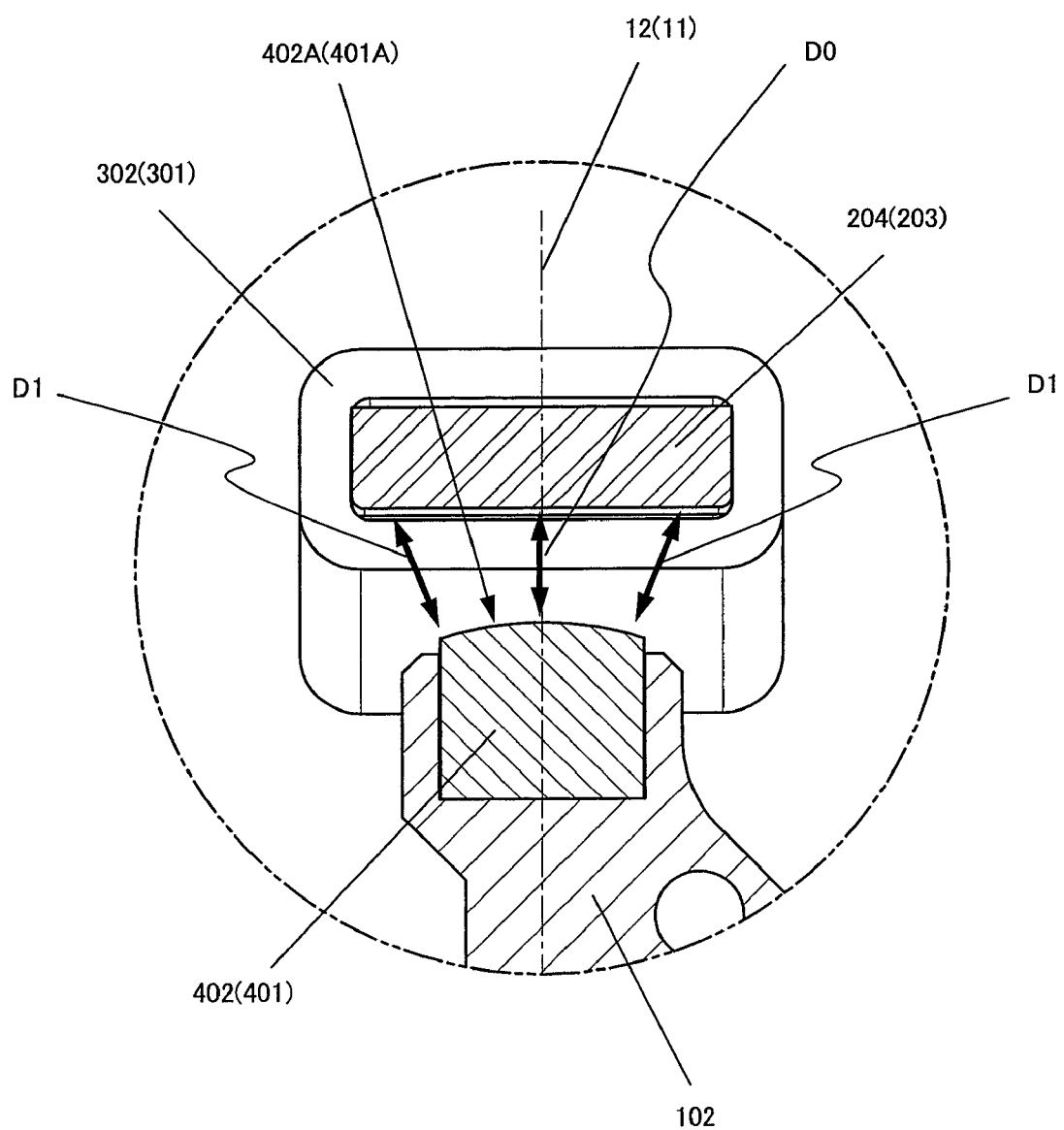
FIG. 46 is a cross-sectional view of a main part of the camera driving apparatus in Embodiment 5, showing the positional relationship between panning and tilting driving magnets and magnetic yokes.

FIG. 46 is a cross-sectional view of a main part of the camera driving apparatus 155, showing the positional relationship between the tilting driving magnet 402, the tilting magnetic yoke 204 for tilting driving. FIG. 46 shows a main part of the tilting driving section. The panning driving section and the tilting driving section have the same basic structure except that the rotation axes thereof are shifted from each other by 90 degrees. Hence, a cross-sectional view of a main part of the panning driving section is omitted, and the corresponding elements are shown in the parentheses.

As shown in FIGS. 41 and 45, by electrifying the four panning driving coils 301, the pair of panning driving magnets 401 receive a couple electromagnetic force. Therefore, the first movable section 102 is driven and rotated in the panning direction 20A or 20B around the sphere center 202A (panning direction rotation axis 12). When the four panning driving coils 301 are electrified in a prescribed direction in the state shown in FIG. 41 where the first movable section 102 is at the neutral position with an inclining angle of 0 degrees, the first movable section 102 is driven in the direction of arrow 20A as shown in FIG. 45. When the four panning driving coils 301 are electrified in the opposite direction, the first movable section 102 is driven in the direction of arrow 20B.

Similarly, by electrifying the four tilting driving coils 302, the pair of tilting driving magnets 402 receive a couple electromagnetic force. Therefore, the first movable section 102 is driven and rotated in the tilting direction 21A or 21B around the sphere center 202A (tilting direction rotation axis 11). When the four tilting driving coils 302 are electrified in a prescribed direction in the state shown in FIG. 41 where the first movable section 102 is at the neutral position with an inclining angle of 0 degrees, the first movable section 102 is driven in the direction of arrow 21A as shown in FIG. 45. When the four tilting driving coils 301 are electrified in the opposite direction, the first movable section 102 is driven in the direction of arrow 21B.

Therefore, by electrifying the panning driving coils 301 and the tilting driving coils 302 at the same time, the second movable section and the camera section 100 fixed to the first movable section 102 can be inclined two-dimensionally around the sphere center 202A. By changing the direction of the current to flow in the panning driving coils 301 and the tilting driving coils 302, the camera section 100 can be driven arbitrarily in the panning direction 20A or 20B or the tilting direction 21A or 21B.

In this embodiment, the following arrangement is made regarding the magnetic gaps between the concaved R faces of the panning magnetic yokes 203 and the panning driving magnets 401. It is assumed that the magnetic gap when the inclining angle of the first movable section 102 is 0 degrees as shown in FIG. 41 is G0 and the magnetic gap when the first movable section 102 is inclined in the direction of arrow 20A as shown in FIG. 45 is G1. The side faces of the panning magnetic yokes 203 have a shape of a concaved partial cylinder side face, such that G0 and G1 fulfill the relationship of G0<G1. Therefore, the magnetic attracting force when the inclining angle of the first movable section 102 is 0 degrees as shown in FIG. 41 is greater than the magnetic attracting force when the first movable section 102 is inclined in the direction of arrow 20A as shown in FIG. 45. Thus, the first movable section 102 can be kept at the neutral position (inclining angle: 0 degrees) using the magnetic spring provided by the magnetic attracting force.

Regarding the tilting driving section, the basic structure is the same except that the rotation axis thereof is shifted from that of the panning driving section by 90 degrees. Namely, the first movable section 102 can be kept at the neutral position (inclining angle: 0 degrees) in the same manner.

In this embodiment, as shown in FIG. 46, a face 402A of the tilting driving magnet 402 facing the tilting magnetic yoke 204 has a shape of a convexed partial spherical face. Owing to this, a magnetic gap D0 between the tilting driving magnet 402 and a central part of the tilting magnetic yoke 204 facing the tilting driving magnet 402 can be smaller than a magnetic gap D1 between the tilting driving magnet 402 and an end part of the tilting magnetic yoke 204 facing the tilting driving magnet 402. As a result, the magnetic attracting force at the central part of the tilting magnetic yoke 204 is increased, and thus the movable section 102 can be driven while being kept along the central part of the tilting magnetic yoke 204 using the magnetic spring provided by the magnetic attracting force.

Regarding the panning driving magnet 401 and the panning magnetic yoke 203 also, the movable section 102 can be driven while being kept along the central part of the panning magnetic yoke 203 using the magnetic spring provided by the magnetic attracting force in the same manner.

Accordingly, a pivot supporting structure formed of the spherical protrusion section 202 having a degree of freedom also in the rolling direction 22 provides support only by two driving shafts in the panning direction 20 and the tilting direction 21. Thus, the structure of supporting by two driving shafts can be provided with a smaller space than by the conventional art.

Figure 47:
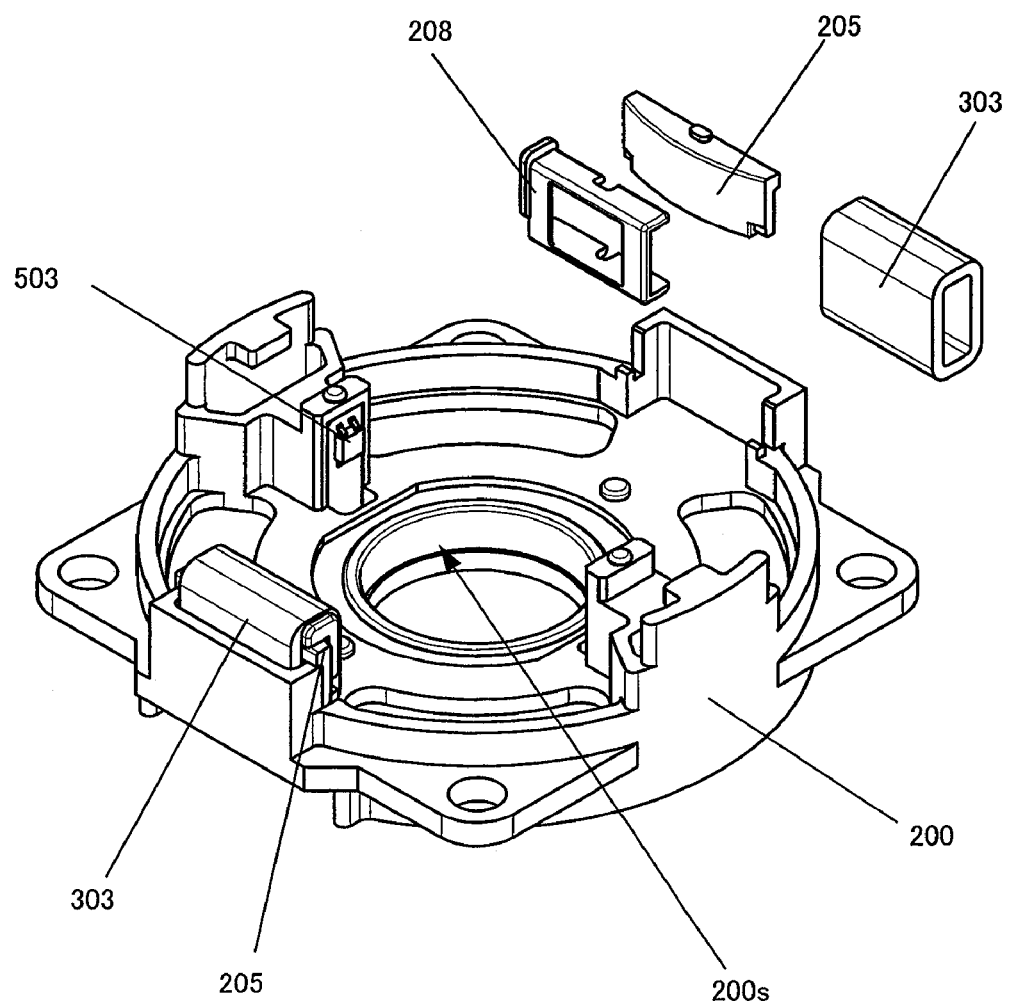
FIG. 47 is an exploded isometric view showing a structure of a second driving section of the camera driving apparatus in Embodiment 5.

Now, a rolling driving section as the second driving section for rotating the third movable section 103 in the rolling direction 20 with respect to the base 200 will be described. FIG. 47 is an exploded isometric view showing a structure of the rolling driving section in the camera driving apparatus 155.

The rolling driving section drives and rotates the third movable section 103 in the rolling direction 22 around the optical axis 10. The rolling driving section includes rolling driving magnets 405 attached to the third movable section 103, rolling magnetic yokes 205 attached to the base 200 so as to face the rolling driving magnets 405, rolling bobbins 208 attached to the rolling magnetic yokes 205, and rolling driving coils 303 wound around the rolling bobbins 208.

The rolling driving magnets 405 are a pair of magnets located symmetrically with respect to the optical axis 10, on a straight line 15 (FIG. 43) having an angle of degrees with respect to the panning direction rotation axis 12 or the tilting direction rotation axis 11. The rolling driving magnets 405 are each magnetized to one pole so as to have a magnetic flux in the direction of the straight line 15.

The rolling magnetic yokes 205 are magnetic yokes formed of a pair of magnetic members facing the pair of rolling driving magnets 405. The faces of the rolling magnetic yokes 205 facing the rolling driving magnets 405 each have a convexed partial cylinder side face such that the magnetic gap is minimum when the third movable section 103 is at a neutral position in the rolling direction 22. Such a shape is provided in order to keep the third movable section 103 at the neutral position by the magnetic spring effect using a fluctuation of the magnetic attracting force.

The rolling bobbins 208 are attached to each rolling magnetic yoke 205 so as to wind the tilting driving coil 303 around the rolling magnetic yoke 205 having a shape of a partial cylinder side face. The rolling bobbins 208 are structured to fill the gap between the rolling driving coil 303 and the rolling magnetic yoke 205 such that the rolling driving coil 303 is located in a direction perpendicular to the straight line 15.

The rolling driving coil 303 is wound around the pair of rolling bobbins 208 in a direction perpendicular to the panning driving coils 301 and the tilting driving coils 302.

The pair of rolling magnetic yokes 205 and the pair of rolling driving coils 303 are provided below the height position of the sphere center 202A, and are located at a planar position having an angle of 45 degrees with respect to the panning or tilting driving section as seen in the direction of the optical axis 10. Owing to this, the pair of rolling magnetic yokes 205 and the pair of rolling driving coils 303 are avoided from interfering with the panning or tilting driving section, and the area in the height direction can be effectively used to reduce the height of the apparatus.

By providing the rolling driving section below the sphere center 202A, the height position of the magnetic circuit of the rolling driving section can be different from the height position of the magnetic circuits of the panning and tilting driving sections. In this manner, the influence of the magnetic coupling of the rolling driving magnets 405 and the panning and tilting driving magnets 401 and 402 can be reduced to suppress the generation of a crosstalk caused by the interference of the magnetic circuits during the driving operation.

Now, with reference to FIG. 43 and FIG. 48, a neutral position return function of the third movable section 103 using a rotation motion of the rolling driving section and the magnetic attracting force will be described.

Figure 48:
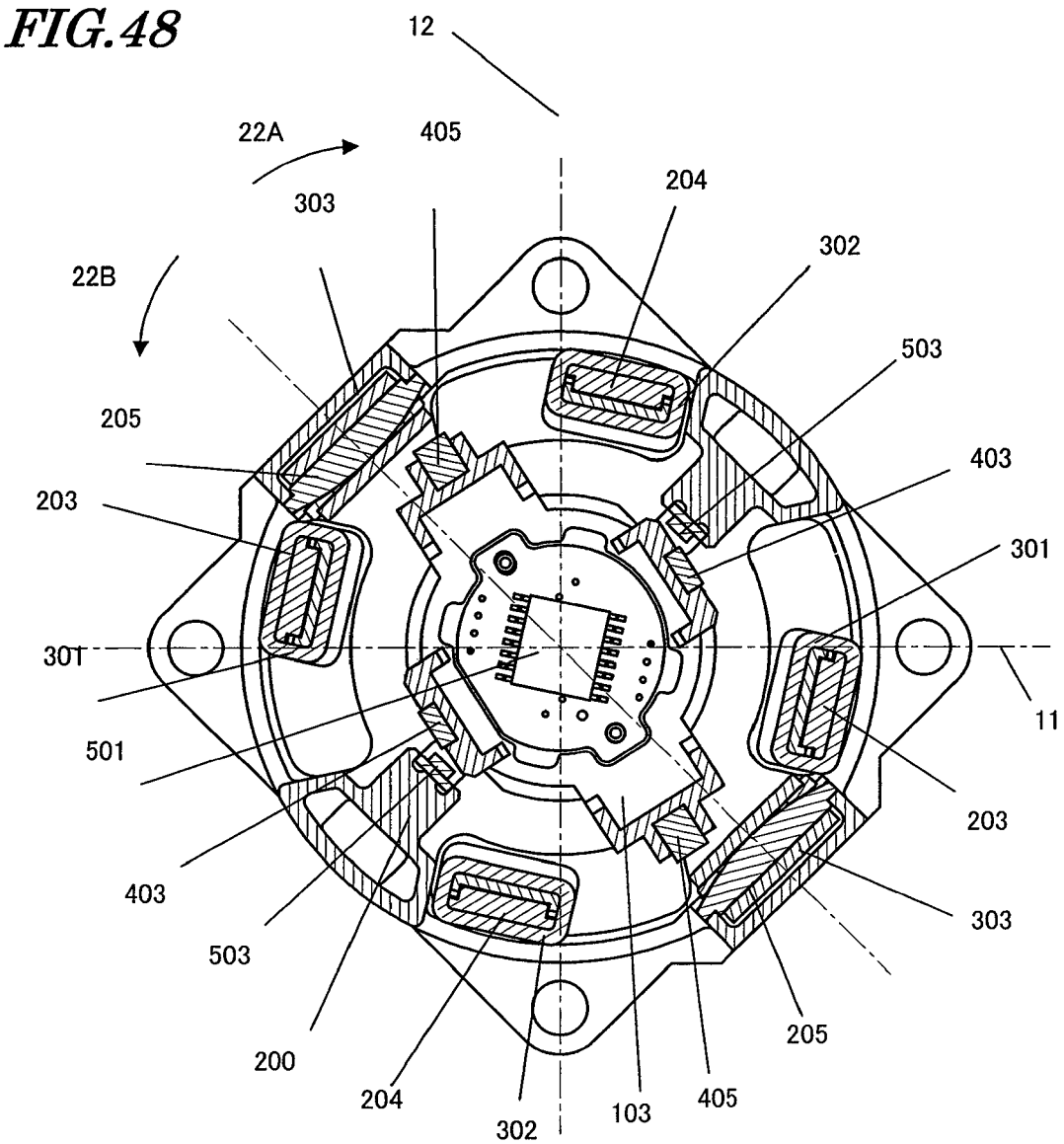
FIG. 48 is a cross-sectional view of the camera driving apparatus in Embodiment 5 taken along line C-C shown in FIG. 39(b) when a third movable section is driven in a rolling direction.

FIG. 48 is a cross-sectional view of the camera driving apparatus 155 taken along line C-C in FIG. 39(b), which shows a state when driving in the rolling direction is performed.

As shown in FIG. 43 and FIG. 48, by electrifying the pair of rolling driving coils 303, the pair of rolling driving magnets 405 receive a couple electromagnetic force. Therefore, the third movable section 103 is driven and rotated in the rolling direction 22A or 22B around the optical axis 10. When the rolling driving coils 303 are electrified in a prescribed direction in the state shown in FIG. 43 where the third movable section 103 is at the neutral position with an inclining angle of 0 degrees, the third movable section 103 is driven in the direction of arrow 22A as shown in FIG. 48. When the rolling driving coils 303 are electrified in the opposite direction, the third movable section 103 is driven in the direction of arrow 22B.

Thus, by changing the direction of the current to flow in the rolling driving coils 303, the camera section 100 supported by the third movable section 103 via the protrusion supporting section 201 can be driven arbitrarily in the rolling direction 22A or 22B.

In this embodiment, as described above, the faces of the rolling magnetic yokes 205 facing the rolling driving magnets 405 each have a shape of a convexed partial cylinder side face. Therefore, the magnetic gap between the rolling magnetic yokes 205 and the rolling driving magnets 405 when the rotating angle of the third movable section 103 is 0 degrees as shown in FIG. 43 is smaller than the magnetic gap when the third movable section 103 is rotated in the direction of arrow 22A as shown in FIG. 48. Owing to this, the magnetic attracting force when the rotating angle of the third movable section 103 is 0 degrees as shown in FIG. 43 is greater than the magnetic attracting force when the third movable section 103 is rotated in the direction of arrow 22A as shown in FIG. 48. Thus, the third movable section 103 can be kept at the neutral position (rotating angle: 0 degrees) using the magnetic spring provided by the magnetic attracting force.

Now, detection of inclination and rotation of the movable unit will be described. The camera driving apparatus 155 includes a first detection section for detecting a two-dimensional inclining angle of the camera section 100 with respect to the third movable unit 103 and a second detection section for detecting a rotating angle of the camera section 100 around the lens optical axis 10.

First, the first detection section will be described. In order to detect an inclining angle of the camera section 100 in the panning direction 20 and the tilting direction 21, the camera driving apparatus 155 further includes a first magnetic sensor 501 and a circuit board 502 having the first magnetic sensor 501 mounted thereon.

As shown in FIG. 37 and FIG. 41, the first magnetic sensor 501 is attached to the third movable section 103 via the circuit board 502 so as to face the attracting magnet 404 magnetized to one pole in the direction of the optical axis 10.

Inside the first magnetic sensor 501, a pair of hole elements (not shown) are provided on the panning direction rotation axis 12 symmetrically with respect to the optical axis 10, and a pair of hole elements (not shown) are provided on the tilting direction rotation axis 11 symmetrically with respect to the optical axis 10. The first magnetic sensor 501 detects a change of the magnetic force of the attracting magnet 404 which is caused by an inclination motion of the movable unit in the panning direction 20 and the tilting direction 21 as a biaxial component, and thus can calculate a panning inclining angle and a tilting inclining angle.

The face of the attracting magnet 404 facing the first magnetic sensor 501 has a shape of a convexed partial spherical face, which is a part of the spherical face centered around the sphere center 202A of the protrusion section 202. Even when the movable unit is inclined at a large angle of ±20 degrees or greater, the distance between the surface of the magnet and the first magnetic sensor 501 does not change, and a drastic change of the magnetic force by an end part of the magnet does not occur. Therefore, the output of the first magnetic sensor 501 is not saturated, and so a large inclining angle of the first movable section 102 can be detected. In other words, because the attracting magnet 404 has a shape of a convexed partial spherical face centered around the sphere center 202A, the angle detection range of the magnetic sensor can be enlarged.

As described above, in this embodiment, the attracting magnet 404 acts as a magnet for detecting inclining angles in addition to having a function of providing the magnetic attracting force F to the protrusion section 202. Therefore, the number of components can be decreased and the size of the apparatus can be reduced.

Now, the second detection section will be described. The camera driving apparatus 155 further includes a pair of rotation detection magnets 403 attached to the third movable section 103 and second magnetic sensors 503 for detecting the rotating angle in the rolling direction 22. The second magnetic sensors 503 are attached to the base 200 so as to face the pair of rotation detection magnets 403.

As shown in FIG. 37 and FIG. 40, the pair of rotation detection magnets 403 are fixed to the third movable section 103 so as to be on a line having an angle of 45 degrees with respect to the panning direction rotation axis or the tilting direction rotation axis 11 and to be located symmetrically with respect to the sphere center 202A.

The pair of rotation detection magnets 403 are magnetized in a circumferential direction of a circle centered around the optical axis 10, on a plane perpendicular to the optical axis 10. The pair of rotation detection magnets 403 are each magnetized to two poles in a divided manner (FIG. 37, FIG. 43) in a direction passing the sphere center 202A. In the pair of rotation detection magnets 403, the two magnetic poles are located in opposite orders in the rolling direction 22.

The pair of second magnetic sensors 503 detect a change of the magnetic force of the rotation detection magnets 403 which is caused by a rotation motion of the third movable section 103 in the rolling direction 22, and thus can calculate a rotating angle in the rolling direction. Since the rotation detection magnets 403 are each magnetized to two poles in a divided manner, the rotation motion of the third movable section 103 in the rolling direction 22 provides a drastic change of the magnetic force. By detecting this change of the magnetic force, the rotation angle can be detected at a high sensitivity.

The camera driving apparatus 155 in this embodiment adopts a moving magnet driving system in which the panning driving magnets 401 and the tilting driving magnets 402 are provided on the first movable section 102. This structure is generally considered to have a problem that the weight of the first movable section 102 is increased. However, this structure has significant advantages that the electric wiring for driving in the first movable section 102 is not required and that the heat of the panning driving coils 301 and the tilting driving coils 302 can be cooled by the panning magnetic yokes 203, the tilting magnetic yokes 204, the third movable section 103, the connection sections 210, and components other than those of the camera driving apparatus 155.

For rolling driving also, the camera driving apparatus 155 in this embodiment adopts a moving magnet driving system. Therefore, there is a significant advantage that the heat of the rolling driving coils 303 can be cooled by the rolling magnetic yokes 205, the base 200, and components other than those of the camera driving apparatus 155.

In this embodiment, exclusive driving magnets and magnetic circuits are provided independently for driving in the panning direction 20, the tilting direction 21 and the rolling direction 22. Therefore, as compared with the structure in which the same driving components are used for driving in different directions, the driving efficiency of the movable unit can be improved.

Figure 49:
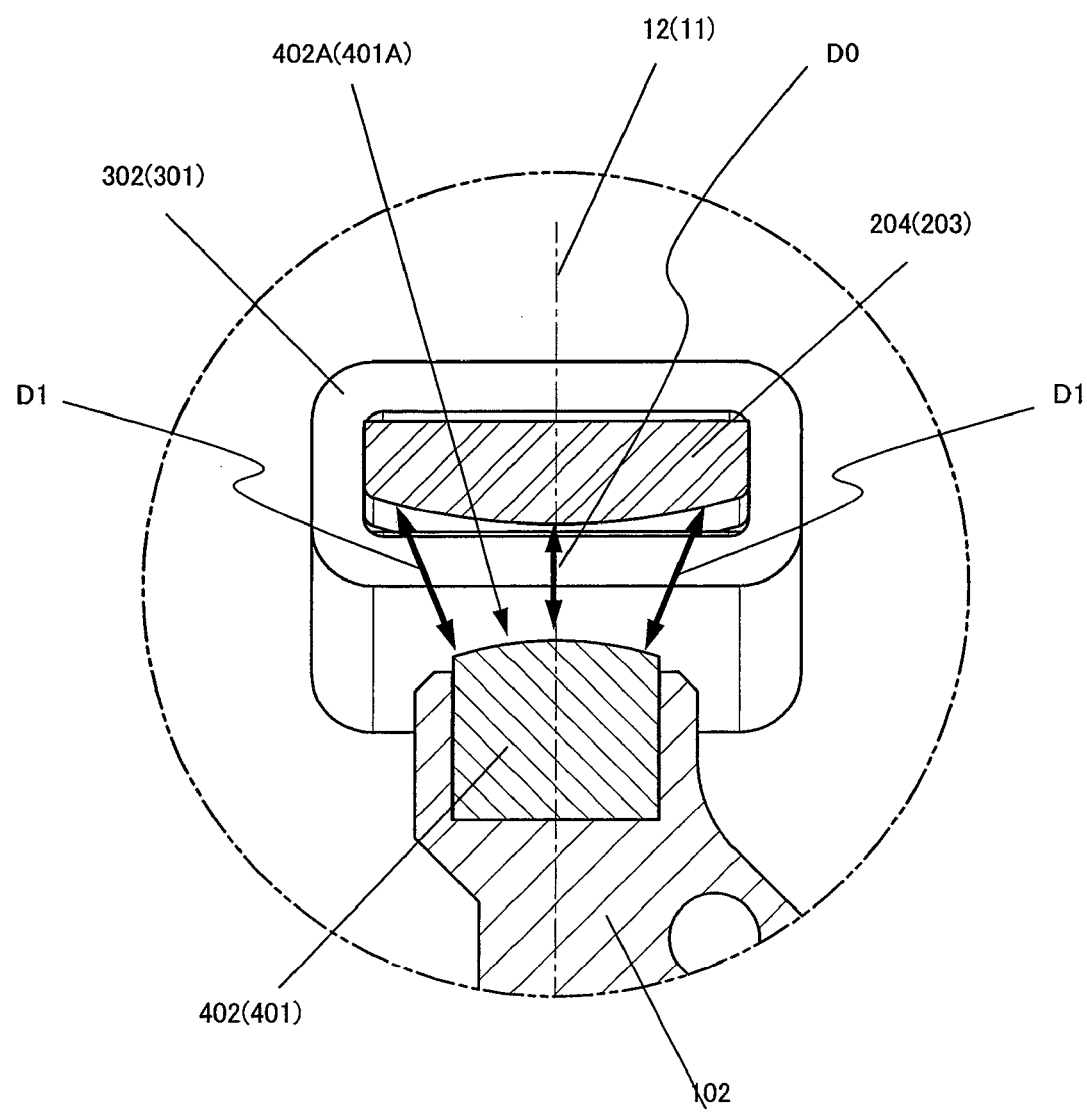
FIG. 49 is a cross-sectional view of a main part of the camera driving apparatus in Embodiment 5, showing the positional relationship between the panning and tilting driving magnets and magnetic yokes, in the case where the magnetic yokes have a convexed shape.

In this embodiment, the side faces of the panning magnetic yokes 203 and the tilting magnetic yokes 204 facing the respective driving magnets each have a shape of a concaved partial cylinder side face, and the cross-sectional shape thereof is substantially flat with respect to the respective driving magnets as shown in FIG. 46. The present invention is not limited to this. For example, as shown in FIG. 49, a side surface of the panning magnetic yoke 203 or the tilting magnetic yoke 204 facing the respective driving magnet may have a shape of a convexed partial spherical face. Owing to this, a magnetic gap D0 between a central part of the panning magnetic yoke 203 or the tilting magnetic yoke 204 and the respective driving magnet can be larger than a magnetic gap D1 between an end part of each magnetic yoke and the respective driving magnet. Therefore, the magnetic spring effect at the central part of each of the panning magnetic yokes 203 and the tilting magnetic yokes 204 can be improved, and thus the force for holding the first movable section 102 in the panning direction and the tilting direction can be improved.

In this embodiment, faces 401A and 402A of the panning and tilting driving magnets 401 and 402 facing the respective magnetic yokes each have a shape of a convexed spherical face. The present invention is not limited to this. For example, as described above, the magnetic yokes may each have a shape of a convexed partial cylinder side face while the panning and tilting driving magnets 401 and 402 may each have a shape of a convexed partial cylinder side face.

In this embodiment, the rolling driving section acts as the second driving section and includes the rolling driving magnets 405 and the rolling driving coils 303 to provide an electromagnetic force for driving. The present invention is not limited to this. The second driving section may include, for example, a rotatable motor such as a DC motor or a stepping motor.

In this embodiment, the rolling driving section is provided below the height position of the sphere center 202A. The present invention is not limited to this. As long as the rolling driving section is provided at a planar position having an angle of 45 degrees with respect to the panning driving section or the tilting driving section as seen in the direction of the optical axis 10, the rolling driving section may be provided above the height position of the sphere center 202A.

In this embodiment, means for detecting the rolling driving is structured to detect a change of the magnetic force by the rotation detection magnets 403 and the second magnetic sensors 503. The present invention is not limited to this. For example, the rotating angle in the rolling direction may be detected by an encoder using a photo-interrupter or a driving step using a stepping motor.

As described above, the camera driving apparatus in this embodiment adopts a structure in which the sphere center of the partial spherical face provided on the protrusion section supported by the third movable section and the central axis of the conical contact face of the first movable section 102 are located on the lens optical axis of the camera section, and the first and second movable sections are coupled to each other while sandwiching the protrusion section located therebetween. Therefore, a structure for supporting the first and second movable sections at the center of gravity is realized, and so the mechanical resonance in the driving frequency band can be significantly suppressed.

In a pivot structure formed of the protrusion section and the contact face of the first movable section, a constant vertical drag can be provided by a magnetic attracting force which is unlikely to be influenced by the pivoting angle of the first movable section. Therefore, a fluctuation of the frictional load in accordance with the pivoting angle is reduced, and a good phase characteristic and a good gain characteristic are realized in the driving frequency band.

Conventionally, how to prevent the movable unit from falling due to an external disturbance such as vibration, impact or the like has been a serious problem specific to a supporting structure utilizing a magnetic attracting force. In order to solve this problem, a fall preventive regulation face is provided on one of the divided sections of the movable unit along a prescribed gap along which the movable unit is pivotable. Therefore, the movable unit can be prevented from falling with certainty while avoiding the apparatus from being increased in size.

In the movable unit, the fall preventive regulation face and the conical contact face are both located symmetrically on the lens optical axis. The sphere center of the partial curved face of the protrusion section for supporting the movable unit is located on the optical axis. Therefore, in the entire area in which the movable unit is pivotable, a concaved fall preventive regulation face can be provided with the minimum possible area size, which realizes the size reduction of the apparatus.

The position of the fall preventive regulation face is determined such that even if the movable unit falls from the fixed unit and the fixed unit contacts the fall preventive regulation face of the movable unit, the protrusion section in the fixed unit and the contact face of the movable unit are put into contact with each other again by the magnetic attracting force F to form a pivot structure. Therefore, a camera driving apparatus having a very high impact resistance can be provided, in which the movable unit, even if instantaneously falling, can be immediately returned to the original well-supported state.

The driving section for driving in the panning and the tilting directions includes a pair of panning driving magnets and a pair of tilting driving magnets which are fixed to the first movable section and are located in a circumferential direction of a circle centered around the optical axis. The pair of panning driving magnets and the pair of tilting driving magnets are located on two straight lines perpendicular to each other. The driving section further includes a pair of panning magnetic yokes and a pair of tilting magnetic yokes provided on the third movable section so as to face the respective driving magnets, and panning and tilting driving coils wound around the panning and tilting magnetic yokes. The height position of these components in the direction of the optical axis is generally equal to the height position of the sphere center of the protrusion section. Therefore, the movable unit can be driven mainly at the center of gravity, and the mechanical resonance in the driving frequency band can be significantly suppressed.

The faces of the panning driving magnets and the tilting driving magnets facing the respective magnetic yokes each have a shape of a convexed partial spherical face or a shape of a partial cylinder side face. Owing to this, the magnetic gap between the central part of each magnetic yoke and the corresponding driving magnet can be decreased. Owing to this, it is possible to rotate the first and second movable sections in the panning direction and the tilting direction along the two pairs of magnetic yokes while suppressing the first and second movable sections from rotating in the rolling direction, using the magnetic spring effect. Accordingly, a pivot supporting structure formed of the spherical protrusion section having a degree of freedom also in the rolling direction provides support substantially only by two driving shafts in the panning direction and the tilting direction. Thus, the structure of supporting by two driving shafts can be provided with a smaller space than by the conventional art.

The protrusion supporting section is located such that an area, on which the protrusion supporting section fixed to the third movable section is projected, is on a straight line having an angle of 45 degrees with respect to the panning direction or the tilting direction when seen in the direction of the optical axis. The protrusion supporting section has a shape of a fixed-fixed beam which is symmetrical with respect to the spherical protrusion section. Owing to this, the area usable for the driving section for driving in the panning direction and the tilting direction can be enlarged to raise the degree of freedom of the structure, and also the rigidity of the second movable section can be improved to significantly suppress the mechanical resonance of the second movable section.

A pair of panning driving coils and a pair of tilting driving coils are in a general V-shape while being divided into two at the height of the sphere center, and are located symmetrically with respect to the optical axis such that the trough portions of the V-shapes face each other. Owing to this, even when the inclining angle or the rotating angle of the movable unit is large, the magnetic gaps between the driving magnets and the magnetic yokes can be small. This can improve the driving efficiency in the panning, tilting and rolling directions. In addition, the side faces of the panning magnetic yokes and the tilting magnetic yokes facing the respective driving magnets each have a shape of a concaved partial spherical face or partial cylinder side face having the center on a plane which includes the sphere center of the protrusion section and is perpendicular to the optical axis. Owing to this, a change of the magnetic attracting force during the driving operation can be further suppressed.

The concaved partial spherical face or partial cylinder side face of each of the panning magnetic yokes and the tilting magnetic yokes is structured such that when the inclining angle of the first movable section is 0 degrees, the magnetic gaps between the panning and tilting magnetic yokes and the corresponding driving magnets are minimized. Owing to this, the movable unit can be kept at a neutral position by the magnetic spring provided by the magnetic attracting force.

The rolling driving section includes a pair of rolling driving magnets provided on the third movable section which is pivotably supported by the base, rolling magnetic yokes provided on the base so as to face the rolling driving magnets respectively, and rolling driving coils wound around the rolling magnetic yokes. The rolling driving section is located at a planar position having an angle of 45 degrees with respect to the panning driving magnets or the tilting driving magnets as seen in the direction of the optical axis. Regarding the height position in the direction of the optical axis, the rolling driving section is located such that the center of projection thereof as seen in a direction perpendicular to the optical axis is not on a plane which is perpendicular to the optical axis and includes the sphere center. Owing to this, the rolling driving section is avoided from interfering with the panning driving section or the tilting driving section, and the area in the height direction can be effectively used to reduce the height of the apparatus. The height position of the magnetic circuit of the rolling driving section is different from the height position of the magnetic circuits of the panning and tilting driving sections. This can suppress the generation of a crosstalk caused by the interference of the magnetic circuits during the driving operation.

The side faces of the rolling magnetic yokes facing the driving magnets each have a shape of a convexed partial cylinder side face. When the rotating angle of the third movable section is 0 degrees, the magnetic gaps between the magnetic yokes and the rolling driving magnets are minimized. Owing to this, the movable unit can be kept at a neutral position by the magnetic spring provided by the magnetic attracting force.

The face of the attracting magnet facing the first magnetic sensor has a shape of a convexed partial spherical face, which is centered around the sphere center of the protrusion section. Owing to this, even when the movable unit is inclined at a large angle of ±20 degrees or greater, the distance between the surface of the magnet and the magnetic sensor does not change, and a drastic change of the magnetic force by an end part of the magnet does not occur. Therefore, the output of the magnetic sensor is not saturated, and so a large inclining angle of the movable section can be detected. In other words, because the attracting magnet has a convexed spherical face centered around the sphere center of the protrusion section, the angle detection range of the magnetic sensor can be enlarged.

The attracting magnet for keeping the pivot support is usable for detecting the inclination of the second movable section in the panning direction and the tilting direction.

This can decrease the number of components and reduce the size of the camera driving apparatus.

By adjusting the weight of the counterweight in accordance with the camera section to be mounted, the degree of freedom of the design and the manner of mounting of the camera section are raised, and the first and second movable sections can be driven at the center of gravity. In addition, the offset current necessary for keeping the first and second movable sections at the neutral position can be reduced, which can improve the driving efficiency of the movable unit and reduce the power consumption.

Also, in the case where the camera driving apparatus is installed in a device which has another supporting system for a rolling driving section and does not require the rolling driving section of the camera driving apparatus, the camera driving apparatus can be employed by mechanically fixing the third movable section, without changing the design of the apparatus. Thus, the range of uses of the camera driving apparatus can be broadened.

Accordingly, the camera driving apparatus in this embodiment allows the movable unit to incline at a large angle of ±20 degrees or greater in the panning direction and the tilting direction, and also to rotate at a large angle of ±20 degrees or greater in the rolling direction. In addition, good shake compensation control is realized in a wide frequency band of up to about 50 Hz. As a result, the camera driving apparatus realizes high-speed panning/tilting/rolling motions of the camera section and also can compensate for image blurring of a photo caused by camera-shake while the photographer is walking. Moreover, the camera driving apparatus has a compact and solid fall preventive structure and so is highly resistant against an external impact such as vibration, falling or the like.

Embodiment 6

Figure 50:
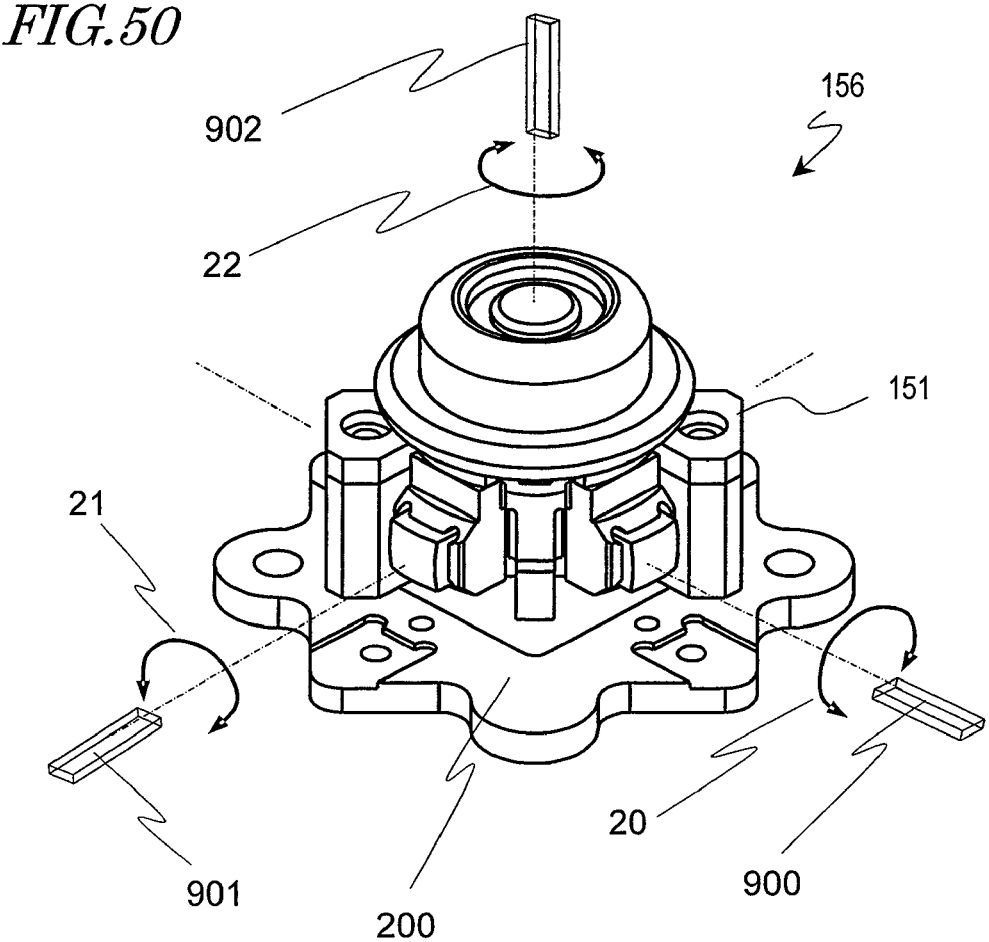
FIG. 50 is an isometric view showing locations of angular velocity sensors provided in a camera unit in Embodiment 6.

A camera unit in an embodiment according to the present invention will be described. A camera unit 156 in this embodiment includes a camera driving apparatus in any of Embodiments 1 through 5 and a control section, and can compensate for image blurring of a photo caused while the photographer is walking. FIG. 50 is an isometric view showing a main part of the camera unit 156, and FIG. 51 is a block diagram of the camera unit 156.

Figure 51:
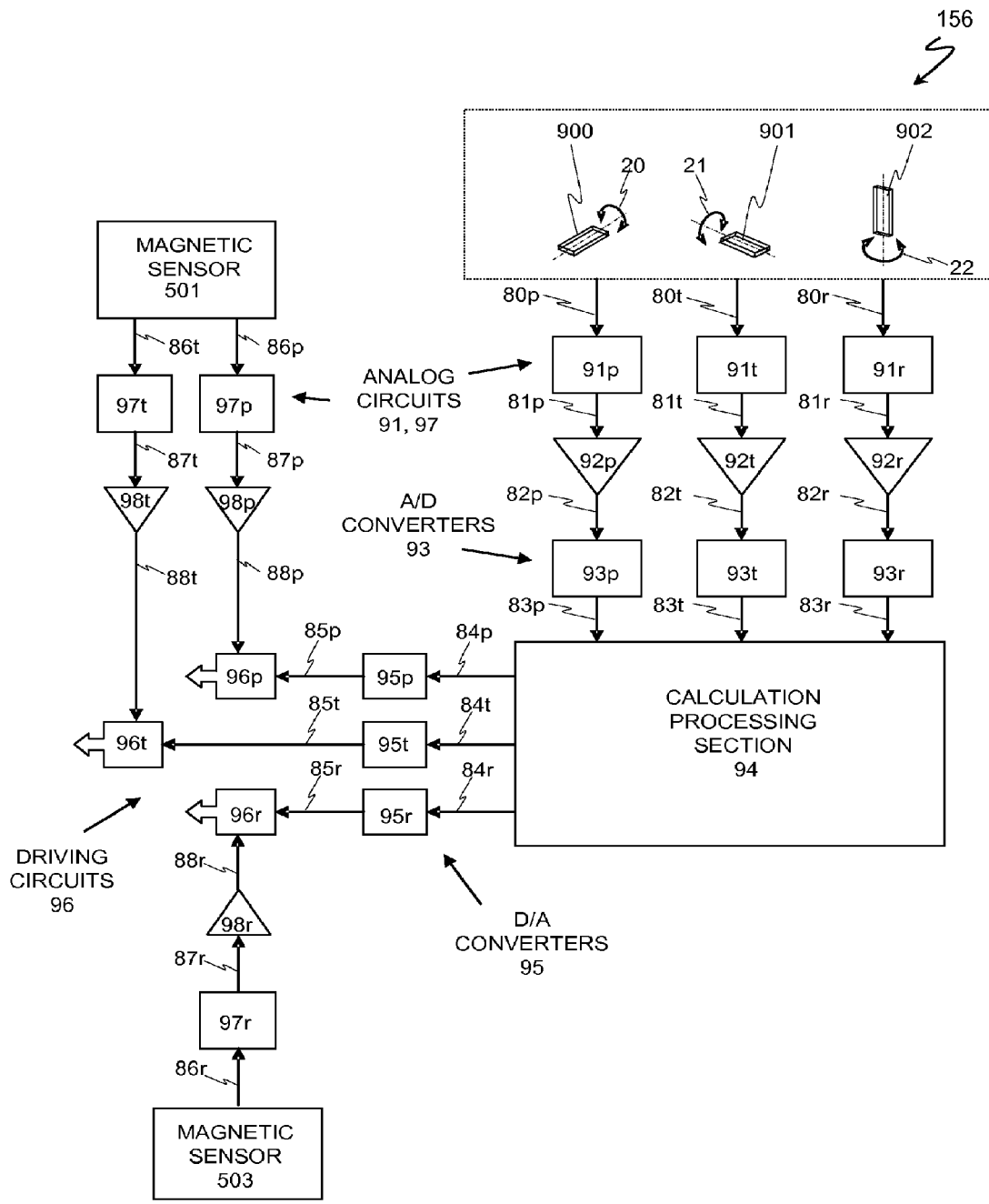
FIG. 51 is a block diagram of the camera unit in Embodiment 6.

As shown in FIG. 50 and FIG. 51, the camera unit 156 includes a camera driving apparatus 151, angular velocity sensors 900, 901 and 902, a calculation processing section 94, and driving circuits 96p, 96t and 96r. In this embodiment, the camera driving apparatus 151 in Embodiment 1 is used as an example, but any of the camera driving apparatuses 152 through 155 in Embodiments 2 through 5 may also be used.

The angular velocity sensors 900, 901 and 902 are attached to the base 200 of the camera driving apparatus or a camera unit main body (not shown) for fixing the base 200. The angular velocity sensors 900, 901 and 902 detect angular velocities around the axes represented with the dotted lines in the figure. Specifically, the angular velocity sensors 900, 901 and 902 respectively detect the angular velocities in the panning direction 20, the tilting direction 21 and the rolling direction 22. FIG. 50 shows three independent angular velocity sensors 900, 901 and 902, but one angular velocity sensor capable of detecting angular velocities around the three axes may be used. The angular velocity sensors only need to detect angular velocities around three axes perpendicular to one another, and the three axes do not need to match the panning direction 20, the tilting direction and the rolling direction 22. In the case where the angular velocities detected by the angular velocity sensors are not the angular velocities around the panning direction 20, the tilting direction 21 and the rolling direction 22, the calculation processing section 94 can convert the obtained values into the angular velocities in the panning direction 20, the tilting direction 21 and the rolling direction 22.

For example, shake angles in the panning direction 20 and the tilting direction 21 caused by the camera-shake when a photo is taken are detected by the angular velocity sensors 900 and 901 respectively. A shake angle in the rolling direction 22 caused by a transfer of the walking balance when the photographer is taking a photo while walking is detected by the angular velocity sensor 902. As shown in FIG. 51, information on the shake angles detected by the angular velocity sensors 900, 901 and 902 is output as angular velocity signals 80p, 80t and 80r respectively.

The angular velocity signals 80p, 80t and 80r are respectively converted into signals suitable for calculation processing to be performed by the calculation processing section 94. Specifically, the angular velocity signals 80p, 80t and 80r are input to analog circuits 91p, 91t and 91r to be deprived of a noise component and a DC drift component. Angular velocity signals 81p, 81t and 81r deprived of the noise component and the DC drift component are input to amplification circuits 92p, 92t and 92r, which respectively output angular velocity signals 82p, 82t and 82r having appropriate values. Then, these signals are converted into digital signals by A/D converters 93p, 93t and 93r, and the obtained digital signals 83p, 83t and 83r are input to the calculation processing section 94.

The calculation processing section 94 performs integral processing of converting the angular velocities into camera-shake angles, and thus sequentially calculates shake angles in the panning direction 20, the tilting direction 21 and the rolling direction 22. The calculation processing section 94 also performs three-axis shake compensation processing. The three-axis shake compensation processing performed by the calculation processing section 94 is an open loop control of driving the movable unit having the camera section 100 mounted thereon so as to suppress the angular velocities in accordance with the angular velocity signals 83p, 83t and 83r detected by the respective angular velocity sensors 900, 901 and 902. The calculation processing section sequentially outputs target rotating angle signals 84p, 84t and 84r as optimum digital shake compensation amounts in consideration of the frequency response characteristic, the phase compensation, the gain compensation and the like of the camera driving apparatus 151.

The target rotating angle signals 84p, 84t and 84r are converted into analog signals by the D/A converters 95p, 95t and 95r, and input to the driving circuits 96p, 96t and 96r as analog target rotating angle signals 85p, 85t and 85r.

In the camera driving apparatus 151, the first and second magnetic sensors 501 and 503, for detecting the rotating angle of the movable unit having the camera section 100 mounted thereon with respect to the base 200, outputs rotating angle signals 86p, 86t and 86r in the panning direction 20, the tilting direction 21 and the rolling direction 22. The rotating angle signals 86p, 86t and 86r are deprived of a noise component and a DC drift component by analog circuits 97p, 97t and 97r and output as rotating angle signals 87p, 87t and 87r. From these signals, rotating angle signals 88*p*, 88*t* and 88*r* having appropriate output values are obtained by amplification circuits 98*p*, 98*t* and 98*r*. The rotating angle signals 88*p*, 88*t* and 88*r* are input to the driving circuits 96*p*, 96*t* and 96*r*.

The driving circuits 96*p*, 96*t* and 96*r* is formed of a feedback system of feeding the rotating angle signals 88*p*, 88*t* and 88*r* to the target angle signals 85*p*, 85*t* and 85*r*. Therefore, when no external force is applied to the camera unit 156, the driving circuits 96*p*, 96*t* and 96*r* control the angles of the movable unit having the camera section 100 mounted thereon in the panning direction 20, the tilting direction 21 and the rolling direction 22 such that the movable unit is at a prescribed angular position.

Based on the target angle signals 85*p*, 85*t* and 85*r* and the rotating angle signals 88*p*, 88*t* and 88*r*, driving signals for driving the panning driving coils 301, the tilting driving coils 302 and the rolling driving coils 303 are output from the driving circuits 96*p*, 96*t* and 96*r*. Owing to this, the camera driving apparatus 151 executes a feedback control on the angular position, and the movable section 102 having the camera section 100 mounted thereon is driven such that the rotating angle signals 88*p*, 88*t* and 88*r* are equal to the target rotating angle signals 85*p*, 85*t* and 85*r*.

By this series of driving control, the shake compensation for the camera section 100 is made, and thus images can be taken even while the photographer is walking.

In this embodiment, a control system mainly using the rotating angle signals obtained by integrating the outputs from the angular velocity sensors is shown. It is also possible to detect rotating angle signals by inputting the rotating angle signals 88*p*, 88*t* and 88*r* from the first and second magnetic sensors 501 and 503 of the camera driving apparatus to the calculation processing section 94 via the A/D converter and performing differential processing. Owing to this, the calculation processing section 94 can further construct an angular velocity feedback system using the angular velocity signals 83*p*, 83*t* and 83*r* from the camera driving apparatus and the rotating angle signals from the camera section 100. Thus, the camera-shake and walk-shake can be suppressed at a higher precision.

As described above in the embodiments, a camera driving apparatus and a camera unit according to the present invention allow the camera section to rotate at a larger angle than a conventional camera-shake compensation apparatus. Therefore, the present invention can also realize a camera driving apparatus capable of chasing a subject specified in an image such that the subject is located at the center of the image using image processing or the like.

In addition, photos can be taken while rotating the camera section in the panning direction or the tilting direction. By sequentially synthesizing still images or moving images which have been taken, the camera driving apparatus according to the present invention realizes super-wide-angle photography of still images or moving images.

INDUSTRIAL APPLICABILITY

A camera driving apparatus according to the present invention includes a structure capable of performing driving in a panning direction, a tilting direction and a rolling direction, and therefore can compensate for three-axis shake including rolling shake which is caused by a transfer of the walking balance of the photographer when he/she is taking a photo while walking. Thus, the present invention is preferably usable for various types of imaging devices which need to perform shake compensation of images, for example, wearable cameras. The camera driving apparatus according to the present invention is also suitable to cameras chasing a subject at a high speed, surveillance cameras, onboard cameras and the like which need to make high-speed panning, tilting and rolling motions.

The present invention also provides a video camera which is capable of performing super-wide-angle photography of still images and also moving images because a high-speed panning or tilting motion allows images which have been taken to be synthesized at a high speed.

REFERENCE SIGNS LIST

10 Optical axis
11, 12 Rotation axis
13, 14 Straight line
20 Panning direction
21 Tilting direction
22 Rolling direction
50 Gap
60 Viscous member
100 Camera section
101 Second movable section
100A, 101A Fall preventive regulation face
102 First movable section
102A, 102B, 102E, 102F Contacting face
102C Contact face
103 Third movable section
103*s* Rolling pivoting shaft
150 Counterweight
151, 152, 153, 154, 155 Camera driving apparatus
200 Base
201 Protrusion supporting section
201A Spherical face
202 Protrusion section
202A Sphere center
203 Panning magnetic yoke
204 Tilting magnetic yoke
205 Rolling magnetic yoke
206 Panning bobbin
207 Tilting bobbin
208 Rolling bobbin
210 Connection section
301 Panning driving coil
302 Tilting driving coil
303 Rolling driving coil
401 Panning driving magnet
402 Tilting driving magnet
403 Rotation detection magnet
404 Attracting magnet
405 Rolling driving magnet
501 First magnetic sensor
503 Second magnetic sensor
502 Circuit board
600 Driving coil unit

The invention claimed is:

1. A camera driving apparatus, comprising:
a camera section including an imaging element, a lens for forming a subject image on an imaging plane of the imaging element, and a lens barrel for holding the lens;
a fixed unit at least partially formed of a magnetic member and having a protrusion section having a shape of at least a part of a spherical face;
a movable unit including a first movable section having an attracting magnet for generating a magnetic attracting force in the magnetic member and a conical contact face with which the protrusion section is loosely engageable by the magnetic attracting force and is contactable, the first movable section being freely pivotable around a sphere center of the spherical face of the protrusion section; and a second movable section having the camera section mounted thereon and fixed to the first movable section, the second movable section having a fall preventive regulation face in a state where a prescribed gap, along which the second movable section is freely pivotable with respect to the fixed unit when the first movable section pivots, is sandwiched between the fall preventive regulation face and the fixed unit;

a detector for detecting an inclining angle of the camera section with respect to the fixed unit and a rotating angle of the camera section around an optical axis of the lens;

a first driving section for inclining the camera section with respect to the fixed unit; and a second driving section for rotating the camera section around the optical axis with respect to the fixed unit.

2. The camera driving apparatus of claim 1, wherein the detector includes:

a first detection section for detecting the inclining angle of the camera section with respect to the fixed unit; and a second detection section for detecting the rotating angle of the camera section around the optical axis with respect to the fixed unit.

3. The camera driving apparatus of claim 2, wherein the fall preventive regulation face and the contact face are each located on an line extended from the optical axis of the lens, generally symmetrically as being centered around the sphere center of the protrusion section.

4. The camera driving apparatus of claim 3, wherein the fall preventive regulation face has a shape of a concaved partial spherical face having a center matching the sphere center of the spherical face.

5. The camera driving apparatus of claim 4, wherein the second movable section is attached and fixed to the first movable section in a plurality of areas having no cross-section of the fixed unit, the plurality of areas being on a plane perpendicular to the optical axis of the lens and on a circumference of a circle centered around the optical axis.

6. The camera driving apparatus of claim 5, wherein the first driving section includes:

two pairs of inclination driving magnets located symmetrically with respect to the optical axis of the lens, and fixed to the movable unit in a state where one pair and the other pair are located on two lines perpendicular to each other;

two pairs of first magnetic yokes provided on the fixed unit so as to face the inclination driving magnets respectively; and inclination driving coils provided on the first magnetic yokes;

wherein a position of a center, in a direction of the optical axis, of the inclination driving magnets and the inclination driving coils generally matches a position of the sphere center of the spherical face.

7. The camera driving apparatus of claim 6, further comprising a viscous member or a viscous fluid provided between the contact face of the first movable section and the protrusion section of the fixed unit.

8. The camera driving apparatus of claim 7, wherein the attracting magnet is provided in the first movable section on the optical axis of the lens and is magnetized in the direction of the optical axis.

9. The camera driving apparatus of claim 8, wherein the gap is determined such that the contact face of the first movable section, even when being separated from the protrusion section of the fixed unit, is returned to a contact state by the magnetic attracting force of the attracting magnet.

10. The camera driving apparatus of claim 9, wherein:

the first detection section includes a first magnetic sensor fixed to the fixed unit; and the first magnetic sensor detects a change of a magnetic force caused by inclination of the attracting magnet provided in the first movable section and calculates a two-dimensional inclining angle of the camera section.

11. The camera driving apparatus of claim 10, wherein:

the second detection section is located symmetrically with respect to the sphere center of the spherical face on a plane which is perpendicular to the optical axis of the lens and passes the sphere center of the spherical face; and the second detection section is located to have an angle of 45 degrees with respect to the first or second driving section when seen in the direction of the optical axis of the lens when the movable unit is at a neutral position.

12. The camera driving apparatus of claim 11, wherein:

the second detection section includes a second magnetic sensor fixed to the fixed unit and a pair of rotation detection magnets provided on the movable unit;

the second magnet sensor detects a change of the magnetic force caused by rotation of the rotation detection magnets and calculates a rotating angle of the camera section; and the pair of rotation detection magnets have two magnetic poles magnetized oppositely in a direction passing the sphere center on a plane perpendicular to the optical axis of the lens, and the two magnetic poles are located on in a circumferential direction of a circle centered around the optical axis.

13. The camera driving apparatus of claim 2, wherein:

the detector includes a magnetic sensor fixed to the fixed unit;

the attracting magnet has a plurality of magnetic poles magnetized in a direction of the optical axis of the lens; and the magnetic sensor detects a change of a magnetic force caused by inclination and rotation of the attracting magnet and calculates a rotating angle of the camera section and a two-dimensional inclining angle of the camera section.

14. The camera driving apparatus of claim 1, wherein:

the first driving section includes a panning driving section for inclining the camera section in a panning direction with respect to the fixed unit, and a tilting driving section for inclining the camera section in a tilting direction, perpendicular to the panning direction, with respect to the fixed unit;

the detector detects an inclining angle of the camera section in the panning and tilting directions with respect to the fixed unit, and a rotating angle of the camera section in a rolling direction in which the camera section rotates around the optical axis of the lens;

the second driving section is a rolling driving section for rotating the camera section in the rolling direction with respect to the fixed unit; and the fixed unit includes a cantilever beam-shaped protrusion supporting section having the protrusion section at an end, and the protrusion supporting section has an angle of 45 degrees with respect to the panning direction or the tilting direction when seen in a direction of the optical axis.

15. The camera driving apparatus of claim 14, wherein:

the rolling driving section includes:

a pair of rolling driving magnets located symmetrically with respect to the optical axis of the lens and fixed to the movable unit so as to have an angle of 45 degrees with respect to a panning or tilting driving magnet;

a pair of rolling magnetic yokes provided on the fixed unit so as to face the rolling driving magnets respectively; and rolling driving coils provided on the rolling magnetic yokes respectively;

wherein a position, in the direction of the optical axis, of the rolling driving magnets and the rolling driving coils generally matches a position of the sphere center of the spherical face.

16. The camera driving apparatus of claim 15, wherein a pair of panning magnetic yokes, a pair of tilting magnetic yokes and the pair of rolling magnetic yokes each have a general V-shape, and each pair of yokes are located symmetrically with respect to the optical axis of the lens such that trough portions of the V-shapes face each other.

17. The camera driving apparatus of claim 16, wherein the pair of panning magnetic yokes, the pair of tilting magnetic yokes and the pair of rolling magnetic yokes are fixed to the fixed unit at the trough portions of the V-shapes.

18. The camera driving apparatus of claim 15, wherein the pair of panning magnetic yokes, the pair of tilting magnetic yokes and the pair of rolling magnetic yokes each have a side face having a shape of a convexed partial spherical face having a center which matches the sphere center of the spherical face.

19. The A camera driving apparatus, comprising:
a camera section including an imaging element, a lens for forming a subject image on an imaging plane of the imaging element, and a lens barrel for holding the lens;

a fixed unit at least partially formed of a magnetic member and having a protrusion section having a shape of at least a part of a spherical face;

a movable unit including a first movable section having an attracting magnet for generating a magnetic attracting force in the magnetic member and a conical contact face with which the protrusion section is loosely engageable by the magnetic attracting force and is contactable, the first movable section being freely pivotable around a sphere center of the protrusion section and having the camera section mounted thereon;

a fall preventive regulation face provided at a bottom of the camera section in a state where a prescribed gap, along which the camera section is freely pivotable with respect to the fixed unit when the movable unit pivots, is sandwiched between the fall preventive regulation face and the fixed unit;

a detector for detecting an inclining angle of the camera section with respect to the fixed unit and a rotating angle of the camera section around an optical axis of the lens;

a first driving section for inclining the camera section with respect to the fixed unit; and a second driving section for rotating the camera section around the optical axis with respect to the fixed unit;

wherein:
the first driving section includes two pairs of inclination driving magnets located symmetrically with respect to the optical axis of the lens and fixed to the movable unit in a state where one pair and the other pair are located on two lines perpendicular to each other; two pairs of first magnetic yokes provided on the fixed unit so as to face the inclination driving magnets respectively; and inclination driving coils provided on the first magnetic yokes;

the second driving section includes a pair of rotation driving magnets located symmetrically with respect to the optical axis of the lens and fixed to the movable unit; second magnetic yokes provided on the fixed unit so as to face the rotation driving magnets respectively; and rotation driving coils provided on the second magnetic yokes;

side faces of the inclination driving magnets facing the first magnetic yokes each have a part of a first convexed spherical face which has a center matching the sphere center of the spherical face and has, as a radius, distance R1 from the center to a median of the side face of the inclination driving magnet, the distance R1 being defined on a plane which is perpendicular to the optical axis and passes the sphere center of the spherical face;

side faces of the rotation driving magnets facing the second magnetic yokes each have a part of a second convexed spherical face which has a center matching the sphere center of the spherical face and has, as a radius, distance R2 from the center to a median of the side face of the rotation driving magnet, the distance R2 being defined on the plane;

side faces of the first magnetic yokes facing the side faces of the inclination driving magnets each have a part of a concaved spherical face which has, as a center, a first point on a line extended from a line connecting the center to the median of the side face of the inclination driving magnet, the extended line being defined on the plane, and has radius R3 which is longer distance L1 from the first point to a median of the side face of the first magnetic yoke, the distance L1 being defined on the plane; and side faces of the second magnetic yokes facing the side faces of the rotation driving magnets each have a part of a concaved spherical face which has, as a center, a second point on a line extended from a line connecting the center to the median of the side face of the rotation driving magnet, the extended line being defined on the plane, and has radius R4 which is longer distance L2 from the second point to a median of the side face of the second magnetic yoke, the distance L2 being defined on the plane.

20. The camera driving apparatus of claim 19, wherein the radius R3 and the distance L1 fulfill the relationship of $1.2L1 \leq R3 \leq 2L1$.

21. The camera driving apparatus of claim 19, wherein the radius R4 and the distance L2 fulfill the relationship of $1.2L2 \leq R4 \leq 2L2$.

22. A camera driving apparatus, comprising:
a camera section including an imaging element, a lens for forming a subject image on an imaging plane of the imaging element, and a lens barrel for holding the lens;

a protrusion section at least partially formed of a magnetic member and having a shape of at least a part of a spherical face;

a protrusion supporting section for supporting the protrusion section;

a first movable section having an attracting magnet for generating a magnetic attracting force in the magnetic member and a conical contact face with which the protrusion section is loosely engageable by the magnetic attracting force and is contactable, the first movable unit being freely pivotable around a sphere center of the spherical face of the protrusion section;

a second movable section having the camera section mounted thereon and fixed to the first movable section, the second movable section having a fall preventive regulation face in a state where a prescribed gap, along which the second movable section is freely pivotable with respect to the protrusion supporting section when the first movable section pivots, is sandwiched between the fall preventive regulation face and the protrusion supporting section;

a third movable section for supporting the protrusion supporting section;

a fixed unit for supporting the third movable section such that the third movable section is freely pivotable around an optical axis;

a panning driving section for inclining the camera section in a panning direction with respect to the third movable section;

a tilting driving section for inclining the camera section in a tilting direction, perpendicular to the panning direction, with respect to the third movable section;

a rolling driving section for rotating the third movable section in a rolling direction, in which the third movable section rotates around the optical axis of the lens with respect to the fixed unit;

a first detection section for detecting an inclining angle of the camera section in the panning and tilting directions with respect to the third movable section; and a second detection section for detecting a rotating angle of the third movable section in the rolling direction with respect to the fixed unit.

23. The camera driving apparatus of claim 22, wherein the movable section includes a fixed-fixed beam-shaped protrusion supporting section having the protrusion section at an end, and the protrusion supporting section has an angle of 45 degrees with respect to the panning direction or the tilting direction when seen in a direction of the optical axis.

24. The camera driving apparatus of claim 23, further comprising a counterweight attached to the first movable section; wherein:

when the first movable section is at a neutral position, the counterweight is located opposite to the camera section with respect to a plane which is perpendicular to the optical axis of the lens and includes the sphere center of the spherical face.

25. The camera driving apparatus of claim 24, wherein:
the panning driving section includes:
a pair of panning driving magnets located symmetrically with respect to the optical axis of the lens and fixed to the first or second movable section,
a pair of panning magnetic yokes provided on the third movable section so as to face the panning driving magnets respectively,
panning bobbins attached to the panning magnetic yokes, and
panning driving coils wound around the panning bobbins;
the tilting driving section includes:
a pair of tilting driving magnets located symmetrically with respect to the optical axis of the lens and fixed to the first or second movable section, such that the pair of tilting driving magnets and the pair of panning driving magnets are located on two lines perpendicular to each other,
a pair of tilting magnetic yokes provided on the third movable section so as to face the tilting driving magnets respectively,
tilting bobbins attached to the tilting magnetic yokes, and
tilting driving coils wound around the tilting bobbins; and
a position of a center, in the direction of the optical axis, of the panning and tilting driving magnets and the panning and tilting driving coils generally matches a position of the sphere center of the spherical face.

26. The camera driving apparatus of claim 25, wherein side faces of the panning and tilting magnetic yokes facing the respective driving magnets each have a shape of a concaved partial spherical face or partial cylinder side face having a center on a plane which includes the sphere center of the spherical face and is perpendicular to the optical axis of the lens.

27. The camera driving apparatus of claim 25, wherein faces of the panning and tilting driving magnets facing the respective magnetic yokes each have a shape of a convexed partial spherical face or partial cylinder side face having a center on a plane which includes the sphere center of the spherical face and is perpendicular to the optical axis of the lens.

28. The camera driving apparatus of claim 27, wherein:
the pair of panning driving coils and the pair of tilting driving coils are each divided into two at the position of the sphere center of the spherical face in the direction of the optical axis of the lens, and are wound around the panning bobbins and the tilting bobbins; and
the panning bobbins and the tilting bobbins form a general V-shape so as not to interfere with the panning magnetic yokes or the tilting magnetic yokes, are located symmetrically with respect to the optical axis of the lens such that trough portions of the V-shapes of the panning bobbins face each other and such that trough portions of the V-shapes of the tilting bobbins face each other, and are attached to the panning and tilting magnetic yokes respectively.

29. The camera driving apparatus of claim 28, wherein:
the rolling driving section includes:
a pair of rolling driving magnets located symmetrically with respect to the optical axis of the lens and fixed to the third movable section so as to have an angle of 45 degrees with respect to the panning or tilting driving magnets,
a pair of rolling magnetic yokes provided on the fixed unit so as to face the rolling driving magnets respectively, and
rolling driving coils wound around the rolling magnetic yokes; and
a center of projection of the rolling driving magnets and the rolling driving coils when seen in a direction perpendicular to the optical axis of the lens is not on a plane which is perpendicular to the optical axis and includes the sphere center of the spherical face.

30. The camera driving apparatus of claim 29, wherein side faces of the rolling magnetic yokes facing the rolling driving magnets each have a shape of a convexed partial spherical face or curved face.

31. The camera driving apparatus of claim 30, wherein a face of the attracting magnet facing the first magnetic sensor has a shape of a convexed partial spherical face centered around the spherical center.

32. A camera unit, comprising:
the camera driving apparatus of claim 1;
an angular velocity sensor for detecting an angular velocity around each of three axes of the fixed unit, the three axes being perpendicular to one another;
a calculation processing section for generating a target rotating angle signal based on an output from the angular velocity sensor; and
a driving circuit for generating a signal for driving the first driving section and the second driving section based on the target rotating angle signal.

* * * * *

UNITED STATES PATENT AND TRADEMARK OFFICE
CERTIFICATE OF CORRECTION

PATENT NO. : 8,027,579 B2  
APPLICATION NO. : 12/679608  
DATED : September 27, 2011  
INVENTOR(S) : Teruyuki Takizawa et al.

Page 1 of 1

It is certified that error appears in the above-identified patent and that said Letters Patent is hereby corrected as shown below:

Column 61, line 28, "The A", should read -- A --.

Signed and Sealed this  
Twenty-first Day of February, 2012

David J. Kappos  
*Director of the United States Patent and Trademark Office*